United States Patent
Wu et al.

(10) Patent No.: US 12,555,173 B2
(45) Date of Patent: *Feb. 17, 2026

(54) COMPUTER-IMPLEMENTED DOCUMENT TRANSFORMATION SYSTEMS AND METHODS

(71) Applicant: Side, Inc., San Francisco, CA (US)

(72) Inventors: Edward Wu, San Mateo, CA (US); Guy Gal, San Francisco, CA (US); Hilary Saunders, El Granada, CA (US); Stephen Saunders, El Granada, CA (US); Christopher Dzoba, San Francisco, CA (US); Prescott Prue, San Francisco, CA (US); Zachary Karrasch, San Francisco, CA (US); Jeffrey Judkins, Richmond, CA (US); Elizabeth Paris, San Francisco, CA (US); Adriano Castro, San Francisco, CA (US); Mark J. Stefik, Portola Valley, CA (US)

(73) Assignee: Side, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,339

(22) Filed: Nov. 22, 2023

(65) Prior Publication Data

US 2024/0087063 A1 Mar. 14, 2024

Related U.S. Application Data

(63) Continuation-in-part of application No. 18/333,387, filed on Jun. 12, 2023, now abandoned, which is a
(Continued)

(51) Int. Cl.
*G06Q 50/16* (2012.01)
*G06F 16/13* (2019.01)
(Continued)

(52) U.S. Cl.
CPC ......... *G06Q 50/167* (2013.01); *G06F 16/137* (2019.01); *G06F 16/1834* (2019.01);
(Continued)

(58) Field of Classification Search
CPC ...... G06F 40/186; G06F 40/174; G06F 16/27; G06F 16/1837; G06F 16/137;
(Continued)

(56) References Cited

U.S. PATENT DOCUMENTS 8,688,461 B1 * 4/2014 Richards ................. G06Q 50/18
  705/76
10,140,277 B2 * 11/2018 Unsal ....................... G06N 20/00
(Continued)

FOREIGN PATENT DOCUMENTS

NZ 592104 A * 9/2011 ......... G06Q 30/0278

OTHER PUBLICATIONS

File history and the references cited therein of U.S. Appl. No. 16/560,966, filed Sep. 4, 2019.
(Continued)

*Primary Examiner* — Tarek Chbouki
(74) *Attorney, Agent, or Firm* — Perkins Coie LLP

(57) ABSTRACT

Systems and methods for document transformation and recordation are provided. Documents for a transaction of real property are identified based on a jurisdiction in which the real property is located. Each document includes a plurality of data fields and each data field is associated with a data field identifier. A data value is received in at least one of the data fields of one or more of the documents. The data fields in the documents associated with the data field identifiers that match the data field identifiers of the data fields in which the data values are received are identified. The identified data fields are automatically populated with the data values based on the data field identifiers. Completeness
(Continued)

rules are applied to the documents by verifying all required documents for completing the transaction in the jurisdiction are satisfied. Documents or information pertaining the documents can be stored in a blockchain.

20 Claims, 55 Drawing Sheets

Related U.S. Application Data continuation of application No. 17/978,034, filed on Oct. 31, 2022, now Pat. No. 11,676,229, which is a continuation of application No. 17/498,513, filed on Oct. 11, 2021, now Pat. No. 11,488,269, which is a continuation of application No. 16/560,976, filed on Sep. 4, 2019, now Pat. No. 11,145,017, application No. 18/517,339, filed on Nov. 22, 2023 is a continuation-in-part of application No. 17/751,387, filed on May 23, 2022, now Pat. No. 11,869,107, which is a continuation of application No. 16/560,982, filed on Sep. 4, 2019, now Pat. No. 11,341,102, application No. 18/517,339, filed on Nov. 22, 2023 is a continuation-in-part of application No. 18/453,246, filed on Aug. 21, 2023, now abandoned, which is a continuation of application No. 17/728,755, filed on Apr. 25, 2022, now Pat. No. 11,734,781, which is a continuation of application No. 16/560,988, filed on Sep. 4, 2019, now Pat. No. 11,314,699, application No. 18/517,339, filed on Nov. 22, 2023 is a continuation-in-part of application No. 18/460,388, filed on Sep. 1, 2023, now abandoned, which is a continuation of application No. 17/577,179, filed on Jan. 17, 2022, now Pat. No. 11,748,831, which is a continuation of application No. 16/560,984, filed on Sep. 4, 2019, now Pat. No. 11,227,350, application No. 18/517,339, filed on Nov. 22, 2023 is a continuation-in-part of application No. 16/560,966, filed on Sep. 14, 2019, now abandoned, and a continuation-in-part of application No. 16/560,971, filed on Sep. 4, 2019, now abandoned, application No. 18/517,339, filed on Nov. 22, 2023 is a continuation-in-part of application No. 18/497,981, filed on Oct. 30, 2023, now abandoned, which is a continuation of application No. 16/560,980, filed on Sep. 4, 2019, now Pat. No. 11,803,923, application No. 18/517,339, filed on Nov. 22, 2023 is a continuation-in-part of application No. 17/683,177, filed on Feb. 28, 2022, now abandoned, which is a continuation of application No. 16/560,964, filed on Sep. 4, 2019, now Pat. No. 11,263,395, application No. 18/517,339, filed on Nov. 22, 2023 is a continuation-in-part of application No. 18/154,583, filed on Jan. 13, 2023, now abandoned, which is a continuation of application No. 16/560,973, filed on Sep. 4, 2019, now Pat. No. 11,557,011.

(60) Provisional application No. 62/728,051, filed on Sep. 6, 2018.

(51) Int. Cl.
| | | |
|---|---|---|
| *G06F 16/182* | (2019.01) | |
| *G06F 16/23* | (2019.01) | |
| *G06F 16/248* | (2019.01) | |
| *G06F 16/27* | (2019.01) | |
| *G06F 21/64* | (2013.01) | |
| *G06F 40/174* | (2020.01) | |
| *G06F 40/186* | (2020.01) | |
| *G06Q 10/0631* | (2023.01) | |
| *G06Q 20/02* | (2012.01) | |
| *G06Q 20/38* | (2012.01) | |
| *G06V 30/418* | (2022.01) | |
| *H04L 9/00* | (2022.01) | |
| *H04L 9/06* | (2006.01) | |
| *H04L 9/08* | (2006.01) | |
| *H04L 9/32* | (2006.01) | |

(52) U.S. Cl.
CPC ...... *G06F 16/1837* (2019.01); *G06F 16/2358* (2019.01); *G06F 16/248* (2019.01); *G06F 16/27* (2019.01); *G06F 21/64* (2013.01); *G06F 40/174* (2020.01); *G06F 40/186* (2020.01); *G06Q 10/06314* (2013.01); *G06Q 20/02* (2013.01); *G06Q 20/3827* (2013.01); *G06Q 50/16* (2013.01); *G06V 30/418* (2022.01); *H04L 9/0637* (2013.01); *H04L 9/0643* (2013.01); *H04L 9/0825* (2013.01); *H04L 9/3236* (2013.01); *H04L 9/50* (2022.05); *G06Q 2220/00* (2013.01)

(58) Field of Classification Search
CPC ............... G06F 16/2358; G06F 16/248; G06F 16/1834; G06Q 50/167; G06Q 50/16; H04L 9/3236; H04L 9/0825; H04L 9/0643; H04L 9/50
See application file for complete search history.

(56) References Cited

U.S. PATENT DOCUMENTS

| | | | | |
|---|---|---|---|---|
| 10,318,623 | B2* | 6/2019 | Waibel | G16H 80/00 |
| 10,635,692 | B2* | 4/2020 | Eigner | G06F 16/355 |
| 11,145,017 | B1 | 10/2021 | Wu et al. | |
| 11,227,350 | B1 | 1/2022 | Wu et al. | |
| 11,263,395 | B1 | 3/2022 | Wu et al. | |
| 11,314,699 | B1 | 4/2022 | Wu et al. | |
| 11,341,102 | B1 | 5/2022 | Wu et al. | |
| 11,488,269 | B2 | 11/2022 | Wu et al. | |
| 11,557,011 | B1 | 1/2023 | Wu et al. | |
| 11,676,229 | B2 | 6/2023 | Wu et al. | |
| 11,734,781 | B2 | 8/2023 | Wu et al. | |
| 11,748,831 | B2 | 9/2023 | Wu et al. | |
| 11,803,923 | B1 | 10/2023 | Wu et al. | |
| 11,869,107 | B2 | 1/2024 | Wu et al. | |
| 2004/0230521 | A1* | 11/2004 | Broadbent | G06Q 40/03 705/38 |
| 2006/0155594 | A1* | 7/2006 | Almeida | G06Q 10/10 705/37 |
| 2008/0091700 | A1* | 4/2008 | Brotherson | G06F 40/186 707/999.102 |
| 2009/0289901 | A1* | 11/2009 | Aleixo | G06Q 10/06 345/173 |
| 2010/0036686 | A1* | 2/2010 | Olivier | G06Q 40/08 705/4 |
| 2013/0041781 | A1* | 2/2013 | Freydberg | G06Q 30/06 705/27.1 |
| 2013/0151421 | A1* | 6/2013 | Van Der Ploeg | G06Q 10/06 705/301 |
| 2014/0337144 | A1* | 11/2014 | Seymour | G06Q 30/0635 705/14.72 |
| 2015/0317295 | A1* | 11/2015 | Sherry | G06F 40/117 715/226 |
| 2016/0314425 | A1* | 10/2016 | Cunningham | G06Q 10/06398 |
| 2018/0300296 | A1* | 10/2018 | Ziraknejad | G06F 16/93 |
| 2019/0266683 | A1* | 8/2019 | Burns | G06Q 30/0623 |
| 2019/0385240 | A1* | 12/2019 | Lee | G06F 16/2365 |
| 2022/0188507 | A1 | 6/2022 | Wu et al. | |
| 2023/0153933 | A1 | 5/2023 | Wu et al. | |
| 2024/0135476 | A1 | 4/2024 | Wu et al. | |

(56) References Cited

U.S. PATENT DOCUMENTS

2024/0144404 A1  5/2024  Wu et al.
2024/0153021 A1  5/2024  Wu et al.
2024/0177254 A1  5/2024  Wu et al.

OTHER PUBLICATIONS

File history and the references cited therein of U.S. Appl. No. 16/560,971, filed Sep. 4, 2019.

* cited by examiner

Fig. 4.

Mark Stevens

Form Elements     [Add Form Elements] ~ 134

| Headers 131 | 132 | 133 |
| ID | Name | Actions |
| -Kjjb610zxa9OSSTB0Jn | Property Access Information | |
| -Kjjej1XPMPMxREHUjQA | Additional Information | |
| -Kjo0VNib_Cf-le3lgck | Scheduling Information | |
| -KjobB7rgxSkPg_ldXR3 | Roof Inspection Information | |
| -KjokX87utyXX1MqcMee | Sewer Lateral Inspection Information | |
| -Kjop1WCMgL7iULlNalG | Termite Inspection Information | |
| -Kjou-KStD4Br94eBGrM | Sign Post Installer Information | |
| -KjoyilGdGmUvXMJzS7X | Property Overview | |
| KjoynfjmiYQGdYJrVLP | Community | |
| -KjoytNzbBYYO0PevqL4 | Schools | |

135 points to -Kjjb610zxa9OSSTB0Jn

Fig. 6.

META | INPUTS | EXPERT

Editing String: text-field4

Page 1 disabled left 136 name Buyer1And2 recipientId agent tabindex 9 top 189

Type String

Value

Width 875

Add Field

Create Multiline Group

Add Input

VIEWING: DRAFT

BUYER'S INTENT TO EXCHANGE SUPPLEMENT

The following terms and conditions are hereby incorporated in and made a part of the ☐CPA, ☐RIPA, ☐VLPA, ☐Other ("Property"),
Dated _____ (the "Agreement") on property known as _____ is referred to as Buyer,
in which _____ is referred to as Seller.
and
All other provision of the Agreement shall remain in full force and effect.
1. BUYER'S INTENT TO EXCHANGE: It is the intent of Buyer to utilize this transaction as part of an exchange of like-kind property under Internal _____ ulgated thereunder. Buyer and Seller agree to cooperate in effecting such an exchange, as follows:
A. Buyer intends to se the Property as part of an exchange for "Other Property":
(Check one Only)
  ☐ Described
  ☐ To be designed by Buyer, who shall take all steps necessary to enter into a contract to sell and transfer such Other Propery.
B. Buyer shall indemnify, defend and hold harmless all other parties to this transaction from all liabilities and any additional attorneys fees, accountant fees or any other costs arising from or connected in any way with the exchange.
C. If Buyer is unable, through no fault of Buyer, to complete the transfer of such Other Property by the Close Of Escrow in the Agreement, or as extended by mutual agreement:
(Check One Only)
OR ☐ This transaction shall close escrow as a sale, without extension of time for closing.
OR ☐ The Close of Escrow for this transaction shall be extended by a maximum of _____ Days to enable Buyer to
       This transaction shall be cancelled, Buyer's deposit shall be returned to Buyer, and all parties shall be released from further
       obligation to each other.
OR ☐ Other: _____
D. Seller in this transaction shall not be required to take title to Other Property for any period of time, as an accommodation to Buyer, unless agreed to in writing.

This input has this name, and that name is special so it will get data

Fig. 7(Con'd).

| | |
|---|---|
| ✸ 1120 Rose Avenue | ⬤ Mark Stevens ▽ |

Cover Sheet ⊗

Documents

Listing Services

Marketing Services

101 { Cover Sheet, Documents, Listing Services, Marketing Services }

102

Cover Sheet

Listing Agent ← 103

Select Agent
Mark Stevens ▼

Seller(s) information ← 104

Adam Able
Adam.Able@gmail.com
(408) 365-1234
1120 Rose Avenue
Mountain View, CA
94040

EDIT     ADD SELLER 2

Important Dates ← 105

Contract Date *
Friday, December 8th 2017

On Market Date*
Friday, December 22nd 2017

Property Information ← 106

Property Being Sold

APN Number
189-23-023

Street*
1120 Rose Avenue
_____ SAME AS ABOVE

Apt/Unit/Suite Number

City*              State*              Zip Code*
Mountain View      CA                  94040

Document Templates — 71

Mark Stevens — 79

ADD DOCUMENT TEMPLATES — 78

| Template Name ▽ | Revision Date ▽ | Appears in Listings? ▽ | Appears in Offers? ▽ | Last Published on ▽ | Last Edited on ▽ | Local Type ▽ | Assigned Locals |
|---|---|---|---|---|---|---|---|
| 1031 Exchange BES Buyer | 11/2009 | | Offers | Nov 21 2017 3:35 pm | | states | CA |
| 1031 Exchange SES Seller | 11/2009 | Listings | | Nov 21 2017 3:36 pm | | states | CA |
| 1031 QA Copy | 11/2009 | Listings | | Dec 4 2017 3:01 pm | | | Global |
| 48 Hour Notice Of Inspection Prior to Termination of Tenancy FEHN | 4/2011 | Listings | Offers | Sep 15 2017 1:34 pm | | states | CA |
| Add Info Regarding Termination of Tenancy within One Year After Foreclosure | 11/2012 | Listings | Offers | | | states | CA |
| Addendum Buyer | 12/2015 | | Offers | Nov 21 2017 3:44 pm | Oct 17 2017 4:26 pm | states | CA |

Residential Listing Agreement

— 190

RESIDENTIAL LISTING AGREEMENT
(Exclusive Authorization and right to sell)

Date Prepared: 12/08/2017

1. EXCLUSIVE RIGHT TO SELL: Adam Able ("Seller")
hereby employs and grants Reside Real Estate ("Broker")
beginning (date) and ending at 11:59 P.M. on (date) ("Listing Period")
the exclusive and irrevocable right to sell or exchange the real property described as
1120 Rose Avenue , situated in (City),
Santa Clara (County), California, 94040 (Zip Code), Assessor's Parcel No. 189-23-023 ("Property").
☐ This Property is a manufactured (mobile) home. See addendum for additional terms.
☐ This Property is being sold as part of a probate, conservatorship or guardianship. See addendum for additional terms.

2. LISTING PRICE AND TERMS:
   A. The listing price shall be: Nine Hundred Fifty Thousand Nine Hundred Dollars ($ 950,900 ) ← 192
   B. Listing Terms:

191 ↗

3. COMPENSATION TO BROKER:
Notice: The amount or rate of real estate commission is not fixed by law. They are set by each Broker individually and may be negotiable between Seller and Broker (real estate commissions include all compensation and fees to Broker).
   A. Seller agrees to pay to broker as compensation for services irrespective of agency relationship(s), either ☐
      ☐ percent of the listing price (or if a purchase agreement is entered into, of the purchase price), or ☐
      $ AND , as follows:
      (1) If during the Listing Period, or any extension, Broker, cooperating broker, Seller or any other person procures a ready, willing, and able buyer(s) whose offer to purchase the Property on any price and terms is accepted by Seller, provided the Buyer completes the transaction or is prevented from doing so by Seller.

241 → Carpet Cleaner [Requested]

CARPET CLEANER INFORMATION

Select Carpet Cleaner*
242 → Global Rug Specialist ⌄ [NEW VENDOR] ← 243

244 → PROPERTY ACCESS INFORMATION

Property is*
● Client Occupied
○ Tenant Occupied
○ Vacant

Who will be providing access to the property?*
Alice Able

Is there a lockbox? If yes, what is the code?
yes - - 12345

Is there a gate code? If yes, what is the code?
no

245 → SCHEDULING INFORMATION

Due By

Save at least one time slot
Choose day(s)           Choose Time(s)
Sun Mon Tue Wed Thu Fri Sat   8-11 AM | 11-2 PM | 2-5 PM | 5-8 PM   SAVE

CLOSE  [SUBMIT CHANGES] ← 246

251 → Mark Stevens

A vendor request was resubmitted for [UPDATED] 1120 Rose Avenue – Carpet Cleaner To: Mark Stevens,
Reply-To: support@residebrokerage.com —-UPDATED at 12-28-2017 02:22 pm PST —-

252 → CARPET CLEANR INFORMATION:
 - Select carpet cleaner:
  Name: Global Rug Specialist
  Phone: (650) 965-7847
  Email: globalRugCleaners@infinity.com 253 → PROPERTY ACCESS INFORMATION:
 - Property is:
  ● Client Occupied
  ○ Tenant Occupied
  ○ Vacant

- Who will be provide access to the property?: Alice Able
 - Is there a lockbox? If yes, what is the code?: yes – 12345
 - Is there a gate code? If yes, what is the code?: no 254 → SCHEDULE INFORMATION:
 - Due by:

255 → SCHEDULE:
 - Preference 1:  Monday at 8 am - 11 am
 - Preference 2:  Tuesday at 2 pm – 5 pm 256 → ADDITIONAL INFORMATION:
 - Special instructions:
  Living room, dining room, stairs, master suite.

- Additional notes:

257 → META DATA:
 - Agent: Mark Stevens
 - Side: Listing Agent
 - On Market Date: 12/22/17
 - TransactionId:-L-rPmZF6bl28125dDbs
 Full Address:
  1120 Rose Avenue
  Mountain View, CA, 94040
  Santa Clara County
 - vendorRequest:-L-rPqvyDAqDb_LRzg61

258 → LIST OF ALL UPLOADED FILES: No uploaded files

| | | |
|---|---|---|
| ✦ 755 Cambridge Avenue | | ◯ Mark Stevens |

Painter　　　[ Draft ]　　　　　　　　　　　∧　⋮

Cover Sheet ⊘

Documents

Listing Services

Marketing Services

[ AUTOFILL ]

262

PAINTER INFORMATION

VENDOR

Eagles Painting

- First Available　　　　　　　　　　—— 263

Lara Painting　　　　　　　　　　　　—— 264

Steve Aguilar

Vu Van Construction

Property is*

⦿ Client Occupied

◯ Tenant Occupied

◯ Vacant

Who will be providing access to the property?*

_____

Is there a lockbox? If yes, what is the code?

_____

Is there a gate code? If yes, what is the code?

_____

🏠　　　　　　　　　　　CLOSE　　[ SUBMIT ]

Fig. 23.

281 — Flyer/Property Statement [Requested]

282 — | PORTRAIT A | PORTRAIT B | PORTRAIT C | PORTRAIT D | LANDSCAPE A | LANDSCAPE B |

Front     Back

283 —

Preview only

| Address | 950,000 | 1958 spectacular Mission Style Spectacular mountain views Single family home 4 Bedrooms, 2.5 baths Bonus room or office Walk to shopping 5,000 sqft lot | Logo |
|---|---|---|---|
| 4 Beds – 3 Baths – 1932 sqft in Monta Loma neighborhood | Contract Details | | Website URL |

[AUTOFILL]

Price*
284 — 950,000

Headline
285 — 4 Beds – 3 Baths – 1932 sqft in Monta Loma neighborhood

Description*
286 — Spectacular! Complete remodel & new addition in the coveted Monta Loma neighborhood of Mountain View! Large living & dining room with vaulted ceiling and skylights, plus separate family room opening onto patio. Chef's kitchen with 6-burner Thermador rangetop. Thermador ovens, wine fridge, custom cabinets, White Macaubas quartzite countertop & peninsula breakfast bar. Laundry room/pantry with build-in cabinets & shelving. Three beautifully designed bathrooms featuring Porselanosa, Ann Sacks and/or Country Floors tiling with large luxury shower in Master Bath. Large master bedroom with walk-in closet. European oak floors. Second patio in rear yard with mature orange tree. Behind-the-scenes essentials include new electrics, heating/AC, wall/ceiling insulation, interior plumbing and extensive attic storage. Close to Caltrain, Google, and all the restaurants & shopping on San Antonio Road, plus nearby freeway access, 4 bedrooms, 3 bathrooms. 1932 sq feet, 5000 sq ft lot (buyer to verify).

1000/1050

CLOSE    [SUBMIT CHANGES] — 287

300

Fig. 25 (Con'd).
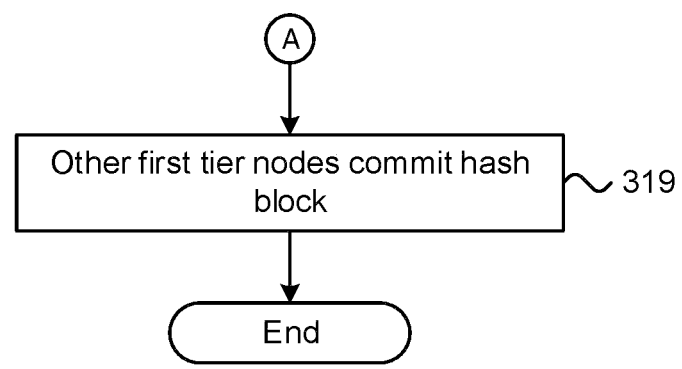

- 430
- 432 { Cover Sheet, Cover Letter, Documents, Proof of Funds, Signed Disclosures, Pre Qual, Purchase Services, Marketing Services }
- 431
- 433 — GENERATE OFFER
- 434 — ADD BUYER 2

Mark Stevens

Cover Sheet

Selling Agent
Select Agent
Mark Stevens

Buyer(s)

Buyer 1

ⓘ Click here to connect your address book.

First Name* Bradley
Last Name* Foxworthy

Email
BFoxworth34@gmail.com

Cell Phone
(650) 851-8433

Home Phone

Street
977 Santa Maria Avenue

Apt/Unit/Suite Number

City Portola Valley
State CA
Zip Code 94028

County
San Mateo County

Ownership:
- ● Individual
- ○ Trust
- ○ Entity (LLC, Corp, Other)

REMOVE

| | 1120 Rose Avenue | ○ Mark Stevens ▽ |
|---|---|---|

Cover sheet

- Cover Sheet ⊘
- Cover Letter
- Documents
- Proof of Funds
- Signed Disclosures
- Pre Qual
- Purchase Services
- Marketing Services Selling Agent(s) Information

Mark Stevens
mstevens@gmail.com

Reside Real Estate
02014153
Edit

[ ADD CO-SELLING AGENT ]

Buyer(s) Information

Bradley Foxworthy
BFoxworth34@gmail.com (650) 851-8433
977 Santa Maria Avenue
Portola Valley, CA 94028
Edit

[ ADD BUYER 2 ]

Contract Date

Contract Date
Monday, March 12th 2018

Property Information

Property Being Sold
MLS Select      MLS Number
MLS             10467249
Listings
APN Number
189-23-023
Street
1120 Rose Avenue                    —— MLS AUTOFILL
Apt/Unit/Suite
Number
City              State        Zip Code
Mountain View  CA       94040
County
San Mateo County

Listing Agent(s) Information

Jack Barter
JBarter@gmail.com
(408) 876-5432

191000639
BarterAndCompany
19100639
Edit

[ ADD CO-LISTING AGENT ]

[ GENERATE ]

Dear Seller Family,

Thank you for the opportunity to see and appreciate your beautiful home.

We would like to introduce ourselves and share some family history. My name is Bradley Foxworthy. We worked in the family oriented retail clothing business, serving mid-peninsula families since 1951. My grandfather, Aston Foxworthy, came to California in the late 1940's from England. To design and sew clothing for Levi jeans. In the early 1950's, he opened a small family-oriented department store in downtown San Jose. My father took over the business in the 1970's. I have been working as a designer since 2008.

Last year, I was blessed to marry Barbara Wong Martinez. Your beautiful home has just enough space for us. It would be perfect for us to start the family and for Barbara to develop her Spanish-styled leather purses she dreams about. We both like art and the friendly neighborhood in Mountain View.

We have completely fallen in love with your home. It would also be a good commute to our family's downtown store and close to my parent's house.

We would be honored to live in your home and appreciate your consideration.

Sincerely,

Bradley and Barbara Foxworthy

Care of:

Agent: Mark Stevens
Reside Real Estate
465 Brannan St.
San Francisco, CA 94107

FIG. 34

BUYER'S INSPECTION ELECTIONS

Property Address: 1120 Rose Avenue, Mountain View, CA 94040 ("Property")

D. BUYER INSPECTION ELECTION: Buyer represents and agrees that Buyer independently considered the available Inspections and at this time has decided to order only those Inspections selected "Yes" below.

| 1. ☐ Yes ☐ No | General Home Inspection | 20. ☐ Yes ☐ No | Tree/Arborist |
|---|---|---|---|
| 2. ☐ Yes ☐ No | Wood Destroying Pests | 21. ☐ Yes ☐ No | Well |
| 3. ☐ Yes ☐ No | Chimney | 22. ☐ Yes ☐ No | Water Systems |
| 4. ☐ Yes ☐ No | Electrical | 23. ☐ Yes ☐ No | Radon Gas |
| 5. ☐ Yes ☐ No | Heating | 24. ☐ Yes ☐ No | Formaldehyde |
| 6. ☐ Yes ☐ No | Lead Paint | 25. ☐ Yes ☐ No | Asbestos |
| 7. ☐ Yes ☐ No | Plumbing | 26. ☐ Yes ☐ No | Methane Gas |
| 8. ☐ Yes ☐ No | Square Footage | 27. ☐ Yes ☐ No | Mold |
| 9. ☐ Yes ☐ No | Structural | 28. ☐ Yes ☐ No | Permits |
| 10. ☐ Yes ☐ No | Easements | 29. ☐ Yes ☐ No | Public Records |
| 11. ☐ Yes ☐ No | Foundation | 30. ☐ Yes ☐ No | Zoning |
| 12. ☐ Yes ☐ No | Lot Size | 31. ☐ Yes ☐ No | Gov. Requirements |
| 13. ☐ Yes ☐ No | Boundaries | 32. ☐ Yes ☐ No | Vacant Land |
| 14. ☐ Yes ☐ No | Pool/SPA | 33. ☐ Yes ☐ No | Construction Costs |
| 15. ☐ Yes ☐ No | Roof | 34. ☐ Yes ☐ No | Availab. of Utilities |
| 16. ☐ Yes ☐ No | Sewer | 35. ☐ Yes ☐ No | Environm. Survey |
| 17. ☐ Yes ☐ No | Septic System | 36. ☐ Yes ☐ No | Hazards Reports |
| 18. ☐ Yes ☐ No | Soil Stability | 37. ☐ Yes ☐ No | Subdiv. of Prop. |
| 19. ☐ Yes ☐ No | Survey | | |
| ☐ Yes ☐ No | Other: | | |

Buyer: Bradley Foxworthy   Date   Buyer   Date

EXIT DOCUMENT  < PREVIOUS   NEXT DOCUMENT >

| | 1120 Rose Avenue | Mark Stevens |

491 {
- Cover Sheet ✓
- Cover Letter ✓
- Documents
- Proof of Funds
- Signed Disclosures
- Pre Qual
- Purchase Services
- Marketing Services

492:

Home Inspector [Not Requested] ^
494
AUTOFILL — 495

HOME INSPECTION FORM

Select home Inspection* — 496
A+ Home Inspection Service ▽    NEW VENDOR — 497

Are there any detached structures?* — 498
No

If condo or town house, do you want the exterior inspected?*
499
PROPERTY ACCESS INFORMATION Property is*
- ⦿ Client Occupied
- ○ Tenant Occupied      } 500
- ○ Vacant Who will be providing access to the property? — 501
BarterAndCompany Real Estate Is there a lockbox? If yes, what is the code? — 502
Yes - - agent will be there Is there a gate code? If yes, what is the code? — 503
No

CLOSE    SUBMIT — 504

Termite Inspector [Not Requested]  ∨ ⋮ — 505

ADD REQUEST ∨

507

GENERATE OFFER

1120 Rose Avenue

Home Inspector  [ Requested ]

Cover Sheet ⊘
Cover Letter ⊘
Documents
Proof of Funds
Signed Disclosures
Pre Qual
Purchase Services
Marketing Services Your TC is working on your order! Look out for emails from her/him.
tc@resideebrokerage.com
888-123-3156
If you need to make any changes, please update the form and resubmit.
Once the request is "In Process" you will not able to make changes to this for,
and will need to contact your TC.

~ 514

SCHEDULING INFORMATION ⟵ 515

Due by ⟵ 516
March 27, 2018

Save at least one time slot
Choose day(s)

( Sun ) ( Mon ) ( Tue ) ( Wed ) ( Thu ) ( Fri ) ( Sat ) ⎬ 517

518 ⟶ Choose Time(s)

| 8-11 AM | 11-2 PM | 2-5 PM | 5-8 PM |   [ SAVE ] ~ 519

~ 512

Preference 1: Day(s):   Time(s)
              Monday    8-11 AM
> Preference 2: Day(s):   Time(s)     🗑
              Tuesday   11-2 PM
Preference 3: None

⎬ 520

ADDITIONAL INFORMATION ⟵——————— 521

Home Warranty [Draft]  AUTOFILL

HOME WARRANTY INFORMATION — 533

Who would like to order from?* — 534
American Home Shield ▼   [NEW VENDOR]

Home Warranty Type* — 535
○ Standard
⦿ Upgraded

Does the Property has AC?* — 536
○ Yes
⦿ No

Property Amenities (Select all that apply)?* — 537
☑ Fridge
☑ Washer/Dryer
☑ Roof Coverage
☐ Pool/Spa

SCHEDULING INFORMATION — 538

Due by
March 31, 2018 — 539

Save at least one time slot — 540
Choose day(s)
( Sun )  ( Mon )  ( Tue )  ( Wed )  ( Thu )  ( Fri )  ( Sat )

541 — Choose Time(s)
[8-11 AM]  [11-2 PM]  [2-5 PM]  [5-8 PM]   [SAVE]

542 — Preference 1: Day(s):    Time(s)
             Monday    8-11 AM

CLOSE   [SUBMIT] — 546

Termite Inspector  [Not Requested]   ▼

ADD REQUEST ⌄

Home Inspector  [Requested]   ▼

Mark Stevens ▽

| Cover Sheet | Cover Sheet |
|---|---|
| Cover Letter | Selling Agent |
| Documents ⓘ | Select Agent: Mark Stevens |
| Proof of Funds | Buyer(s) |
| Signed Disclosures | |
| Pre Qual | Buyer 1 |
| Purchase Services ⓘ | ⓘ Click here to connect your address book. |
| Marketing Services ⓘ | |

610 (sidebar)

Buyer 1

ⓘ Click here to connect your address book.

First Name*  Bradley
Last Name*  Foxworthy

Email
BFoxworth34@gmail.com

Cell Phone
(650) 851-8433

Home Phone

Street
977 Santa Maria Avenue

Apt/Unit/Suite Number

City  Portola Valley
State  CA
Zip Code  94028

County
San Mateo County

Ownership:
● Individual
○ Trust
○ Entity (LLC, Corp, Other)

REMOVE

620

GENERATE OFFER — 630

ADD BUYER 2 — 634

1120 Rose Avenue ○ Mark Stevens ▽

Cover sheet

Cover Sheet ⊘
Cover Letter
Documents
Proof of Funds
Signed Disclosures
Pre Qual
Purchase Services
Marketing Services Selling Agent(s) Information

Mark Stevens
mstevens@gmail.com

Reside Real Estate
02014153
Edit

[ADD CO-SELLING AGENT]

Buyer(s) Information

Bradley Foxworthy
BFoxworth34@gmail.com (650) 851-8433
977 Santa Maria Avenue
Portola Valley, CA 94028
Edit

[ADD BUYER 2]

Contract Date

Contract Date
Monday, March 12th 2018

Property Information

Property Being Sold
MLS Select         MLS
MLS            Number
Listings       10467249
APN Number
189-23-023
Street
1120 Rose Avenue                                  — MLS AUTOFILL
Apt/Unit/Suite
Number
City                State           Zip Code
Mountain View   CA          94040
County
San Mateo County

Listing Agent(s) Information

Jack Barter
JBarter@gmail.com
(408) 876-5432

191000639
BarterAndCompany
19100639
         Edit

[ADD CO-LISTING AGENT]

🏠
[GENERATE]

- Cover Sheet
- Cover Letter
- Documents
- Proof of Funds
- Signed Disclosures
- Pre Qual
- Purchase Services
- Marketing Services ○ Mark Stevens ▷

Documents

Choose a Template | Required

○ Residential SFR & Condo    ● Residential SFR & Condo    ○ Probate
○ Manufactured Home          ○ Residential Income          ○ Vacant Land
○ Commercial 🔍 Search documents...

☐ 1031 Exchange BES                      ☐ Common Interest Development ...      ☐ PRBS
☐ Add Info Regarding Termin...           ☐ Common Interest Subdiv. Suppl...     ☒ PRBS
☐ Addendum                               ☐ Condominium Conversion Sub...        ☐ Pre Move Out Inspection
☐ Addendum PRDS                          ☐ Confidentiality and Non Disclos ...  ☐ Probate Advisory PA
☐ Addendum Regarding Repairs             ☐ Confirmation REA Relationship        ☐ Probate Purchase Agreement
☐ Additional Agent Ackn AAA...           ☐ Consent for Communications           ☐ Propane Tank Addendum...
☐ Agency Disclosure AD                   ☐ Court Confirmation Addendum...       ☐ Receipt for Reports RFR
☒ Agency Disclosure AD                   ☐ Delivery of Notices Addendum DNA     ☐ Receipt for Septic Pamphlet GENERATE OFFER                                                                  GENERATE DOCUMENTS

Dear Seller Family,

Thank you for the opportunity to see and appreciate your beautiful home.

We would like to introduce ourselves and share some family history. My name is Bradley Foxworthy. We worked in the family oriented retail clothing business, serving mid-peninsula families since 1951. My grandfather, Aston Foxworthy, came to California in the late 1940's from England. To design and sew clothing for Levi jeans. In the early 1950's, he opened a small family-oriented department store in downtown San Jose. My father took over the business in the 1970's. I have been working as a designer since 2008.

Last year, I was blessed to marry Barbara Wong Martinez. Your beautiful home has just enough space for us. It would be perfect for us to start the family and for Barbara to develop her Spanish-styled leather purses she dreams about. We both like art and the friendly neighborhood in Mountain View.

We have completely fallen in love with your home. It would also be a good commute to our family's downtown store and close to my parent's house.

We would be honored to live in your home and appreciate your consideration.

Sincerely,

Bradley and Barbara Foxworthy

Care of:

Agent: Mark Stevens
Reside Real Estate
465 Brannan St.
San Francisco, CA 94107

BUYER'S INSPECTION ELECTIONS

Property Address: 1120 Rose Avenue, Mountain View, CA 94040 ("Property")

D. BUYER INSPECTION ELECTION: Buyer represents and agrees that Buyer independently considered the available Inspections and at this time has decided to order only those Inspections selected "Yes" below.

681

| | | | | | |
|---|---|---|---|---|---|
| 1. ☐ Yes ☐ No | General Home Inspection | 20. ☐ Yes ☐ No | Tree/Arborist |
| 2. ☐ Yes ☐ No | Wood Destroying Pests | 21. ☐ Yes ☐ No | Well |
| 3. ☐ Yes ☐ No | Chimney | 22. ☐ Yes ☐ No | Water Systems |
| 4. ☐ Yes ☐ No | Electrical | 23. ☐ Yes ☐ No | Radon Gas |
| 5. ☐ Yes ☐ No | Heating | 24. ☐ Yes ☐ No | Formaldehyde |
| 6. ☐ Yes ☐ No | Lead Paint | 25. ☐ Yes ☐ No | Asbestos |
| 7. ☐ Yes ☐ No | Plumbing | 26. ☐ Yes ☐ No | Methane Gas |
| 8. ☐ Yes ☐ No | Square Footage | 27. ☐ Yes ☐ No | Mold |
| 9. ☐ Yes ☐ No | Structural | 28. ☐ Yes ☐ No | Permits |
| 10. ☐ Yes ☐ No | Easements | 29. ☐ Yes ☐ No | Public Records |
| 11. ☐ Yes ☐ No | Foundation | 30. ☐ Yes ☐ No | Zoning |
| 12. ☐ Yes ☐ No | Lot Size | 31. ☐ Yes ☐ No | Gov. Requirements |
| 13. ☐ Yes ☐ No | Boundaries | 32. ☐ Yes ☐ No | Vacant Land |
| 14. ☐ Yes ☐ No | Pool/SPA | 33. ☐ Yes ☐ No | Construction Costs |
| 15. ☐ Yes ☐ No | Roof | 34. ☐ Yes ☐ No | Availab. of Utilities |
| 16. ☐ Yes ☐ No | Sewer | 35. ☐ Yes ☐ No | Environm. Survey |
| 17. ☐ Yes ☐ No | Septic System | 36. ☐ Yes ☐ No | Hazards Reports |
| 18. ☐ Yes ☐ No | Soil Stability | 37. ☐ Yes ☐ No | Subdiv. of Prop. |
| 19. ☐ Yes ☐ No | Survey | | |
| ☐ Yes ☐ No | Other: | | |

682 — Sign    Date Signed

Buyer [Bradley Foxworthy]   Date          Buyer                    Date

EXIT DOCUMENT  < PREVIOUS   NEXT DOCUMENT >

1120 Rose Avenue — Mark Stevens

- Cover Sheet
- Cover Letter
- Documents
- Proof of Funds
- Signed Disclosures
- Pre Qual
- Purchase Services
- Marketing Services

691

Home Inspector [Not Requested] — 694

AUTOFILL — 695

HOME INSPECTION FORM

Select home Inspection* — 696
A+ Home Inspection Service

NEW VENDOR — 297

Are there any detached structures?* — 698
No

If condo or town house, do you want the exterior inspected?*

PROPERTY ACCESS INFORMATION — 699

Property is*
- ◉ Client Occupied
- ○ Tenant Occupied    700
- ○ Vacant

Who will be providing access to the property?* — 701
BarterAndCompany Real Estate Is there a lockbox? If yes, what is the code? — 702
Yes - - agent will be there Is there a gate code? If yes, what is the code? — 703
No

CLOSE    SUBMIT — 704

Termite Inspector [Not Requested] — 705

ADD REQUEST

707

692

GENERATE OFFER

| | 1120 Rose Avenue | |
|---|---|---|
| | Home Inspector [Requested] | |
| Cover Sheet ⊘ | Your TC is working on your order! Look out for emails from her/him.<br>tc@resideebrokerage.com<br>888-123-3156<br>If you need to make any changes, please update the form and resubmit.<br>Once the request is "In Process" you will not able to make changes to this for,<br>and will need to contact your TC. | |
| Cover Letter ⊘ | | ─ 714 |
| Documents | | |
| Proof of Funds | ─ 715<br>SCHEDULING INFORMATION | |
| Signed Disclosures | 716<br>Due by<br>March 27, 2018 | |
| Pre Qual | | |
| Purchase Services | Save at least one time slot<br>Choose day(s) | |
| Marketing Services | (Sun) (Mon) Tue (Wed) (Thu) (Fri) (Sat) ⎬ 717 | |
| 718 | Choose Time(s)<br>[8-11 AM] [11-2 PM] [2-5 PM] [5-8 PM]  [SAVE] ⎯ 319 | ─ 712 |
| | Preference 1: Day(s):    Time(s)<br>                 Monday   8-11 AM ⎬ 720<br>> Preference 2: Day(s):    Time(s)<br>                 Tuesday  11-2 PM 🗑<br>Preference 3: None<br>                            ─ 721<br>ADDITIONAL INFORMATION | |

Home Warranty [Draft]  
[AUTOFILL]

733
HOME WARRANTY INFORMATION

Who would like to order from?* ⟵ 734  
American Home Shield  [▼]  [NEW VENDOR]

735
Home Warranty Type*
- ○ Standard
- ⦿ Upgraded  ⟵ 736

Does the Property has AC?*
- ○ Yes
- ⦿ No

737
Property Amenities (Select all that apply)?*
- ☑ Fridge
- ☑ Washer/Dryer
- ☑ Roof Coverage
- ☐ Pool/Spa

738
SCHEDULING INFORMATION

Due by  
March 31, 2018  ⟵ 739

Save at least one time slot ⟵ 740  
Choose day(s)

( Sun ) ( Mon ) ( Tue ) ( Wed ) ( Thu ) ( Fri ) ( Sat )

741 ⟶ Choose Time(s)

742 ⟶ [8-11 AM] [11-2 PM] [2-5 PM] [5-8 PM]  [SAVE]

Preference 1: Day(s):  Time(s):  
  Monday  8-11 AM

CLOSE  [SUBMIT] ⟵ 746

Termite Inspector  [Not Requested]  ▼

ADD REQUEST ⌄

Home Inspector  [Requested]  ▼

COMPUTER-IMPLEMENTED DOCUMENT TRANSFORMATION SYSTEMS AND METHODS

CROSS-REFERENCE TO RELATED APPLICATION(S)

This application claims the benefit of priority to U.S. application Ser. No. 18/333,387, filed Jun. 12, 2023, U.S. application Ser. No. 17/978,034, filed Oct. 31, 2022, now U.S. Pat. No. 11,676,229, U.S. application Ser. No. 17/498,513, filed Oct. 11, 2021, now U.S. Pat. No. 11,488,269, U.S. application Ser. No. 16/560,976, filed Sep. 4, 2019, now U.S. Pat. No. 11,145,017, U.S. application Ser. No. 17/751,387, filed May 23, 2022, U.S. application Ser. No. 16/560,982, filed Sep. 4, 2019, now U.S. Pat. No. 11,341,102, U.S. application Ser. No. 18/453,246, filed Aug. 21, 2023, U.S. application Ser. No. 17/728,755, filed Apr. 25, 2022, now U.S. Pat. No. 11,734,781, U.S. application Ser. No. 16/560,988, filed Sep. 4, 2019, now U.S. Pat. No. 11,314,699, U.S. application Ser. No. 18/460,388, filed Sep. 1, 2023, U.S. application Ser. No. 17/577,179, filed Jan. 17, 2022, now U.S. Pat. No. 11,748,831, U.S. application Ser. No. 16/560,984, filed Sep. 4, 2019, now U.S. Pat. No. 11,227,350, U.S. application Ser. No. 16/560,966, filed Sep. 4, 2019, U.S. application Ser. No. 16/560,971, filed Sep. 4, 2019, U.S. application Ser. No. 18/497,981, filed Oct. 30, 2023, U.S. application Ser. No. 16/560,980, filed Sep. 4, 2019, now U.S. Pat. No. 11,803,923, U.S. application Ser. No. 17/683,177, filed Feb. 28, 2022, U.S. application Ser. No. 16/560,964, filed Sep. 4, 2019, now U.S. Pat. No. 11,263,395, U.S. application Ser. No. 18/154,583, filed Jan. 13, 2023, U.S. application Ser. No. 16/560,973, filed Sep. 4, 2019, now U.S. Pat. No. 11,557,011, and U.S. Provisional Application No. 62/728,051, filed Sep. 6, 2018, the contents are each of which are hereby incorporated by reference in their entireties for all purposes as if set forth fully herein. Any and all applications for which a foreign or domestic priority claim is identified in the Application Data Sheet as filed with the present application are hereby incorporated by reference under 37 CFR 1.57.

TECHNICAL FIELD

This application relates in general to identifying, transforming, managing, and/or populating documents, and in particular to a blockchain-based system and method for listing document transformation and accountability. Some embodiments relate to a multi-tier blockchain-based system and method for listing document transformation and accountability. Some embodiments relate to document transformation and maintenance, and in particular to a single-tier blockchain-based system and method for document transformation and accountability. Some embodiments relate to document transformation and maintenance, and in particular to a single-tier blockchain-based system and method for document transformation and accountability via different node types. Some embodiments related to identifying and populating documents, and in particular to a system and method for document grouping and transformation. Some embodiments related to identifying and populating documents, and in particular to a system and method for purchase document transformation and compliance.

BACKGROUND

Real estate purchases and sales are the largest financial transactions and investments for many people, especially with the increasing cost of real estate. Due to the cost and time required for a real estate transaction, many individuals are infrequently involved in such transactions and may not be familiar with regulations governing the transactions and issues that can arise. Additionally, real estate transactions are complex and involve many details and issues. Accordingly, many purchasers and buyers choose to hire a knowledgeable advocate to assist with the transaction, including a real estate agent, broker, or lawyer. Real estate agents and brokers can provide a party to such transaction with useful information, including options and risks regarding the transaction. Further, agents and brokers have legal and financial responsibilities to ensure that a transaction is successfully performed and that the transaction complies with all applicable guidelines and regulations.

In the 1980s, state licensing officials and trade organizations recommended changes to then-existing practices, which were more oriented to the interests of property sellers than property buyers. Seeking more protection, buyers began requesting equal representation. Today, transactions often include a "Listing Agent" representing the seller, and a "Selling Agent" or "Buying Agent" representing the buyer. Hereinafter, the phrases "selling agent" and "buying agent" are used interchangeably with the same intended meaning, unless otherwise indicating. The buying agent provides advice and counseling to the buyer, independent of the interests of the property seller.

For agents and brokers, the challenges of the real estate business have increased dramatically. Agents and brokers have always had legal and financial responsibilities to represent and inform their clients' interests, but the regulatory requirements have become more onerous, time-consuming, and complex. The professional requirements and practices for real estate transactions are established by communities. Working with professional boards and the Bureau of Real Estate, communities establish regulations for required documentation and best practices. Regional requirements have become more demanding. As the number of documents and procedures has increased, compliance has become more difficult and error prone. Failure to comply with all of the regulations can expose real estate brokers and agents to costly litigation and potentially invalidate real estate transactions.

Over the years, the amount of documentation involved in supporting real estate transactions and financing of such transactions has grown. The required documents have become increasingly numerous and complex, and assuring compliance has become more difficult. The documentation requirements generally differ from one community to another, so agents and brokers must pay attention to the differences in local regulations. They must also keep up with changes in the regulations for all of the relevant governing bodies for every transaction. Also, governing bodies are overlapping and any transaction occurring within the jurisdiction of both governing bodies, must comply with the regulations of the governing bodies. For example, there are often separate regulations for a neighborhood, city, county and state in which a piece of property is located.

Ensuring compliance with all guidelines and regulations can be time consuming and difficult. However, failure to comply with the regulations can potentially invalidate real estate transactions and can expose real estate brokers and agents to litigation and possible liability for failed transactions. In addition to the property transaction itself, buying agents that represent buyers, must also perform and coordinate other activities and actions to help the seller prepare the property for sale and/or to formalize the relationship.

When a buyer decides to work with a particular agent, the buyer signs an agreement with that selling agent. The agreement lists the legal responsibilities of the buyer and buying agent, including full disclosure of useful information, accounting on all matters, confidentiality in all matters, recognizing and upholding the buyer's needs, and negotiating a best price for the buyer. Once the agreement is formalized, the selling agent is responsible for finding properties on the market that are of interest to the buyer, regardless of whether the properties are listed with a multiple listing service. Specifically, the selling agent identifies properties that are within a region and price range specified by the buyer and gathers information about neighborhoods and visiting the prospective properties, as well as showing the properties. Locating a property for which the buyer wants to place an offer can include identifying, notifying, and showing available properties for sale that are within most of the parameters set by the buyer. Further, preparing an offer for a property for sale can include an appropriate and competitive offer price, a timeline for closing on the property if the offer is accepted, and whether inspections are requested, among other tasks. The selling agent can prepare the appropriate documents for providing to the seller's agent. Failure to comply with the selling agent's obligations and responsibilities can result in the loss of clients or property sales.

Ensuring compliance with all guidelines and regulations can be time consuming and difficult. However, failure to comply with the regulations can potentially invalidate real estate transactions and can expose real estate brokers and agents to litigation and possible liability for failed transactions. In addition to the property transaction itself, listing agents (e.g., that represent individuals or entities selling property) must also perform and coordinate other activities and actions to help the seller prepare the property for sale. The listing agent is generally the first real estate agent involved in a real estate sale and can represent the seller.

Preparing a property for sale can include painting, removing client belongings, staging the property with sample furniture and decoration, and yard work. Often times, the listing agent is tasked with identifying any work that should or must be performed on the property, as well as finding experts or service providers to perform the identified work.

Currently, most real estate transactions are preformed manually, requiring an individual, such as an agent or broker, to identify, collect, and populate documents required to complete a real estate transaction. The agent or broker must also ensure that the documents contain any updates and are correctly populated. Such manual tasks can be time consuming due to a number of documents required and the different requirements established by differing regulations between governing bodies.

The manual process for real estate transactions is prone to several sources of compliance errors as real estate agents and brokers prepare document packages for real estate transactions. Such errors and other failures to comply with the required regulations can invalidate a transaction and can expose agents and brokers to costly litigation, as well as stain a reputation of the agent or broker. Challenges associated with the manual process for real estate transactions that make manual compliance difficult and error prone include large numbers of documents, different regulations and rules for different locations, and new information that becomes available during the transaction, which must be identified and included in the documents.

Additionally, real estate brokers and agents representing clients are expected to oversee the checking of real estate records, such as via a title company. Due diligence includes checking public records to verify that the person selling the property is the last recorded owner and that there are no gaps in the history. For instance, in the United States, counties maintain land records and file records of new transactions. Typically, the county clerk maintains a database of property records and the history of the transfer of property from one owner to the next is knowns as a chain of title. Although the law does not require that deeds be filed with the county, in some areas, there may be consequences for not filing. If a deed is not recorded, this creates a missing link in the chain of title in the public record. In most jurisdictions, if a title dispute turns into a lawsuit, the most recently filed deed on record typically takes precedence over a deed that has not been recorded.

Property transactions also include other important information that is part of the public record, including records of easements. A right-of-way easement grants other designated groups of people specific kinds of access to the property. For example, owners may be required to grant neighbors the right to travel over their land or they may be required to give the gas company the right to access a pipe buried on their land. A property easement is recorded with the county. Similarly, a right-of-way grant may give an owner access to a neighboring property. For example, the driveway to an owner's property may not be entirely on the owner's land. The grant may involve some responsibilities, such as mowing or maintaining the land. A buyer of property may discover a right-of-way grant that has gone through multiple previous owners.

A property seller usually receives a payment or "consideration" in exchange for granting a transfer of ownership. If the buyer is taking out a mortgage to buy property, then a lender will be involved. Lenders require clear title and typically require title insurance. Title insurance insures against financial loss from defects in title to real property and from the invalidity or unenforceability of mortgage loans. If the property owner has had others work on the property and has not paid them, there may be liens or debts on the property which need to be resolved when a property is sold.

In summary, real estate transactions require much checking before a title should be transferred or moneys should be exchanged. Often considerable money is at stake. These factors create a large and ongoing need for accountability and transparency in the documentation and processes of real estate transactions. Real estate agents and brokers must ensure that the document packages are correctly and carefully generated, and title for the property of the transaction is clear. Such errors and other failures to comply with the required regulations can invalidate a transaction and can expose agents and brokers to costly litigation, as well as stain a reputation of the agent or broker.

Further, real estate agents are also responsible for making a series of judgement calls about services and advice offered to clients, in addition to ensuring due diligence has been performed. For instance, should a house be staged as part of its marketing plan or should the sellers invest in refurbishing the kitchen, leaving as is, or remodeling completely. Further questions, such as should sellers accept an early but low-seeming offer or hold out for a better offer, or should they agree to expensive fix-up requests from a potential buyer, are also common, as well as questions, such as did the listing agent inform and gain the consent of the sellers about particular courses of action or services provided, or did the listing agent adequately advise the sellers about the relative risks of one course of action over another?

When buyers decide to work with a buying agent to potentially purchase a property, an agreement with the buying agent is signed. The agreement provides the legal responsibilities between the property buyer and the buying agent, such as full disclosure of information, accounting on all matter, confidentiality in all matters, recognizing and upholding the buyer's needs, and negotiating a best price for the buyer. When working with their clients, the potentials purchasers, buying agents perform purchase services, including locating potential properties, investigating properties, developing terms for offers, packaging offers, responding to counter offers, and recommending and outsourcing selling services, as well as transaction oversight and scheduling. The buyer client relies on the buying agent to provide information about the services and to ensure that the services are performed. Further, the agent advises the buyer possible issues or doubts related to the title, such as a issues of ownership, encumbrances, liens, taxes due, easements, and any issues about the neighborhood or trends.

Documentation about the professional performance of listing and/or buying agents is generally outside the scope of government-held public record systems and mostly covers information about the services performed by the listing and/or buying agent. The relationship between the listing agent and the seller and/or the buying agent and the buyer is covered by a signed contract and the body of collected information includes personal information about the seller and/or buyer that is held or needs to be held confidentially.

In the event that issues arise after the sale, preserving information about listing services and/or purchase services can be important for the seller, buyer, listing agent, buying agent, and sometimes other stakeholders, such as the brokerage. In current practice, the records containing this information are generated and preserved by multiple different sources including records kept by the buyer, records kept by the seller, records kept by the selling broker or selling agent, records kept by the buying broker or buying agent, records from financial institutions, reports from inspectors, reports from real estate researchers, and others. If after the sale the seller, buyer, or other stakeholders need to reexamine a transaction, they will want to retrieve documentation about what was known or done while the transaction was being developed and negotiated. Accordingly, the many manual steps and the use of separate databases of records across institutions increase errors and raise costs of real estate transactions.

In recent years, news reports from many sectors of society have led to increased public awareness about society's vulnerability to computer failures. The news media frequently report on cyberattacks, identity theft and data loss as well as data leaks, threats to information infrastructure, and privacy concerns. Governments have become more concerned and active in trying to protect and regulate computer systems. At the same time, the public use and dependence on the internet has raised general expectations that computer services should be rapid, accurate and reliable and that important government-maintained public records should have appropriate transparency for public use.

To support the incontrovertible associations of property assets with their legal titles, both the public and stakeholder transaction documents for real estate transactions need to accurately and transparently represent and immutably preserve enduring property and transaction information. Trust and reliability in real estate transactions depend on the certainty that everything is accounted for. However, the current foundations for keeping records of real estate transactions rely on an aging and fragmented set of institutions and legacy computer systems that were created before modern computer safeguards were understood and made widely available.

An institutional challenge of the current approach is that the diverse records concerning real estate transactions, such as county property records logs, financial records, title records, and so on are held by multiple and diverse institutions, in diverse and varied formats on computer systems with widely varying security procedures, transparency, and provisions for public access. Every stakeholder institution has its own data security procedures and its own policies regarding data backup and use of redundancy for security and is potentially and individually vulnerable to human and computer-based tampering. There is much room for improvement in creating systems with comprehensive access, tamperproof guarantees and validity checks, and robust archiving for all of the historic records in property transactions.

Real estate agents and brokers need to cope with a myriad of stakeholder institutions with their legacy data bases and transaction-supporting processes that evolved in an ad hoc fashion as institutions adapted computers to support their businesses and daily activities. There is a growing gap between stakeholders' experience of real estate transactions and growing public expectations for instantaneous and reliable access to public records including records of property ownership. The challenges of compliance and transparency and enduring accountability today also create unnecessarily high costs for real estate transactions. Further, although the stakeholder institutions in real estate transactions use computers and communication devices for messaging in the back-office work of supporting real estate transactions, most of the work is manual, time-consuming, error-prone, and expensive.

Blockchain is a continuously growing set of record or "blocks" that form a ledger of transactions. The blocks are linked and secured by cryptographic methods and provide an approach that is trustworthy and transparent for the storage of the blocks. At least one county, Cook County, Ill., has utilized blockchain technology to transfer and track property titles. See, https://www.forbes.com/sites/forbesrealestatecouncil/2018/01/12/three-ways-blockchain-could-transform-real-estate-in-2018/#2ef0cd403638 (Jan. 12, 2018). Upon purchase of property in Cook County, the purchaser receives a digital token and a traditional paper deed. Documents that accompany the digital token can be used as proof of ownership. The approach by Cook County utilizes a Colored Coins protocol, which is built over the Bitcoin blockchain to allow the digital tokens to be generated. See Yarbrough, Karen A., Blockchain Pilot Program Final Report (May 30, 2017). However, such approach by Cook County fails to address the scalability problem of continuous property transactions and lack of storage space for the transactions, and fails to include a two-tier blockchain approach. A two-tier blockchain can be for publicly accessible and non-publicly accessible documents.

Further, other possibilities of blockchain utilized in the real estate industry include recording key terms of a lease agreement on the blockchain and initiating payment of a security deposit and rent through Bitcoin wallets or bank accounts. See https://www2.deloitte.com/content/dam/Deloitte/us/Documents/financial-services/us-dcfs-blockchain-in-cre-the-future-is-here.pdf (downloaded Jul. 12, 2011). Possession of the property is transferred to the purchaser and the agreement is recorded. However, no details regarding how such steps are performed on the blockchain are provided. Further, no distinction is made between publicly accessible and non-publicly accessible documents.

However, automation of real estate transactions has been attempted. For example, U.S. Pat. No. 9,330,375 covers loading virtual forms with selected properties. The virtual forms are electronic documents designed to have the appearance of standard real estate contract forms and act as placeholder documents into which data from a warehouse is inserted. However, such data insertion fails to include checking of the data to ensure compliance, correctness, completeness, and consistency of the data being inserted.

U.S. Pat. No. 8,423,469 covers a simplified loan process for a real estate transaction that is provided for the buyer based on unified communication between the buyer, relator, and mortgage originator and fails to cover transforming document to ensure complete, correct, consistent, and compliant data population.

U.S. Pat. No. 8,442,906 covers automating the performance and processing of tasks associated with a home sale or mortgage origination by making available pricing information matching real estate pricing criteria and generated loan information to a buyer. However, such automation of task processing fails to consider methods for ensuring data associated with the home sale or mortgage origination is complete, correct, consistent, and compliant.

U.S. Pat. No. 7,640,204 covers a digital marketplace in which real estate members can interact and facilitate transactions by exchanging accurate and standardized information. The marketplace can include survey and transaction tools, as well as tour scheduling. Thus, the marketplace fails to include document transformation via population and data checking.

U.S. Pat. No. 6,684,196 covers facilitating real property transactions between a buyer and seller by providing real estate services to facilitate a negotiation related to the transaction, rather than populating documents and checking for data completeness, consistency, correctness, and compliance.

U.S. Pat. No. 6,321,202 covers managing real estate transactions, including accessing vendor data based upon a phase of a real estate transaction and providing the vendor data to a contact upon the occurrence of the real estate transaction phase. Thus, the communication of data focuses on building relationships in real estate transactions, rather than document transformation based on a set of rules and checking data of the documents.

Further, U.S. Pat. No. 9,672,524 covers managing data related to a corporate entity to enhance retrieval of the documents database using tags. However, the retrieval enhancement fails to consider or include data population and checking.

Therefore, a need remains for assuring transparency and accountability for property ownership records and other real estate transaction information (e.g., for both publicly accessible and non-publicly accessible documents), while addressing the scalability problem of continuous property transactions and lack of storage space for the transactions. A need remains for improving processing of a computer to be able to automatically transform documents by changing a form of the documents based on received data, and identify errors and ensure compliance of data between different documents by checking for document completeness, consistency, correctness, and confirmation of data populating the documents.

SUMMARY

Real estate brokers manage and drive real estate transactions. Brokers try to provide services that meet the best needs of their clients while dealing with the business challenges of complying with all governing regulations over real estate transactions, achieving transparent and enduring accountability over a diverse set of documentation, and coordinating multiple parties and containing the unnecessarily high costs of business. Transactions and their document packages must be compliant with all governing regulations. Real estate regulations vary by region, with requirements at each level including federal, state, county, city, and sometimes neighborhood. Failure to comply with the regulations can potentially invalidate real estate transactions and can expose real estate brokers and agents to costly litigation. With today's complexity in regulations for real estate transactions and documentation, there is a substantial risk of human error. This situation has created a growing and unmet need for technological support and services for assuring document compliance for brokers and agents.

Real estate agents and brokers need to cope with a myriad of stakeholder institutions with their legacy data bases and transaction-supporting processes that evolved in an ad hoc fashion as institutions adapted computers to support their businesses and daily activities. There is a growing gap between stakeholders' experience of real estate transactions and growing public expectations for instantaneous and reliable access to public records including records of property ownership. Further yet, listing agents and/or buying agents must make many important decisions while representing a seller and/or a buyer and such information surrounding an agent's decisions and actions are generally maintained by multiple sources, including the agent himself, the client, and/or the brokerage. However, accurately and safely maintaining the confidential information is important in case of a dispute between the agent and the client. The challenges of compliance and transparent and enduring accountability today also create unnecessarily high costs for real estate transactions. This situation has created a growing and unmet need for technological support and services for assuring enduring transparency and accountability for transaction information.

Real estate transactions can be extremely complex and generally require many documents for review and execution to formalize the transaction. Currently, such transactions are performed manually via a real estate agent or broker that fills out each document. However, manual processing of the documents often results in inconsistencies of data across the documents, incorrect data values based on a failure to identify and enter updated values, data values that are not compliant with local regulations, and other errors. Ensuring the correctness of the documents is extremely important because errors in the documents may invalidate the associated real estate transaction. Representations of documents that enable both human usability and automation by allowing data entry and automated checking of the data helps ensure data completeness, consistency, compliance, and correctness of the documents. Specifically, an automated clearing house (ACH) for listing services and assuring compliance is provided. The ACH serves listing agents, buying agents, sellers, buyers, and other participants in real estate transactions including stakeholders from outsourced services. Additionally, support is provided to listing agents and/or buying agents in particular and their relationship to their clients—in regard to the contractually-mandated and professional responsibilities and services to their seller clients as a listing agent and/or their buying clients as a buying agent.

Further, ensuring that the real estate transactions are transparent and accurate is extremely important. A specialized version of a blockchain approach is tailored to support real estate transactions. By design, certified copies of all of the important records of a transaction are brought together in a real estate transaction block and recorded in a blockchain ledger with a timestamp. All of the documents for a transaction are available at once in a single block on a blockchain.

Using blockchain, both public real estate transaction information and confidential records of listing services can be provided. With respect to managing public real estate transaction information, an accurate, reliable, and tamperproof publicly-accessible record of the pertinent public information about real estate transactions is provided. This blockchain-based service serves the general public. With respect to managing confidential records of listing and/or purchase services, documenting and preserving a long-term private record of services and service choices offered by the listing agent and/or buying agent is provided, discussed with the sellers and/or buyers, and ultimately performed. This service is for reliable, long-term and authorized access to confidential information about contracts, listing services, and/or buying services for particular transactions.

Accordingly, automating purchase services, including packaging of an offer, and performing compliance checking on the offer helps prevent unintended error and failure of the transaction. Further, during a transaction of real estate, some documents are required for recordation of a completed transaction, while other documents generated, reviewed, or transferred during the transaction are not necessary for recordation, but can be helpful to an agent or client of the agent if a dispute regarding the transaction later arises. Thus, separately managing public and private documents for the transaction is important to preserve both sets of documents. The private or confidential records can focus on actions performed by the buying agent and buyer, the listing agent and seller, correspondence between an agent and a buyer or seller, and listing of properties viewed or considered by the buyer.

A blockchain-based method for purchase document transformation and accountability is provided. Offer documents for a real estate transaction are maintained and a review of the documents is performed by comparing populated fields of each document with predetermined offer compliance guidelines via compliance logic. When the fields of the offer documents comply with the predetermined offer compliance guidelines, the offer documents are grouped as an offer for the transaction. Public and private documents from the offer are formed as separate data blocks, which are provided to a tier of supernodes.

Each data block is added to a ledger of transactions via one of the supernodes. A copy of each data block is stored on each of the supernodes. AN immutable record of each data block is transmitted from the supernode to a tier of network nodes and the immutable record of each data block is committed to a blockchain via each of the network nodes.

A system and method that includes document transformation and compliance checking, while managing public and confidential documents solves problems for multiple sets of stakeholders. For agents (e.g., listing agents), the documents and contracts for real estate (e.g., listing) transactions are confirmed to meet regulatory compliance requirements, while helping the agents to coordinate and manage the performance of an extended group of stakeholders including the clients, outsourced listing and marketing services, government and financial institutions, and the real estate brokerage staff. For the community, long-term reliability, security, and accessibility of real estate transaction records are improved and a reliable record of the chain of title of real property is provided. For authorized stakeholders in each real estate transaction, reliable, tamperproof access to confidential information about the transaction is provided.

A blockchain-based method for listing document transformation and accountability is provided. Listing documents are selected from a library for a property listing. Data values are received via at least one of the listing documents. Relevant data fields within at least one listing document is updated with the received data values. Disclosure information regarding the property is received and further listing documents are added to the listing documents based on the disclosure information to form an active document set. Listing compliance rules are applied to the set of active documents to determine compliance. The active documents are recorded as a data block and provided to a tier of supernodes. The data block is added to a ledger of transactions via one of the supernodes. A copy of the data block is stored on each supernode. An immutable record of the data block is committed to a further tier of nodes.

A blockchain-based method for document transformation and accountability is provided. Document templates for real property transfer are maintained. Each template includes data fields each associated with a data field identifier. A subset of the document templates is collected as transaction documents for a transaction for the transfer of real property. The data fields of the transaction documents are populated with received data values via the data field identifiers of the data fields. Compliance checking is performed on the populated data values. The transaction documents are provided to a network having a first tier of network nodes and a second tier of supernodes. One of the supernodes is selected to validate the transaction documents. The validated transaction documents are added to a ledger of transactions and an immutable summary record, such as a cryptographic hash, of the validated transaction documents is transmitted to the first tier. Other types of immutable summary records are possible. At a minimum, the immutable summary record should be deterministic, short in length, such as a fixed-length, computable, and uncorrelated with hash values of related text. One of the network nodes is selected to commit the summary record of the validated transaction documents to a blockchain of the first tier. The record of the validated transaction documents is committed to copies of the blockchain stored by the other network nodes in the first tier.

An embodiment provides a system and method for document transformation and compliance. Document templates relating to real estate are maintained and each template includes a plurality of data fields each associated with a data field identifier. The data field identifiers for the same data fields in different documents are the same. Data values are received in one or more of the data fields of at least one document template. The data values are linked to the data fields into which the data values are received via the data field identifiers for those data fields. A property address is received and a subset of the document templates are retrieved as active documents for a transaction of the property based on the received property address and factors describing the type of property transaction. The active documents are populated with those data fields that are associated with the linked data values via the data field identifiers. A set of compliance rules is determined based on the property address and compliance checking of the populated data values in the active documents is performed using the compliance rule set.

A further embodiment provides a system and method for listing document transformation and compliance are provided. Listing documents each include data fields. Each data field is associated with a machine readable data field identifier to populate a human readable value into that data field. Data values for a listing transaction of a real estate property are received in the data fields. A set of the listing documents is selected based on the received data values. Disclosure information regarding the real estate property is received and further listing documents are accessed based on the disclosure information. The further listing documents are added to the set of listing documents. A set of listing compliance rules is applied to the set of listing documents to determine whether the listing documents in the set comply with the listing compliance rules.

A further embodiment provides a multi-tier blockchain-based method for document transformation and accountability. A set of transaction documents for transfer of real property is received. At least a portion of the transaction documents is processed by providing the transaction documents to a tier of supernodes and selecting one of the supernodes. The transaction documents are added via the selected supernode to a blockchain maintained by each supernode. An immutable record of the transaction documents is transmitted from the selected supernode toa different tier of network nodes. One of the net nodes is identified to commit the immutable record of the transaction documents to a blockchain of the different tier. The immutable record of the transaction documents is committed to copies of the blockchain stored by other network nodes.

A further embodiments provides a single-tier blockchain-based method of document transformation and accountability. Document templates relating to a transfer or real property are maintained. Each template includes a plurality of data fields (also referred to herein as form elements) each associated with a data field identifier. A subset of the document templates is collection as transaction documents for a transaction regarding the transfer of real property. The form elements of the transaction documents are populated with received data values via the data field identifiers of the form elements. Compliance checking is performed on the populated data values of the transaction documents. A cryptographic hash of the transaction documents is provided to a single tier of network nodes. The cryptographic hash of the transaction documents is committed to blockchain copy stored by one or more of the network nodes in the single tier and the transaction documents are stores.

A further embodiment provides a single-tier blockchain-based method for document transformation and accountability via different node types. Document templates relating to a transfer of real property are maintained. Each template includes form elements each associated with a data field identifier. A subset of the document templates is collected as transaction documents for a transaction of a real property transfer. The form elements of the transaction documents are populated with received data values via the data field identifiers of the form elements. Compliance checking is performed on the populated data values of the transaction documents. A cryptographic has of the transaction documents is provided to a network of nodes, which includes nodes that store different types of data related to the transaction documents. The cryptographic hash of the transaction documents is committed to a block stored by one or more of the nodes in the network.

A further embodiment provides a system and method for purchase document transformation and compliance. Offer documents include one or more fields each associated with process logic to identify a relationship of that field to another field. Each field is associated with a machine readable value used to populate that field with a human readable data value. Data values are received for an offer transaction within at least one of the fields and a set of the offer documents are selected based on the received data values. An additional offer document is added to the offer document set based on the received data values. A review of the offer documents is performed, including comparing the fields of each offer document with predetermined offer compliance guidelines and compiling the offer documents as an offer for the offer transaction, when the fields of the offer document set comply with the predetermined guidelines.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a screenshot showing, by way of example, an interactive form for form element identifiers.

FIG. 6 is a diagram of an interactive form showing, by way of example, information for generating a data field identifier associated with a data field in a document template.

FIG. 10 is a diagram showing, by way of example, a document template library.

FIG. 15 is a diagram of a document template with data fields for property price.

FIG. 19 is a diagram showing, by way of example, a document for requesting a listing service.

FIG. 20 is a diagram showing, by way of example, a reminder notification of a listing service.

FIG. 21 is a diagram showing, by way of example, the document of FIG. 19 with listing service recommendations.

FIG. 23 is a diagram showing, by way of example, a page with a flyer.

FIG. 29 is a diagram of an interactive form showing, by way of example, a different embodiment of the cover sheet of FIG. 8.

FIG. 30 is an interactive form showing, by way of example, a comprehensive cover sheet.

FIG. 33 is a diagram showing, by way of example, a cover letter.

FIG. 34 is an interactive form for displaying a document for buyer inspection elections.

FIG. 35 is a diagram showing, by way of example, an interactive form for generating an inspection request.

FIG. 36 is a diagram showing, by way of example, an interactive form showing additional data fields for the inspection request of FIG. 31.

FIG. 37 is a diagram showing, by way of example, an interactive form for generating a home warranty.

FIG. 44 is a diagram showing, by way of example, a different embodiment of the cover sheet of FIG. 8.

FIG. 45 is an interactive form showing, by way of example, a comprehensive cover sheet.

FIG. 46 is a diagram of an interactive form for generating an offer or a counter offer.

FIG. 48 is a diagram showing, by way of example, a cover letter.

FIG. 49 is an interactive form for displaying a document for buyer inspection elections.

FIG. 50 is a diagram showing, by way of example, an interactive form for generating an inspection request.

FIG. 51 is a diagram showing, by way of example, an interactive form showing additional data fields for the inspection request of FIG. 50.

FIG. 52 is a diagram showing, by way of example, an interactive form for generating a home warranty.

DETAILED DESCRIPTION

Glossary

Figure 1:
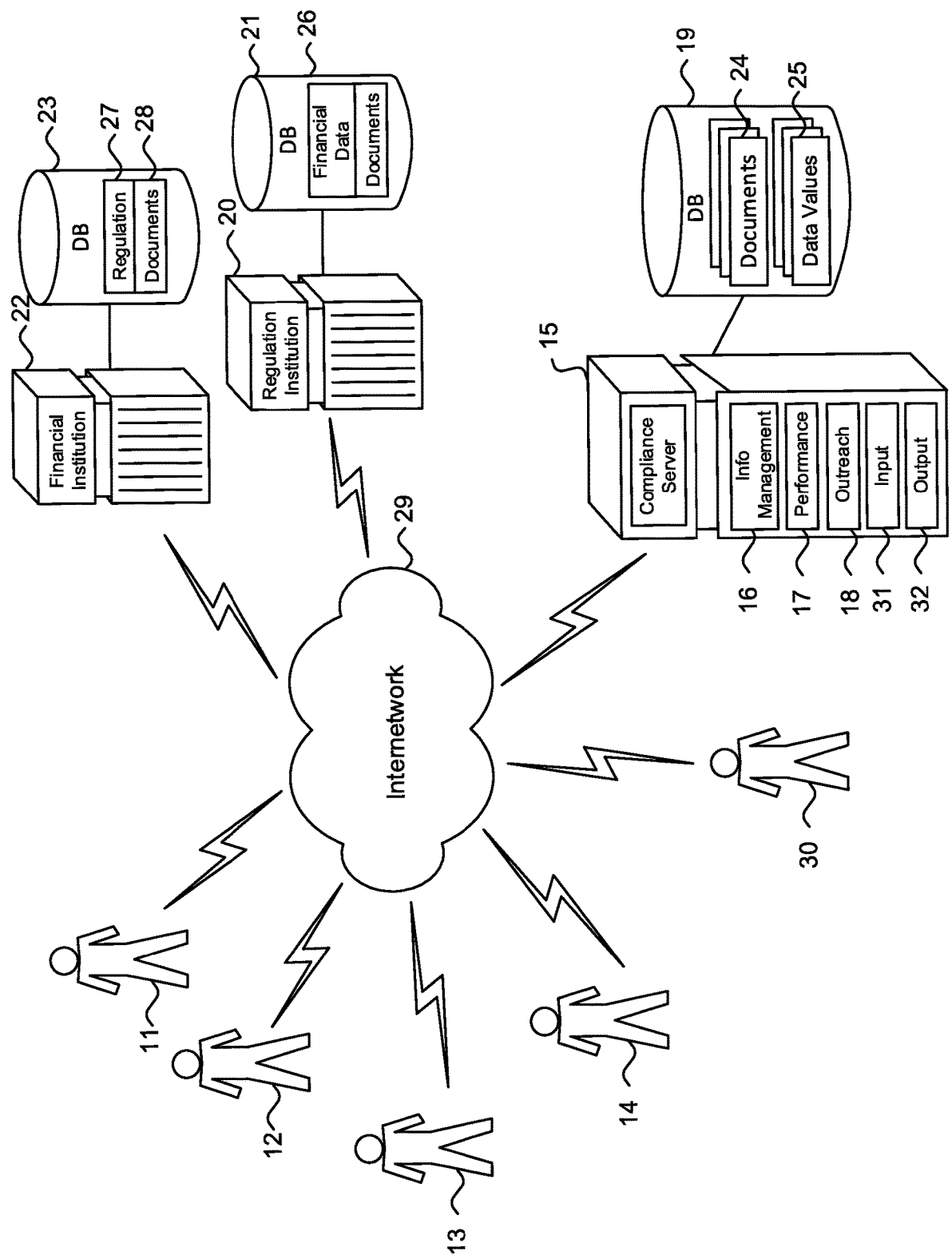
FIG. 1 is a block diagram showing a system for document grouping and transformation, in accordance with one embodiment.

Document package—a document package refers to a collection of documents prepared for, signed, and executed by parties of a real estate transaction. The package can include documents for listings or offers, including documents about real estate services performed in support of transactions, such as proofs of availability of funds, contracts with real estate agents and brokers, disclosures, inspection reports, and marketing agreements, as well as other types of documents. Different subsets of a document package may be provided to different parties of a transaction. For example, different documents are typically provided for buyers and sellers.

Completeness—testing a document package for completeness refers to automated testing to ensure that all of the required documents are included in the package and that all required fields in the documents are filled out. When specific information is provided as a value for a field, a trigger can add additional fields to the document beyond the initial fields displayed. Additionally, received data may also trigger one or more additional documents to be added to the document package.

Consistency—testing documents for consistency refers to automated testing to ensure that values of related fields in the documents are filled out in a semantically-consistent way. For example, every "initials" field for the same person should contain the same initials. Additionally, fields that have different representations for the same information (e.g. "one thousand dollars" versus $1,000.00) should have the same or compatible meanings. All related fields should convey consistent meanings.

Correctness—testing documents for correctness refers to automated verification that data values and combinations of related fields have been verified by one or more authoritative sources. For examples, entries specified for street address, City, County, State, and Zip Code correspond to a correct combination recorded by an authoritative entity. The specified street address is within the specified city, the specified city is within the specified county, the specified county is within the specified state, and the zip code corresponds properly to the combination, and the property exists. Another example is that information about a "parcel number" for a property paired with an address corresponds to county land records. Another example is a bank statement vouching for the availability of funds. There can be different requirements on what it means for a source to be "authoritative," including having a well-known identity, using secure and digitally-signed communications, meeting government-approved requirements, backing by financial guarantees, and meeting certification requirements of legal, real estate, and banking institutions.

Compliance—testing documents for compliance refers to automated testing to ensure that the data values provided in the documents and the transactions proposed comply with all legal requirements. For a successful property transaction, no required documents can be omitted and the document versions must meet current requirements. In real estate transactions, there are often multiple governing organizations, including federal, state, county, city, and sometimes local organizations such as property owner associations. State and federal laws require that purchasers of property be informed of certain conditions of the property for consumer protection. Further, governing organizations may require disclosure of the nature, limitations, and conflicts regarding the responsibilities of the real estate agents. Compliance requires that the document package be complete, consistent, and correct.

Confirmation—brokers and agents are obligated to inform their clients about important information in the transactions. Common practice for compliance for avoiding potential legal liability is to provide explicit places in the documents for dated confirmation signatures on documents and for particular data fields. The steps involved include assuring that the documents include proper places for signatures or initials and dates in the documents presented to clients and others and also checking that a document package is thoroughly checked that all required signatures or initials are properly filled out and dated by clients.

Active documents—refer to programmatically-supported information that can be presented in a human-readable and legally appropriate form ("documents") in a computational medium, with a computational substrate ("active document") that enables people to fill in or select information and to interact with it, that efficiently supports information processing of the information such as checking it for completeness, consistency, correctness, compliance and confirmation. In this way, active documents support understanding and processing of information by people and active computational agents intended to assure that a real estate transaction is compliant with requirements.

Transaction identifier—a string of numbers and/or letters that uniquely identify a specific transaction of property.

Form element—corresponds to a region on a form that takes a value from a data field.

Form element identifier—a string of numbers and/or letters that are unique to a particular form element in a document.

Form element name—a human-readable name used to describe and identify a particular form element in a document.

Data field—location for storage of data, such as in a database.

Data field definition—human-readable information describing an associated data field in the database to which the data field definition is assigned and can include data field identifiers.

Data field identifier—a string of numbers and/or letters that uniquely identify a specific data field in the database.

Data field values—data values that populate a data field.

Bureau of Real Estate (BRE)—is a state level agency that makes rules for real estate transactions.

Conveyance—is the act of transferring an ownership interest in real property from one party to another. Conveyance also refers to the written instrument, such as a deed or lease that transfers legal title of a property from the seller to a buyer.

Escrow—refers to money held by a third-party on behalf of transacting parties. The duty of a title and/or escrow company is to act as a neutral third party. The escrow company holds all documents and money until all of the terms and conditions in the contract have been met and the property is in title insurable condition. The transfer can then be made from the Seller to the Purchaser. Title companies do not work for the Seller or for the Purchaser. They are employed by both parties and act only upon mutually agreed upon written instructions. In Arizona, a title company, or an escrow company, rather than an attorney, serves this purpose.

Title—is a bundle of rights in a piece of real estate in which a party may own either a legal interest or equitable interest. The rights in the bundle may be separated and held by different parties. It may also refer to a formal document, such as a deed, that serves as evidence of ownership. Conveyance of the document may be required in order to transfer ownership in the property to another person.

Title insurance—is a form of indemnity insurance which insures against financial loss from defects in title to real property and from the invalidity or unenforceability of mortgage loans. The vast majority of title insurance policies are written on land within the United States. Unlike some land registration systems in countries outside the US, the US states' recorder of deeds generally does not guarantee indefeasible title to those recorded titles. Title insurance will defend against a lawsuit attacking the title or reimburse the insured for the actual monetary loss incurred up to the dollar amount of insurance provided by the policy.

Listing Agent—represents the seller in a real estate transaction.

Buying Agent (also known as Selling Agent)—represents the buyer in a real estate transaction.

Compliance

Real estate transactions are complicated and time consuming. Currently, such transactions are performed manually by a real estate agent or broker for a stakeholder, which is commonly the buyer or seller of a property that is the focus of the transaction. The manual process includes identifying and collecting required documents for all governing jurisdictions, identifying and applying all relevant and current jurisdictional regulations to the documents, populating the document with required data, checking that the populated data is consistent, accurate and compliant with the regulations, revising the documents when information changes, incorporating new information arising from negotiations between the parties of the transaction, adding new documents when new requirements are enacted, providing the completed documents to the other party of the transaction, and coordinating signatures of the documents. However, due to the increasing number of documents and constantly changing regulations, there is a substantial risk of human error, which can, at times, invalidate the transaction. Further, even if the documents are completed electronically, computers are currently unable to verify or ensure compliance of the populated data based merely on the electronic preparation of the transaction documents.

Automatic document transformation and compliance can prevent error and reduce an amount of time required to identify and complete the required documents. However, automating such document transformation, especially for real estate transactions, is challenging and many factors must be considered to ensure that automated document transformation and compliance is accurate, quick, and reliable. The challenges include designing representations for documents and document packages that enable both human usability and automation. Specifically, the document information should be presentable in natural language, able to be printed or presented in digital media, while also ensuring that the information is in a form practical for information processing. The information processing can include symbolic and numeric processing of data values entered into the documents, including determining whether fields are populated with proper values, enabling entry of data fields manually or automatically and comparing the data values with reference values and constraints. To perform such steps, information processing can require access and integration with one or more databases, networked information exchange with trusted and authoritative servers, and maintaining a history or log of changes to the documents and data values. Other challenges include integrating automated information processing with ongoing human activities with respect to the documents, including automatically keeping track of a status of multiple interdependent activities and related services, coordinating activities and document changes, and managing incremental and ongoing document and information changes, such as ensuring compliance when information changes during a transaction. To overcome such challenges, the automatic document transformation system, as discussed in detail below, includes a multi-tier system that utilizes data models for checking and automating compliance, as well as computational agents, and multiple networked, authenticated and cloud-based servers, which allow a computer to perform the task of compliance. A compliance status of documents and field values can change as information changes during a transaction.

Further, process logic associated with the document data fields infers dependencies and interactions with other steps in the document generation and transformation process, and can automatically add language and data fields when necessary. Further, the process logic resolves the difficulties in receiving piecemeal discovery of transaction issues by dynamically updating the documents to include newly discovered issues and requirements, as well as changes to the documents and data values. Further, the compliance status of documents and field values can change as information changes during a transaction.

Compliance System Architecture and Operation

Document transformation and compliance checking reduces errors during real estate transactions to ensure that the transactions are successfully and timely and/or accurately completed. FIG. 1 is a block diagram showing a system for document grouping and transformation, in accordance with one embodiment. Real estate agents 11 or brokers 12 assisting a party or stakeholder 13 to a real estate transaction can access a compliance server 15 via an inter-network 29, such as the Internet, to identify, prepare, and verify documents for the transaction as a compliance system 15. An automated clearing house can also perform the functions of the compliance system. Hereinafter, the phrases "compliance system" and "automated clearing house" are used interchangeable with the same intended meaning, unless otherwise indicated. The real estate agents and clients of the real estate agents or brokers can access, fill in, and sign documents for the transaction, as described in commonly-owned U.S. patent application, titled "System and Method for Document Transformation and Compliance, filed Sep. 4, 2019, the disclosure of which is herein incorporated by reference. In a further embodiment, the compliance system 15 can be executed by two or more servers.

In one embodiment, the compliance system 15 can operate via a cloud computing environment, which allows users, such as the agents, brokers, and parties to the transaction, to access and utilize remotely-stored applications (not shown) of the compliance system without requiring the users to install software or personal data. The users can access the compliance system 15 via a computing device, such as a computer or a mobile computing device (not shown), including a cell phone, laptop, or tablet.

The compliance system 15 can include a compliance information management system 16, a compliance performance system 17, a compliance outreach system 18, an input port 31 to receive compliance rules, databases of addresses and document templates, and an output port 32 to provide populated and checked document packages for a transaction. The compliance information management system 16 encodes information and logic representations for automating compliance of the transactions. Real estate subject matter experts 14 and information technology specialists 30, among other individuals, are responsible for the creation and maintenance of the information and logic used by the compliance system 15. For example, subject matter experts 14 can curate and annotate a library of documents 24 for real estate transactions that is stored by a database 19 associated with the compliance system 15. The library of documents is discussed in detail below with respect to FIG. 10. The documents reflect different jurisdictional transaction requirements, including federal, state, county, city, and local compliance requirements. Meanwhile, information technology specialists 30 can encode, check, embed, and maintain compliance logic executed by computational agents of the compliance system with the documents in the library and associated databases.

The information management system 16 also enables the compliance performance system 17 to support and automate real estate transactions. For instance, the compliance performance system 17 records information for a transaction, selects a set of documents for the transaction based on at least a portion of the recorded information, and transforms documents in the set by populating form elements of one or more of the documents processed by the information management system 16. The real estate brokers 12, agents 11, support staff, and parties 13 can provide the information for the transaction via a form or coversheet. Based on the received information, the compliance performance system can populate the documents on which automatic compliance is performed.

During or after population, the performance system 17 performs compliance checking of the document set for consistency, correctness, completeness, and compliance, as well as confirmation. The compliance outreach system 18 interacts with third-party institutions 20, 22, as authoritative sources, to access transaction documents 28, jurisdictional regulations 27, property records (not shown), and financial data 26 for compliance checking with the set of populated documents. The third-party institutions can include city or county property records, real estate boards, financial institutions, or jurisdictional real estate regulatory institutions, including federal, state, county, city and neighborhoods jurisdictions. Other third-party institutions and document types are possible.

Any errors in the documents regarding consistency, completeness, correctness, and compliance of the data can be identified via the performance system 17. In one embodiment, errors are detected at the time data is entered. The error can be flagged, making a visible note for stakeholders and preventing an erroneous value from being accepted and propagated in the document set. The note can suggest corrections to the data entry or prompt a user to correct the entry at that time. In another embodiment, the errors can be automatically corrected; however, in a further embodiment, a notification can be transmitted to one or more of the broker, agent, or stakeholder for correction. Any time new data is entered, the compliance checking process can automatically occur to ensure that no errors are present in the transaction document set. Once the documents are complete and correct, the documents can be provided to the other party of the transaction for review and possibly, further revision.

Figure 2:
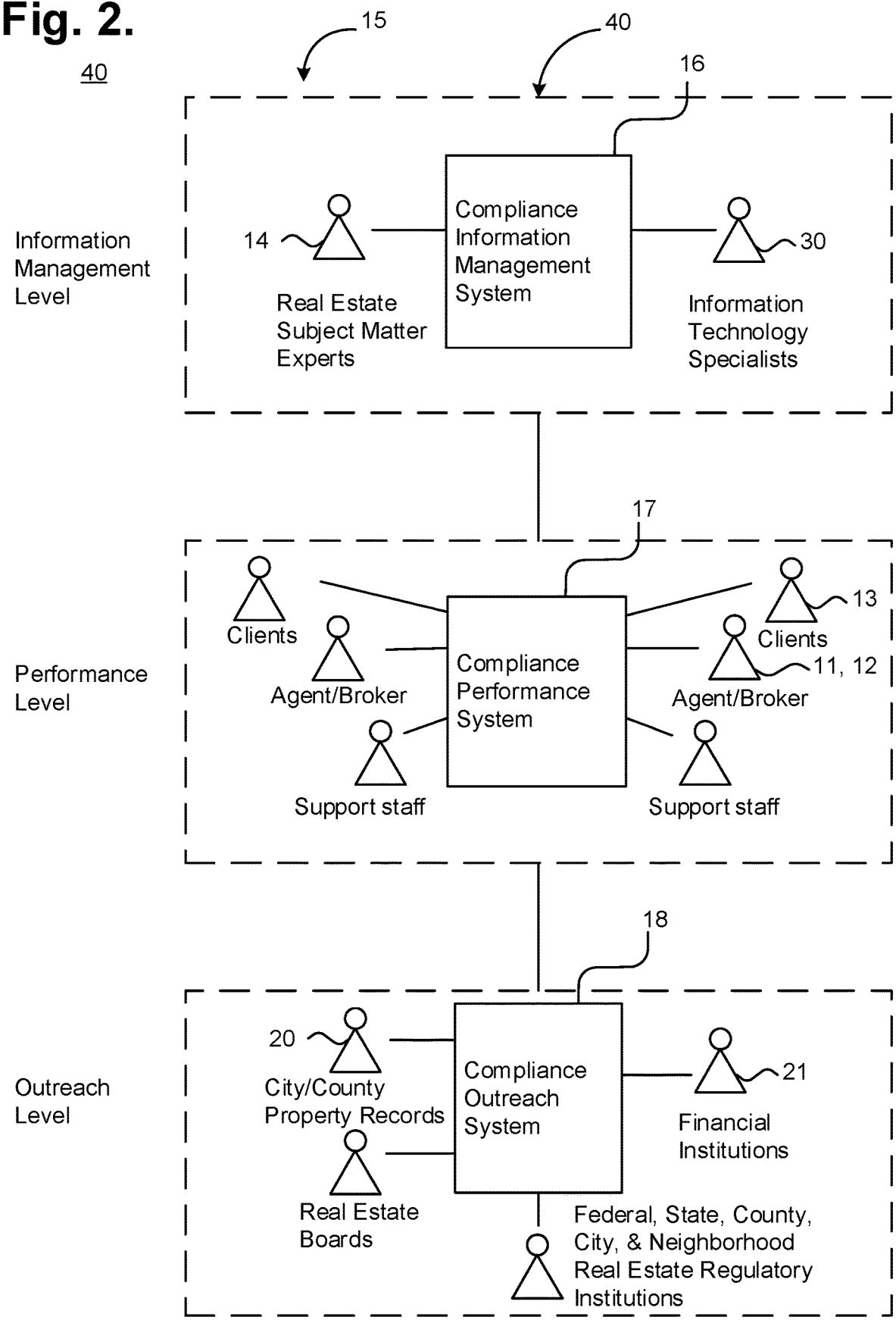
FIG. 2 is a block diagram showing, by way of example, the compliance system of FIG. 1.

The compliance information management system 16, compliance performance system 17, and compliance outreach system 18 work in conjunction with each other to automate document transformation and compliance checking. FIG. 2 is a block diagram 40 showing, by way of example, the compliance system 15 of FIG. 1. As described above, the compliance system 15 includes the compliance information management system 16, the compliance performance system 17, and the compliance outreach system 18. At the level of the compliance information management system 16, real estate subject matter experts 14 and information technology specialists 30 provide information and logic representations that are encoded and saved for performing compliance checking of the populated documents for a real estate transaction.

Documents are identified and populated at the compliance performance system level 17 during which users, such as brokers, agents, and stakeholders to the transaction provide data regarding the transaction for populating at least a portion of the documents using the information and logic representations from the information management system 16. Once populated, compliance logic from the information management level 16 is applied to the documents to check for correctness, completeness, consistency, and compliance of the data and the documents, using the information gathered by the compliance information management system and the compliance outreach system. Prior to or during the compliance checking, the compliance outreach system 18 performs interactions with third party systems to obtain additional information against which the populated documents of the transaction documents are checked.

Documents and Data Fields

Figure 3:
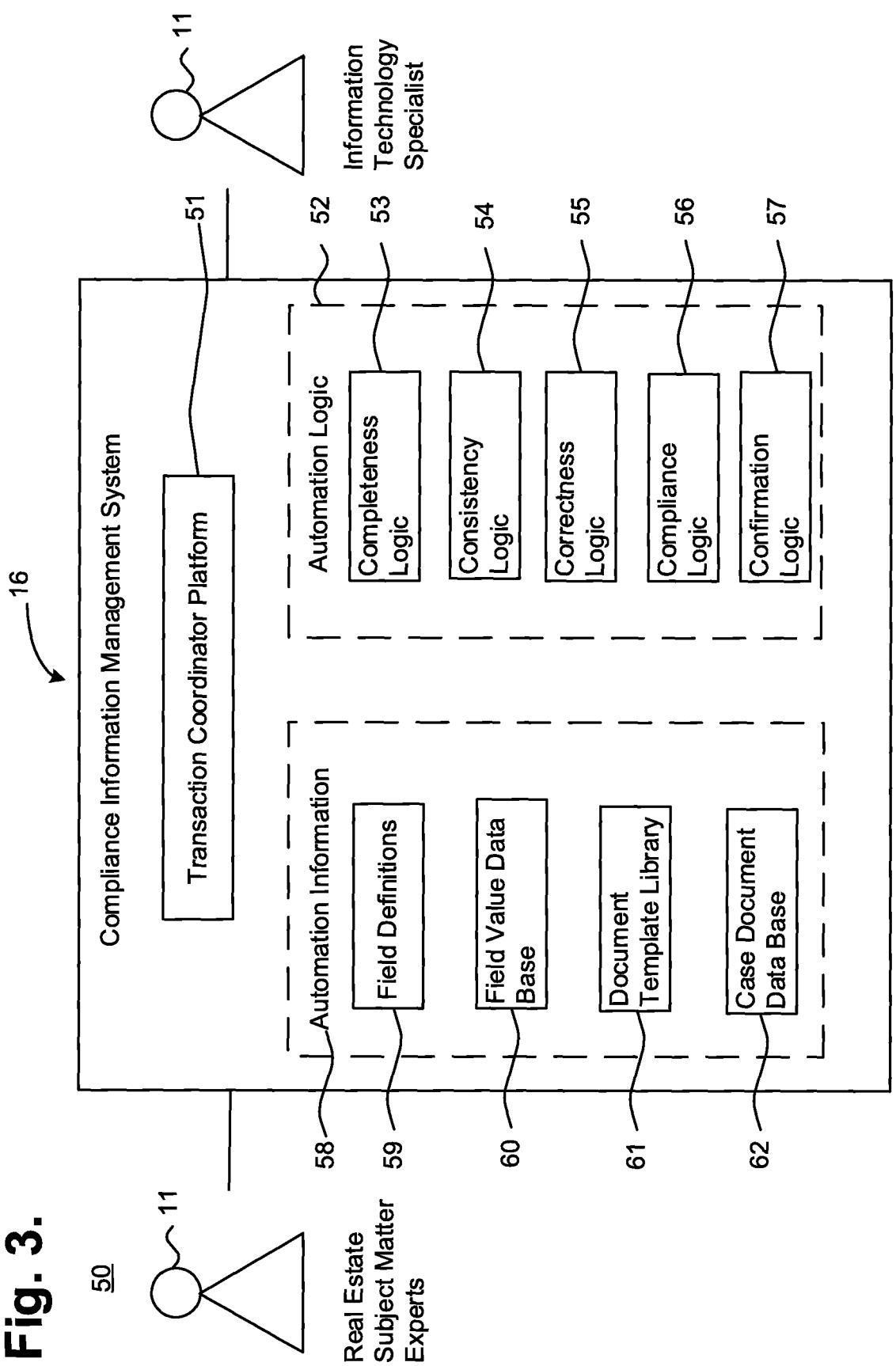
FIG. 3 is a functional block diagram showing, by way of example, the compliance information management system of FIG. 2.

Ensuring accurate document transformation and compliance requires automation information and logic representations. FIG. 3 is a functional block diagram 50 showing, by way of example, the compliance information management system 16 of FIG. 2. Real estate subject matter experts and information technology specialists, among other qualified individuals, enter automation information 58 and automation logic 52 via a transaction coordinator platform 51. The automation information 58 can include field definitions 59, field values 60, a library of document templates 61, and case documents 62, which are human-readable forms of a current state of transaction documents for each transaction, while the automation logic 52 can include population logic (not shown) that performs document population and revision, and review logic to ensure compliance, correctness, completeness, and consistency of the populated documents.

The document templates 61 can be obtained from jurisdictional real estate organizations, generated by the subject matter experts, or uploaded via the subject matter experts or a third party, as well as from other sources. Generally, each jurisdictional real estate organization requires a pledge to a code of ethics and implements a standard of practice required by all members. Many brokers and realtors belong to one or more organizations to utilize document templates prepared, maintained, and updated by the organizations. When new real estate regulations are implemented or laws are enacted, federally or by state, those real estate organizations covering the affected jurisdictions work to revise their documents and ensure that their templates are up to date and in compliance with the new regulations or laws.

Each of the documents in the template library 61 includes multiple form elements for entry of transaction data, including data field values, which are each stored in a data field, such as in a database or spreadsheet. The data fields values are used within a data model for checking and automating compliance, and are accessed for populating the form elements. A real estate document template can include form elements for party names, street address, city, county, zip code, and sales price for the property of the transaction. Each data field that stores a data field value is associated with a data field definition 59, which can be human-readable information describing that data field to which the data field definition is assigned. The data field definition is also associated with a data field identifier, such as a string of numbers and letters, that uniquely identify a specific data field in the database.

The information of the data field definition can include one or more of a text comment describing a meaning of the field, a data type, routines for converting a value into printable text, computational modules for carrying out operations on a field, and a syntax checker. For example, a data field definition for a property address can include a data field name of "street address," a data field identifier of "Street.Address.1," a data type of "street-address," a description of "this is the first street address for the property, must include a number and a street name, and be consistent with a lot number in county records," and a module for operations to carry out entering, printing, checking, comparing a received data value to trigger compliance checking and syntax checking.

The data field identifiers and names index access to populated data values for information processing and support specific access for automating document population and compliance checking, including completeness, consistency, correctness, compliance, and confirmation processing. Specifically, the syntax checker can be used to look up a data field value for populating a form element based on the data field identifier of the data field definition associated with the data field and a transaction identifier assigned to the transaction. For example, returning to the street address example above, a property transaction, in which the data field for street address has been populated, can have an identifier "Trans CAL-387654-Smith-Jones-31 Dec. 2018." Based on the transaction identifier and the data field identifier, the street address data value "1302 Broadway E" is accessed and used to populate the data field. Data field identifiers and names for related data fields within a single document or across different documents are the same for different transactions. However, data values populating the data fields are specific to a transaction and are usually different for different transactions. Each transaction can be associated with a data model, which can include the data field identifiers or names for documents in a document package for the transaction and data values that populate data fields associated with the data field identifiers. The data models are discussed in detail below with respect to FIG. 9.

In one embodiment, the field definitions 59 are stored in a persistent data access system, such as a relational database, a NOSQL database, a hash table, or other data access organization. For simplicity, we refer to such methods collectively as a database. The database is a reference source for field definitions. However, other kinds of linked data structures for the field definitions are possible, such as hash tables, tree-based structures, and look-up representations and information retrieval structures.

In a further embodiment, the field definitions 59 are distributed and combined with a library 61 of the document templates so that the field definitions 59 are defined and stored in a distributed fashion across a set of document templates, rather than in a monolithic database, separate database, or multiple databases for all document templates. In such embodiments, a document template is designated a reference template and the source of the field definition. Having data represented as explicit data fields enables controlled and specific access to the compliance data and enables automating compliance checking and enforcement.

To access data values and populate form elements in the document templates, the field definitions can be associated with the form elements, such as via a look-up table or stored with the form elements. FIG. 4 is a diagram showing, by way of example, an interactive form 130 for form element identifiers 135. The interactive form 130 can be delivered via a web page or directly by an application. The interactive form 130 includes a listing 131 of "form elements" 135 that can be defined by a real estate expert or information technology specialist and associated with a data field in a document template. Each form element 135 can be represented by a data box in a template and listed via a form element identifier 131. For each form element, the interactive form 130 can provide a name 132 of the element and actions 133, which can be performed for or on the form element that corresponds with the form element identifier 131 and name 132. The actions can include printing of an associated data value, triggering when the data value has changed, converting the data value from a numerical value to text and vice versa, and when a new data value has arrived. Other actions are possible. New form elements 135 can be added using an "add form element" button 134.

Figure 5:
FIG. 5 is a diagram of an interactive form showing, by way of example, a document template with defined form elements.

Data field definitions can be assigned to the form elements within documents templates by a subject matter expert or real estate professional that can work with information technology specialists to define the data fields. FIG. 5 is a diagram of an interactive form 140 showing, by way of example, a document template 143 with defined form elements 144. The interactive form 140 can include a data frame 141 and a display frame 142, and is displayed to the real estate experts and information technology specialists for entering field definitions to the document templates. The data frame 141 can provide tabs for metadata 141, inputs, and experts, as well as other tabs. The meta data tab 141 provides information for defining the document template 143 and can be populated by the real estate experts and information technology specialists. In turn, the defined document template is provided to the users, such as the real estate agents and clients. Under the metadata tab 141, document information fields can be provided, including a date that the document template was published and last edited, the document name, the date the document template was last revised, a type of transaction covered by the document, and a locale represented by the document.

The display panel 142 can display one or more pages of a document template 143. Each document template displayed can include one or more form elements 144, at least one of which is defined for automated population and compliance. Each defined form element 144 is associated with a data field identifier that indicates a type of data to populate that data field. The defined form elements can be highlighted, color coded, or otherwise marked to indicate a blank field that must be populated by the user.

The inputs tab of the data frame can be used by real estate experts and information technology specialists to define a form element with a data field definition or provide information about the field definition associated with that form element. FIG. 6 is a diagram of an interactive form 150 showing, by way of example, information for generating a data field identifier associated with a form element in a document template. The interactive form 150 can include a data frame 151 and a display frame 152. The data frame 151 can include tabs for metadata, input 153, and expert, while the display frame 152 can display a document 154 or a portion of a document 154 with one or more data fields 155. When the input tab 153 is selected, a form element 155 can be defined using an "add input" button 158 after providing information about the form element, including providing an editing string, which can be the form element identifier 156, a page of the document displayed, and a name 157 of the form element identifier, which in this example is "Buyer1And2." Other information, such as tabIndex, top, type, value, and width can be used for formatting of the data field to populate the form element with a data value. The form element identifier 156 provides that the name of Buyer 1 and Buyer 2, if any, should be entered into the form element 155 for which the data field identifier 156 is associated. Under the input tab 153, programming information for triggering processing logic is also included. For instance, selecting a particular box, may add additional form elements to the form for answering by the user or add additional documents to the document package.

A data field definition can also be included in the inputs tab to provide information about the type of data to populate the form element, as well as information regarding where to access the data once received and how to process the data. Once the form elements of a document template have been defined, the template can be added to the document library for access and use by real estate agents for real estate transactions.

Returning to the discussion with respect to FIG. 3, users, such as real estate agents or clients, populate the defined form element with data values, which can be stored in the field value database 60. In one embodiment, the data field values 60 are stored in a persistent data access system, such as a relational database, NOSQL database, or any other persistent data structure that can provide similar indexing functionality. The database 60 functions as a reference source for the data values for all of the documents in the package associated with the transaction. Additional information to assist information processing can be stored together with the data field values or in additional storage. The additional information can include date and time the data was last changed, provenance information about who entered the data or where the data originated, and links to related information, such as confirmation information that logs whether a stakeholder or user has confirmed receipt and acknowledgement.

Automation logic utilizes the automation information, such as the data field identifiers 59, to create and maintain accurate information for automating compliance. The subject matter experts and information technology specialists generate automation logic 52, which includes population logic for automating document transformation and review logic for performing compliance checking of the documents. The review logic can include logic for completeness 53, consistency 54, correctness 55, compliance 56, and confirmation 57, which is encoded by the compliance information management system, to automate compliance of the documents for a transaction. Completeness logic 53 ensures that all required documents for a transaction are included in a document package and that all required form elements for each document in the package are populated. Consistency logic 54 ensures that related fields in the documents are populated in a semantically-consistent way, as further described herein. Correctness logic 55 ensures that the data field values are verified by authoritative sources, as described below in detail and compliance logic 56 ensures that the packaged documents for a transaction comply with all regulatory requirements. Confirmation logic 57 ensures that all of the required signature and date fields in the packaged documents are populated.

Generating Document Packages

Figure 7:
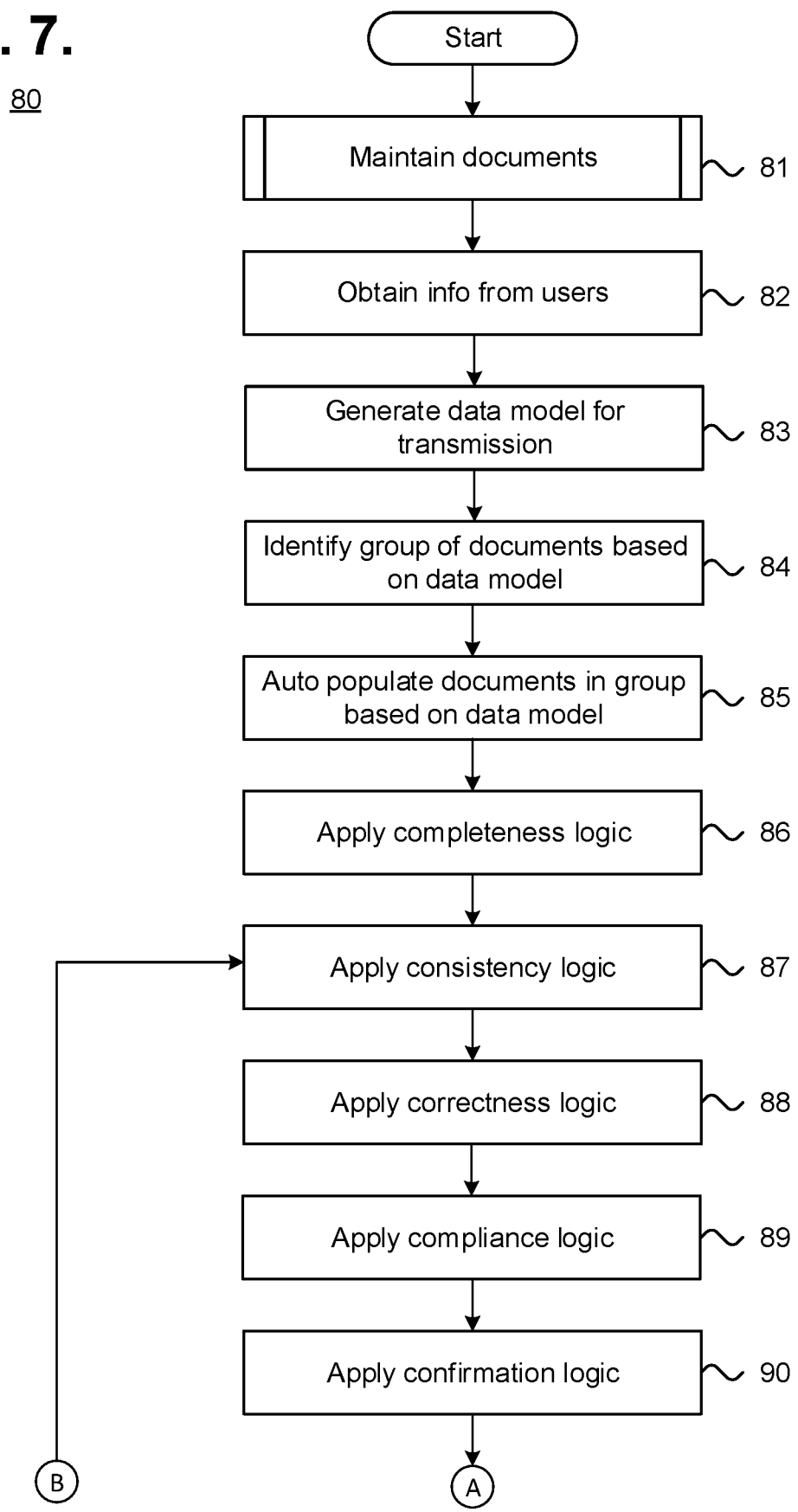
FIG. 7 is a functional block diagram showing a method for document transformation and compliance, in accordance with one embodiment.

Each property transaction generally requires many documents to be completed. Automated document transformation and compliance provides convenient, accurate and timely checking and transformation of the documents to prevent errors. FIG. 7 is a functional block diagram showing a method 80 for document transformation and compliance, in accordance with one embodiment. A library of document templates for real estate transactions is maintained (block 81) for a plurality of jurisdictions. The maintained documents include templates from different real estate organizations or that are newly generated. Each document template in the library has been processed by real estate experts and information technology specialists to group documents for different transactions in different jurisdictions and to define the form elements. The documents can be grouped using a document identifier or by storing related documents in folders; however, other methods for grouping documents are possible.

A user accesses the document transformation and compliance system to generate a document package for a transfer of real property, such as a sale or purchase of the property. The user can include a real estate agent, broker, or other types of real estate professionals, as well as a party to the transaction. Different documents are relevant and appropriate for different stakeholders, which consequently have access to different documents in the document package. For example, a listing agent can create transaction documents shared between a property seller and the listing agent, such as a listing agreement, as well as documents that are provided to another party of the transaction, such as a counteroffer, which is compliance checked and included in the property transaction itself. Similarly, a selling agent or buying agent can create transaction documents shared between the selling agent or buying agent and client, and transaction documents, such as an offer, that are provided to another party to the transaction. Further, different users can have different access to the data transformation and compliance system. For instance, real estate agents and brokers cannot sign on behalf of the buyer or seller, whereas the buyer and seller may not be able to access the same document templates as the real estate agent or broker, such as when the documents are only available based on membership in an organization from which the documents originated.

Upon access, the user can provide (block 82) information about the property transfer, such as a type of property transfer or property address, price, type, and owner, via a cover sheet. Specifically, the information can be provided as data values that populate the form elements in the documents. Other types of information are possible.

Based on the data values received from the user, a data model is generated (block 83). The data model can include the data values and data field identifiers for corresponding data field definitions, as well as additional information. Additionally, the data model is updated as data values change, new documents are added, and new form elements are added. Data models are discussed in further detail below with respect to FIG. 9.

Prior to, simultaneously or after generation of the data model, a package of document templates for the transaction can be generated (block 84) based on the received data values. For example, upon receipt of the transaction type and property address, a set of compliance rules can be identified and subsequently, the identified compliance rules can be used to identify documents for including in the document package for the transaction. For example, at least a portion of the documents associated with the city, county, or state in which the property is located can be used to generate the document package. Further, properties located in a particular location may be part of a homeowner's association and the rules of the homeowner's association will apply to the property in the transaction. The document package can be automatically generated based on the received data values or selected by a user. Additionally, the document package can be generated based on a combination of automatic generation and user selected generation. At any point prior to providing the document package to the other party, documents can be removed or added to the package.

Once identified, the documents in the package can be auto-populated (block 85). Specifically, form elements within the documents are populated (block 85) with data values from the cover sheet based on the data field identifiers associated with the form elements. Any form elements in the documents not automatically populated can be filled in by the user. For automatic population, data values from the coversheet, which can be stored in a database with field identifiers, are used as reference sources for populating the form elements of the documents with data field values. Other reference sources for populating the form elements are possible, such as other documents, as discussed in detail below with respect to FIG. 9. The documents can be populated once identified and if further documents are later added to the package, auto-population can occur once the document has been added. Auto-population is also used when data values are changed. For example, if the price of the property changes in one form element, the new price is entered in the data model and will be used to replace the old price in the other documents in the package.

Additional information can be stored with the populated form element values or in additional storage accessible using case and field identifiers. The additional information can include date and time the data was last changed, provenance information about who entered the data or where the data originated, and links to related information, such as confirmation information that logs whether a stakeholder has confirmed receipt and acknowledgement of the data values.

During or after data population, review logic, such as completeness logic (block 86), consistency logic (block 87), correctness logic (block 88), compliance logic (block 89), and confirmation logic (block 90) can be applied to the document package to ensure a validity of the data values. In one example, the review logic is applied in real time as the data values are being entered in the form elements, either via auto-population or via the user. Additionally, the review logic can be applied at a later time, such as all the required data is entered in the documents. For instance, for related form elements, checking cannot occur until multiple fields are entered, either in the same document or across different documents.

The review logic can be applied separately or simultaneously. Once the documents in a package have been checked for compliance, consistency, correctness and completeness, any identified errors or inconsistencies can be automatically corrected or a notification can be provided to the user to correct the error. Once the document package satisfies all checks for completeness, consistency, correctness, compliance, and confirmation, the document package can be provided (block 91) to the other party to the transaction.

However, prior to providing the document package to the other party or after providing the package, updates (block 92) to one or more of the form elements may be required. For example, the other party receiving the document package may want to change a term or form element value in one or more of the documents. Alternatively, one or more terms of the transaction may change, such as based on an outcome of the property inspection or by mutual agreement. Additionally, regulations regarding the transaction can change and must be reflected in the document package. All such changes must be reflected in the transaction documents.

A change to a value populating a form element in a document could, for example, occur via a user interaction when the document is stored in the compliance system or by a fresh upload of a copy of the document. Every change to a data field value is logged and time-stamped. Whenever a new value of the form element becomes available to the compliance system, the system updates the data value in the caching database. Additionally, whenever a new copy of the reference document is made available to the system, the system synchronizes the data so that the most recently updated value is reflected in the database for populating form elements. Other implementations for storing the data field values are possible. In each variation, consistency rules assure that when a change to a referenced data field value for a document package becomes known, the new data value is propagated to derivative form elements across the documents in the document package. To maintain transparency and consistency, the compliance system keeps a log showing the dates and times of any change, and indicates where reconfirmation is required of any stakeholder's acknowledgement of a value. The log can be used to verify and confirm certain changes, as well as track the user that made the change should a dispute regarding the property arise.

If any updates (block 92) to a data field value are necessary, one or more data field values are changed (block 93) and propagated across the documents in the package. Additionally, a change can be made to a form element and that change is updated to reflect across all document templates in a document package that include that form element. Subsequently, the review logic, including completeness logic (block 86), consistency logic (block 87), correctness logic (block 88), compliance logic (block 89), and confirmation logic (block 90) is applied to the updates. Otherwise, if no updates are required, the document package is considered to be successfully complete and can be provided to the other party.

Process and Document Transformations

The document transformation and compliance system helps to reduce the amount of time required for preparing documents for a real estate transactions, such as a sale or purchase of property, and increases confidence that the documents are accurately prepared. Generally, during a property sale and purchase transaction, a potential purchaser reviews multiple properties, which have been listed for sale. Each listed property requires a listing agreement, which includes large amounts of information that must be correctly listed for the property and comply with jurisdictional regulations.

Generating the listing agreement can be tedious and time consuming based on the information that must be provided and disclosed. Once an offer is receiving and accepted, all paper work for the transaction must be completed before closing. Such paper work includes documents relevant to the particular property and transaction, and can include proof of title search, insurance, flood certification, proof of homeowner's insurance and mortgage insurance, home appraisal, inspection reports, and closing disclosure, among other documents, such as carbon monoxide detector notice, new construction addendum, vacant land listing agreement, and water heater statement of compliance. Other types of documents are possible.

Eventually, the potential purchaser identifiers an available property for sale and generates an offer for sending to the seller of the listed property selected. Generating the offer can be tedious and time consuming based on the information that must be provided and disclosed. Once the offer is accepted, all paperwork for the transaction must be completed before closing. Such paperwork includes documents relevant to the particular property and transaction, and can include proof of title search, insurance, flood certification, proof of homeowners insurance and mortgage insurance, home appraisal, inspection reports, and closing disclosure, among other documents, such as carbon monoxide detector notice, new construction addendum, vacant land listing agreement, and water heater statement of compliance. Other types of documents are possible.

Figure 8:
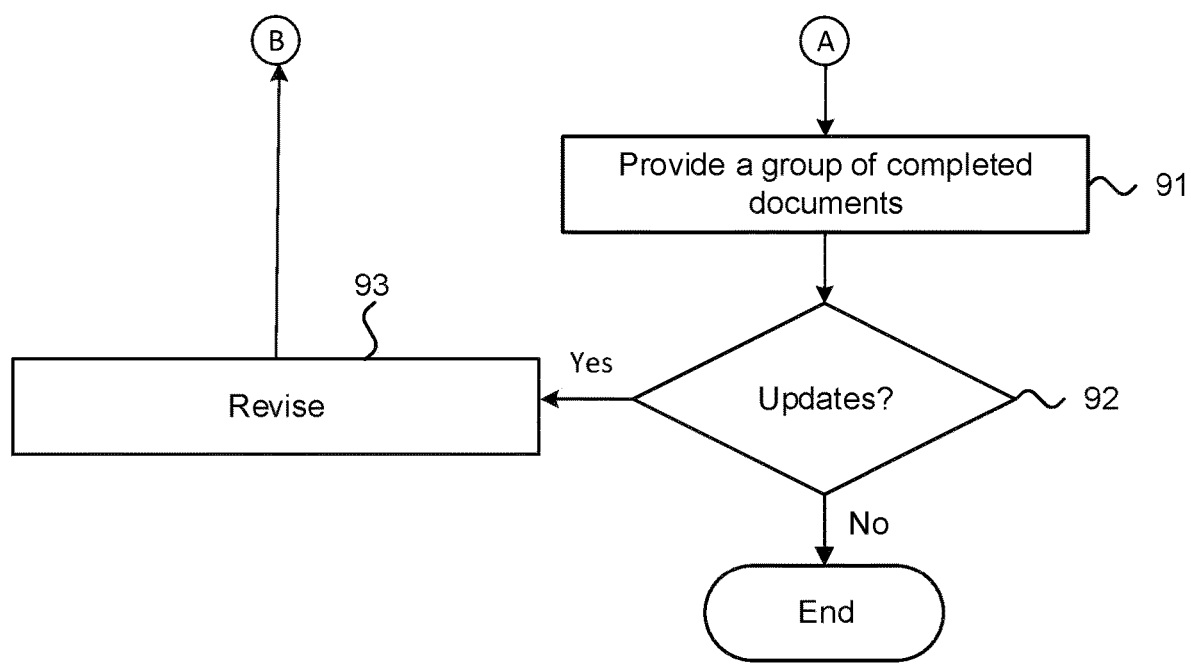
FIG. 8 is a diagram of a webpage showing, by way of example, a transaction cover sheet with data fields for obtaining data values.

Users can utilize the document transformation and compliance system to prepare the listing, offer, and related documents. Such documents are prepared using information received from a user, such as via a questionnaire or cover sheet. FIG. 8 is a diagram of an interactive form 100 showing, by way of example, a transaction cover sheet 102 with form elements for obtaining data values. The interactive form 100 can include a navigation bar for an index 101 of pages for the transaction and a display of the cover sheet 102. The index 101 can include content links for the cover sheet 102, including a document link, listing services link, proof of funds link, signed disclosures link, prequalification link, and marketing service link. The listing services and marketing services are further described in commonly owned U.S. patent application, titled "System and Method for Listing Document Transformation and Compliance," filed on Sep. 4, 2019, the disclosure of which is hereby incorporated by reference. However, other index links are possible, including purchase service links, which can be utilized by a buying party to the transaction, as described in commonly owned U.S. patent application, titled "System and Method for Purchase Document Transformation and Compliance," filed on Sep. 4, 2019, and commonly-owned U.S. patent application, titled "Blockchain-Based System and Method for Purchase Document Transformation and Accountability," filed Sep. 4, 2019, the disclosures of which are hereby incorporated by reference. Other index links are possible, including listing service links, which can be utilized by a selling party to the transaction.

The cover sheet 102 can include multiple form elements, which are used to generate a data model for the transaction. The data fields of the cover sheet can include fields for at least one broker or agent name 103, at least one party name 104, contract and market dates 105, and property information 106, including property identification number, street address, city, state and zip code, and purchase price (not shown). Further, data specific to a seller and his listing agent and/or the buyer can be requested via the cover sheet, such as a lockbox code to access a key for the property or a gate code to the property, as well as other types of property access information, such as a combination to enter a condominium complex. Other types of form elements are possible. A user, such as an agent, broker or stakeholder, can populate the form elements of the cover sheet 102 with data field values that are used for generating a data model to identify a document package and perform compliance checking. Once the cover sheet has been completed, a check mark or other symbol or color can be used to provide a status of the cover sheet in the index 101, which in this case, is complete.

In one embodiment, one or more compliance checks can be applied via the review logic as the data values are entered into the cover sheet. For example, correctness logic can be used to check data values entered into the form elements of the cover sheet. Specifically, the data values can be checked to prevent propagation of incorrect information in the other documents of the document package. For example, a real estate agent is completing the cover sheet for his client, the seller, and fills out the seller's email address as adam.able.g-mail.com. The correctness logic identifies that the email address is invalid due to lacking the conventional syntax character "@" to separate the name of the email holder from the name of the email service and marks the incorrect data value as an error. The error can be provided as a pop-up message or by highlighting the incorrect data value, and can be removed upon correction of the data value. Other displays of the error notification are possible.

The correctness logic can also connect to authoritative sources to retrieve authoritative information for checking the data values. For example, the property for sale is located at 1120 Rose Avenue, Mountain View, Calif 94040. As the real estate agent types in the address "1120 Rose," an authoritative source, such as a multiple listing service database, is accessed to obtain and display valid property addresses matching the partial address entered. The real estate agent can then select the property address representing the property for sale by Adam Able. Consistency and compliance logic can also be applied to the data values entered in the cover sheet.

Data Models and Process Logic

Figure 9:
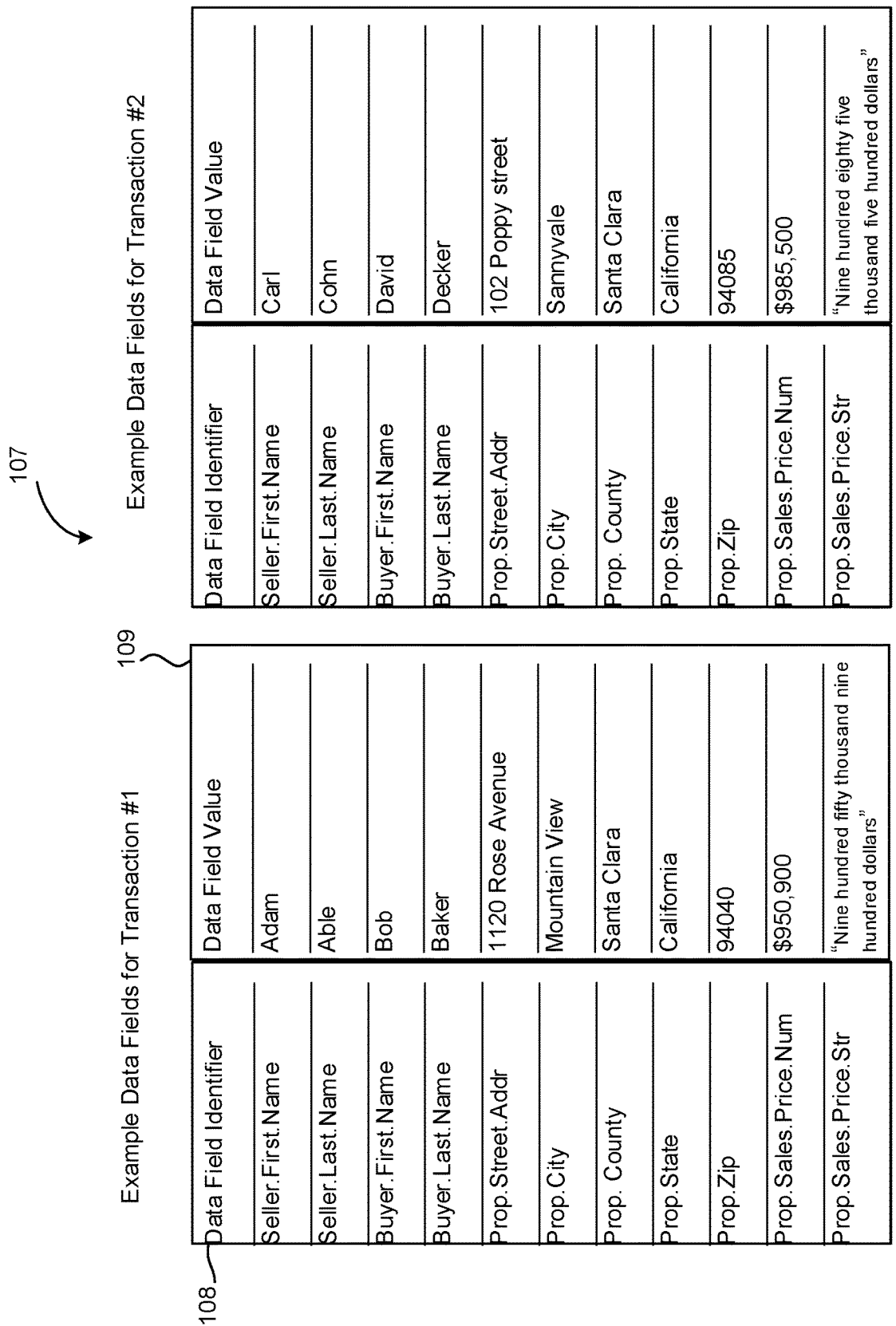
FIG. 9 is a block diagram showing, by way of example, data models.

Once obtained and checked, the data values of the cover sheet are used to generate a data model. FIG. 9 is a block diagram showing, by way of example, parts of data models 107 for different transactions. Each data model can include data field identifiers 108 and data field values 109. In this example, the data field identifiers are associated with a form element in the cover sheet and documents in the library. The data field values are used to populate all form elements with the corresponding data field identifier. The same data field identifiers can be used across documents, as well as transactions; however, the data field values differ for each transaction.

Returning to the above example regarding seller, Adam Able, the seller name is split into two fields with the field for first name associated with a field identifier "seller.first-.name" and the field for last name associated with the identifier "seller.last.name." The received data values of Adam for first name and Able for second name are stored with the associated identifiers in a data model having an extensible set of data field identifiers for accessing and displaying information populating the documents. All the received data values in the cover sheet and document templates for the property transaction can be stored together as the data model.

Once generated, one or more data values from the data model can be used to identify rules for a particular transaction and the identified rules can then be used to select documents for a document package for the transaction. However, prior to generating a document package, the data values from the data model can be used to populate a disclosure document outlining a relationship between a real estate agency and a seller or buyer. The template for the disclosure document can include interactive fields for ensuring acknowledgement by the seller or buyer, and signature, date, and license fields.

Once the relationship between the real estate agent and buyer or seller has been established, documents can be selected from a document template library for inclusion in the document package. FIG. 10 is a diagram showing, by way of example, a part of a document template library 61. The library 61 provides a listing of document templates 70 that are necessary for meeting compliance regulations and practices for different jurisdictions. Each document template 70 can be stored with information, including template name 71, a date of last revision 72, whether the document appears in a listing 73 of documents relevant to the listing agent and seller, whether the document appears in an offer 74 for the property, last publication date 75, last edit date 76, locale type 77, and assigned locale 78. The assigned locale 78 can list the jurisdiction which requires the document, while the locale type 77 provides a classification for the type of jurisdiction, including city, county, or state, as well as other types of jurisdictions. In one example, each document template 70 can be accessed by clicking on the template name. Further document templates 70 can be added using an "add document template" button 79.

To generate a document package for a transaction, one or more data values received via the cover sheet, such as the property address, can be used to identify a set of rules for the transaction. Subsequently, based on the identified rule set, one or more documents can be selected from the library to form the document package. The transaction can be assigned a unique transaction identifier, which can then be used to uniquely identify the document package. For example, the transaction identifier can be a unique number or string, or could be generated as a string that includes some human-interpretable information, such as the real estate agent's name, seller's name, and a date together with a number.

As more data values are provided for the form elements, additional documents may be identified as required for the transaction. Accordingly, templates for those documents are instantiated and some of the field values can be filled in where they have already been established. In this way, the document package grows incrementally and automatically as needed.

Figure 11:
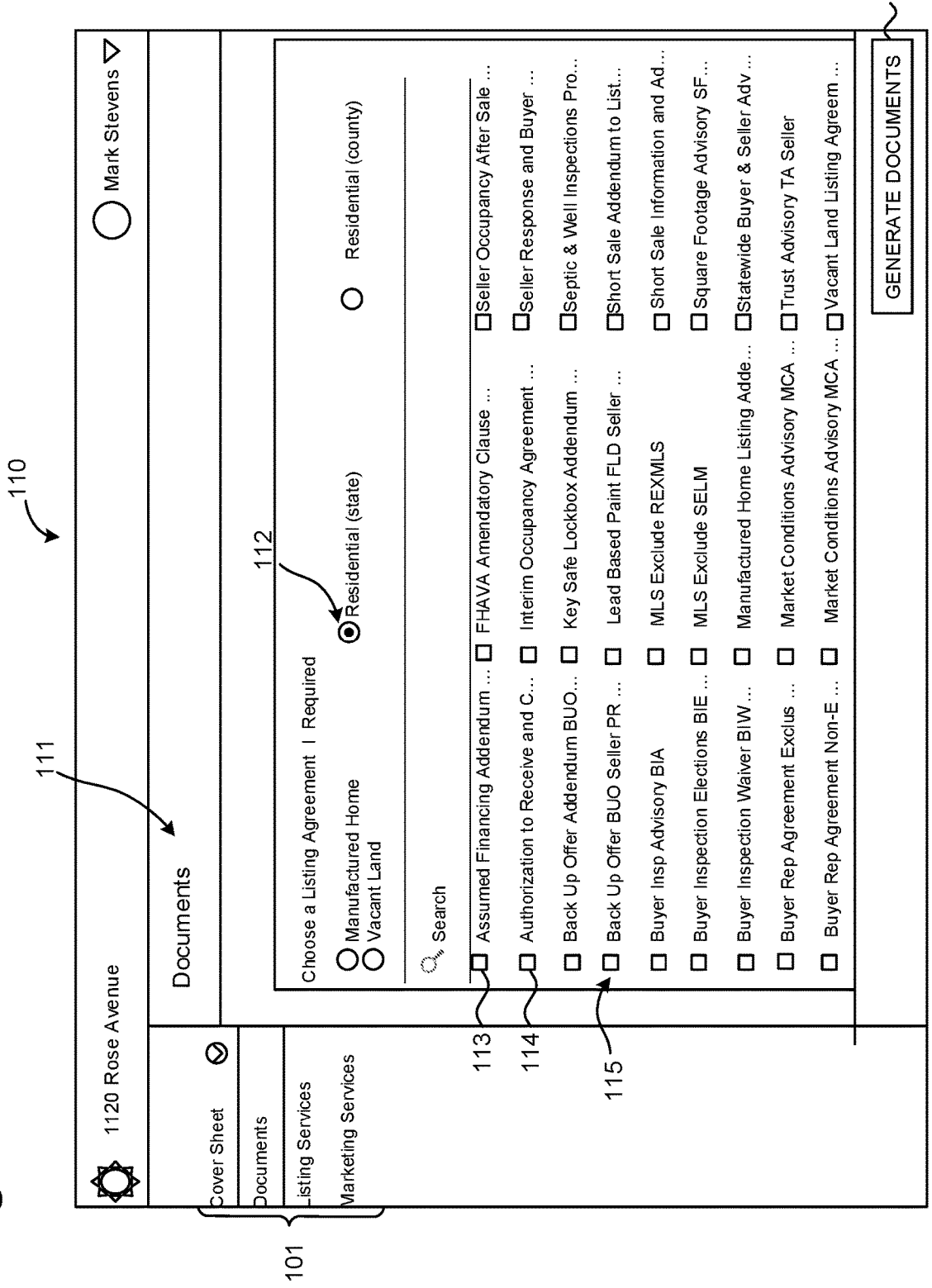
FIG. 11 is a diagram showing by way of example, an interactive form for identifying document templates for a transaction.

In one embodiment, a listing of document templates can be presented and an agent can select one or more documents to add to the document package, as needed. FIG. 11 is a diagram showing by way of example, an interactive form 110 for identifying document templates for a transaction. The interactive form 110 includes a navigation bar for an index of pages 101 and a documents section 111. The documents section 111 provides one or more property type selections 112, a search bar 113, and a listing 114 of document templates 115. The property type selections 112 can be identified and presented based on the address entered in the cover sheet and a type of transaction, such as a selling or buying transaction. Specifically, the address can be used to identify jurisdictional organizations that cover the location of the property, while the transaction type is used to identify listing or purchase documents. For example, a property located in Mountain View, Calif. must comply with real estate regulations enacted by the state of California, as well as any local regulations. To list the property located in the Mountain View for sale, document templates for listing agreements that comply with real estate regulations in one or more of California or locally are identified and presented. A listing agreement represents a contract between a real estate agent and an owner of the property to be sold and can include a list price for the property, a beginning and end date for the property listing, an amount of compensation for the real estate agent, and authorization for the agent to work with third parties to further the sale of the property, as well as other types of information. However, different listing agreements drafted by different organizations can include different conditions based on location, property type, and preference of that organization. For example, one professional organization in California includes, by default, a clause in the listing agreement that requires a property to be delivered to a buyer in operational order, while the listing agreement drafted by a different professional organization does not require, by default, the seller to make any repairs.

In one embodiment, to purchase the property located in Mountain View for sale, document templates for offer documents that comply with real estate regulations in one or more of California or locally are identified and presented. An offer agreement provides an offer price, includes proof of funds, for the offer price, an expected closing date, and how additional costs will be covered, along with expectations of the seller up until closing, which can require additional forms. However, different offer agreements drafted by different organizations can include different conditions based on location, property type, and preference of that organization. For example, a professional organization in California includes, by default, a clause in the offer agreement that requires a property to be delivered to a buyer in operational order, while the offer agreement drafted by a different professional organization does not require, by default, the seller to make any repairs.

The property type selections for the Mountain View property can include a manufactured home, residential home or vacant land, or a residential home however, other property type selections are possible. Thus, document templates for listing agreements and/or offers for each of the property types that conform with California and local regulations are identified and displayed. The user, such as a real estate agent or broker, can choose one or more of the transaction type selections 112 for generating a document package for the transaction. For example, if the property is a residential home, the user can select residential documents associated with the selected property types are displayed or selected for display in the document template list 114 in the document section 111. In one embodiment, all the documents associated with the selected property types can be selected for display and inclusion in the document package. Alternatively, all the documents associated with the selected property types can be displayed and a user can select certain documents for inclusion in the document package. For example, a buyer may wish to place an offer on a residential property "as is," which requires an additional document to accompany the offer.

Further, the document section 111 includes a search bar 113, which can be used to identify additional document templates for adding to the document package. An agent may use the search bar if he or she has information about the property or transaction that is not evident yet from the information that has been entered in the active documents. In this way, the agent can add relevant documents to the package. For instance, the residential Mountain View property may have water conserving plumbing fixtures, which require an additional document for disclosure or is offered for sale as a short sale, which also requires additional documents. Accordingly, based on those special circumstances, the document templates are accessed via the search bar 113 and added to the document package. Further, the interactive form 110 can include a generate documents button 116, which allows a user to view the document templates selected for inclusion in the document package.

Figure 12:
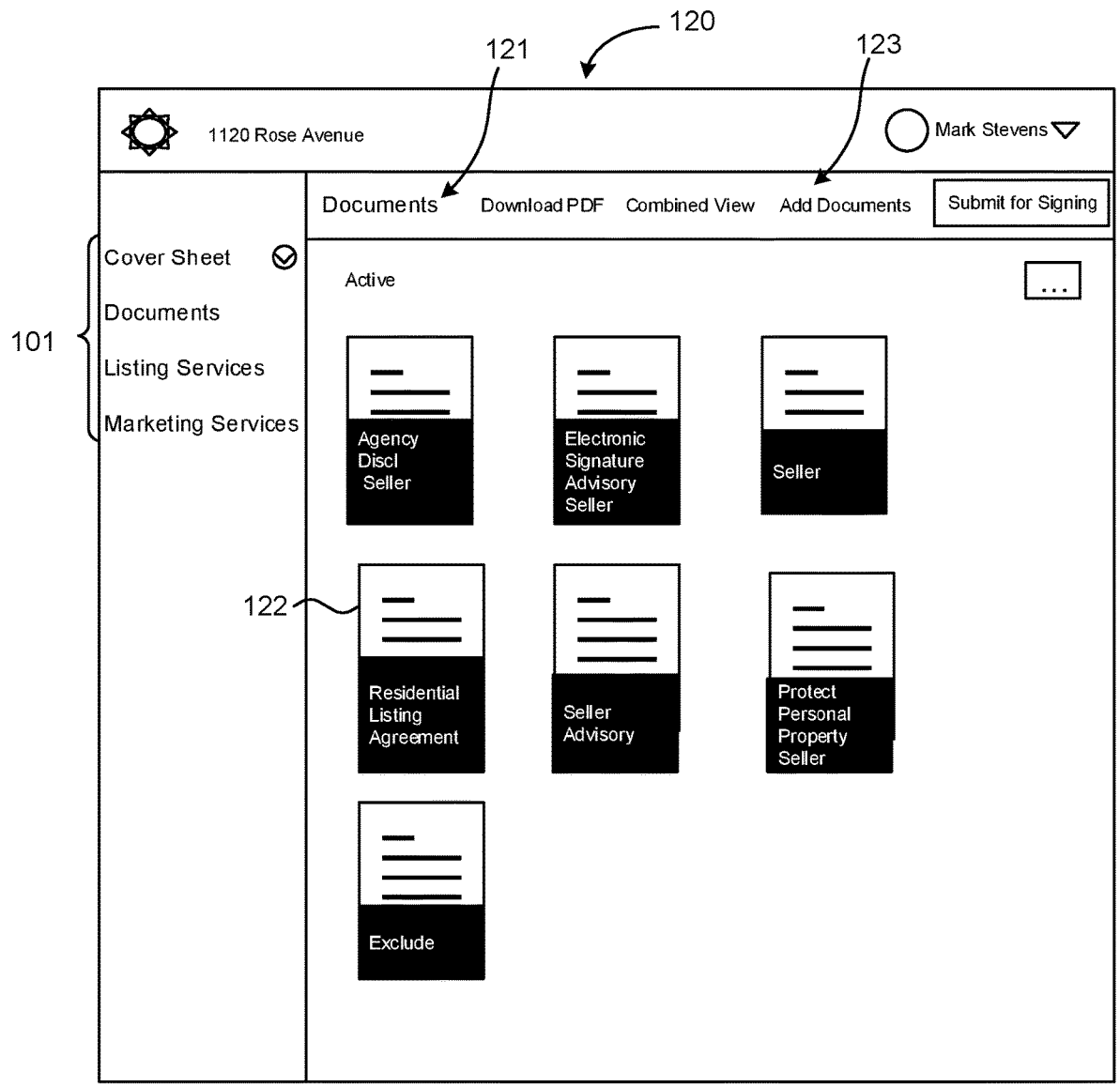
FIG. 12 is a diagram showing, by way of example, an interactive form displaying a document package.

Based on the document template selections in the document page 111, a package of documents is generated for the transaction and displayed to the user. FIG. 12 is a diagram showing, by way of example, an interactive form 120 displaying document templates for possible inclusion in a document package 121 (e.g., for an offer agreement). The web page 120 provides a listing of documents 122 for a listing agreement, for example, that can be included in the document package 121 for the property transaction upon confirmation of the transaction. In one embodiment, the documents templates can be displayed as thumbnail images, and selected for review and revision. Each thumbnail representation of the active documents can include a title of the document and a menu, which allows the user to edit or obtain additional information about that document. Each of the documents in the package can be auto-populated with the data values entered in the cover sheet prior to display or upon display. Further, users can upload external documents via an add document button 123 on the interactive form 120. For example, homeowner association guidelines and papers may not be easily available to individuals that do not belong to the homeowner association and thus, can be uploaded.

Figure 13:
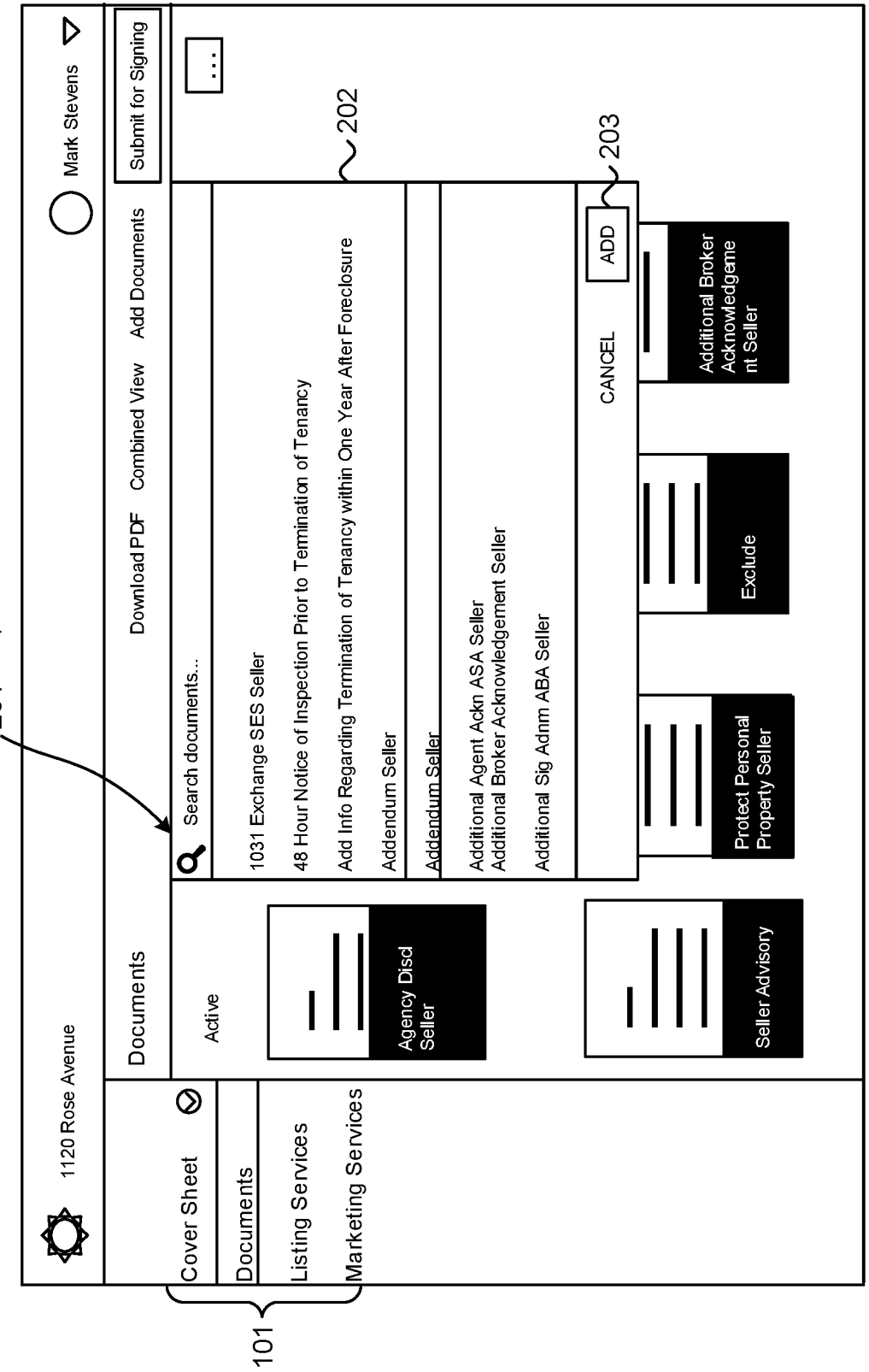
FIG. 13 is a diagram showing, by way of example, a page for searching for documents to add to a document package.

Additionally, if necessary, adding additional documents to the package is possible using a search tool provided on the page. FIG. 13 is a diagram showing, by way of example, a page 200 for searching for documents to add to a document package from a document template library. The page 200 includes a search field 201 that allows a user to conduct a search for one or more documents in the document library. The search field 201 can be displayed on the page 200 or accessed via a menu or right click on the page 200. A user can enter a name of the document to be added in the search field 201 and as the user types, documents with related titles or that includes the typed characters in the search field 201 can be displayed, such as in a drop-down menu 202. Allowing a user, including an agent or broker, to access documents is beneficial to accommodate many variations in circumstances for real estate transactions. For example, the additional documents can include documents to cover seller responsibilities, inspections, pest control, military ordinance disclosure, lead paint, and methamphetamine control, and temporary occupancy of the property by the buyer prior to closing. Documents covering other situations are possible. The number of additional documents can be identified for display based on the organization that prepared the listing agreement selected for use by the user. Once the user identifies a document for adding to the document package, the user can select the add button 203 to add the document to the package. Alternatively, documents can be selected automatically for addition to the document package based on data fields filled in other documents and the data values included in the data model. Once added, the fields can be auto-populated using the data model.

During auto-population, the population logic processes the documents selected for the package by reviewing the form elements, looking up data field identifiers for the data fields in the data model, and populating the form elements with the data values in the data model that correspond with the data field identifiers. The user can select a thumbnail for each document and review the documents with the populated data values. If any form element remains unpopulated, the user can enter a data value, which is saved with a data field identifier associated with the unpopulated form element and stored in the data model. Other documents in the package that include a form element associated with the data field identifier can be populated with the corresponding data value.

In different embodiments, different methods for looking up the data field values to populate the documents are possible, depending on whether the data field values are stored in a reference database, in a reference document, or in a combination of both. In one example, the data field values for a document package are stored in both a database and a reference document as a value for a corresponding form element. The reference document data field or source includes the data value of record and the database functions as a cache for that value. The cache is used to simplify accelerated data field access for populating other documents. In a different example, the data values can be stored in the data fields of a reference document in the package and any changes to the data values can be made immediately to the respective form elements in the other documents. In a further example, the data values are stored in a database and accessed upon display of the documents in the package. For instance, when a change is made to a data value, the value is changed in the database and the next time the documents in the package are displayed, the fields are populated with the updated values stored in the database just prior to display.

At the same time or after auto-population of the documents, compliance logic can be performed to ensure the completeness, correctness, consistency, and compliance of the documents. Completeness logic helps ensure that all required documents are included in the document package for the transaction and that all required fields for each document are filled in. Rules regarding each form element are associated with the field definitions and based on the information provided by the field definition, a determination can be made that the associated form element remains blank. For example, a signature field must be signed prior to finalizing the document package for providing to the other party. If no signature has been entered, confirmation or completeness logic can identify the field and send a notification to at least one user, such as the real estate agent or client.

In one embodiment, completeness logic can be used to create status indicators that indicate unfinished elements, such as empty form elements within one or more documents. For example, the status indicators can indicate that some fields in a required document have not yet been filled in. The indicators can appear as a pop-up message or other type of notification while the user is working on the document in which a completeness error is identified, when the user leaves the document with the completeness error, or during checking of the document package. Ensuring that a document package is complete by including all necessary documents for a transaction and that all form elements within the documents of the package are filled in helps limit interactions with parties to or stakeholders of a transaction before information in the document package is complete. For instance, the system can prevent a document package from being sent to another party to the transaction for signatures before required information is filled in, which can prevent multiple rounds of back and forth communication between the parties to fix the error and result in completing the transaction in less time.

Figure 14A:
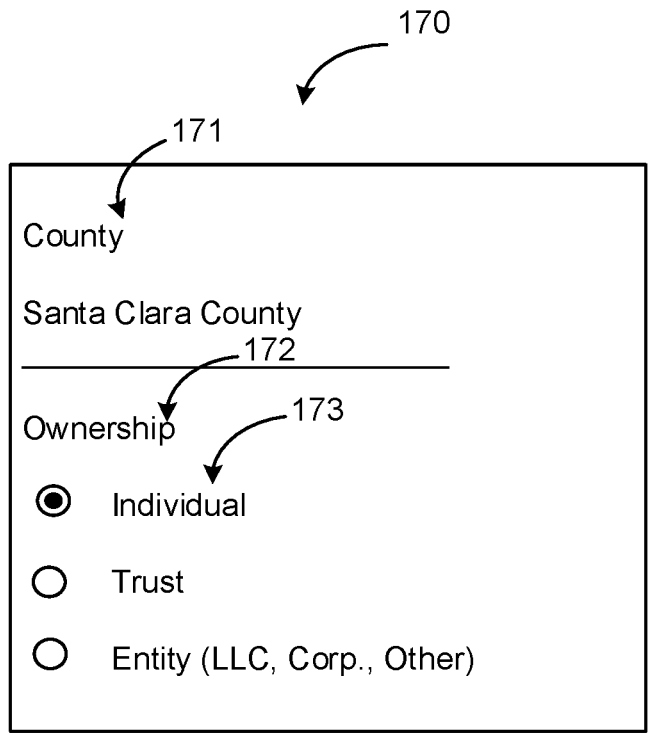
FIG. 14A is a diagram of an interactive form showing, by way of example, a portion of the cover sheet of FIG. 8.

Completeness logic can also be used to identify form elements to be added to a document depending on data values that are filled in for other form elements in documents included in the package. FIG. 14A is a diagram of an interactive form showing, by way of example, a portion of the cover sheet 170 of FIG. 8. The cover sheet 170 can include form elements for identifying a county 171 in which a property is located and the type of ownership 172 of the property, including individual, trust, and entity. In this example, the property is owned by an individual and the individual's name, which can be provided under the seller's name form element as described above with reference to FIG. 8, can be used to populate form elements associated with identifiers for the owner's name or identity.

Figure 14B:
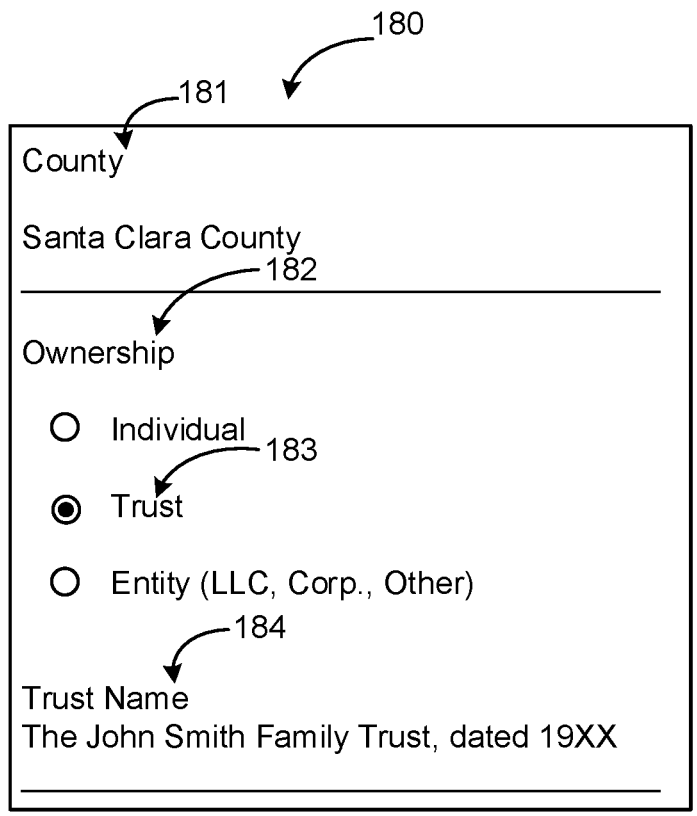
FIG. 14B is a diagram of a web page showing, by way of example, the portion of the cover sheet of FIG. 14A with a different data value.

However, additional information may be required based on a data value entered by a user. For example, if information is added indicating that a property has a swimming pool, additional forms may be required. The completeness logic can be performed to request the additional information. FIG. 14B is a diagram of an interactive form showing, by way of example, the portion of the cover sheet 180 of FIG. 14A with a different data value. The cover sheet 180 can include form elements for identifying a county 181 in which a property is located and the type of ownership 182 of the property, including individual, trust, and entity. In this example, a trust 183 owns the property, which is the subject of the transaction. However, additional information about the trust is necessary to complete the documents in the package because the previous form elements did not include a request for trust name or information about the trust. The completeness logic identifies the trust selection 183 and displays an additional field 184 for a name of the trust.

Prior to, during, or after application of the completeness logic, consistency logic can be performed to ensure that related form elements in the documents in a document package are filled in in a semantically-consistent manner. FIG. 15 is a diagram of a document template 190 with form elements 191, 192 for property price. The document 190 includes form elements for two different representations 191, 192 of the sales price (e.g., an offered sales price) for a property. In one field 191, the price data value 191 should be spelled out in words, as is common practice for paper bank checks. The other form element 192 requires the price to be entered with a currency indicator, such as a dollar sign followed by a number. The consistency logic for checking syntax can refer to the data field indicator "Prop.Sales.Price.Num," which is associated with the form element 192 for sales price number and the data field identifier "Prop. Sales.Price. St" for the sales price string of words. Based on the similarity of the identifiers, including the common portion "Prop. Sales.Price," the data value of the spelled-out field could be checked for consistency against the numeric sales price via the consistency logic.

In a further embodiment, the consistency logic together with a data entry system could derive a string representation of the sales price consistently and automatically after the numeric representation of the price is entered. The consistency logic can also identify and input the numeric representation of the sales price after a string representation of the sales price. Other form elements that can benefit from a consistency check include ensuring that the property address in numbers matches with a spelled-out version of the property number.

In addition to performing consistency logic on the document package, correctness logic can also be performed to ensure that data values populating the form element are verified by authoritative sources. Specifically, the correctness logic can identify invalid data values and provide suggestions for data values via an authoritative source, as described above with respect to FIGS. 8, 14A, and 14B. For instance, the correctness logic can identify invalid email addresses, such as those without the ampersand symbol or a domain. Additionally, the correctness logic can connect to a multiple listing service or regional database that stores addresses and utilize those addresses to provide suggestions for partial data values entered by a user for an address. Other examples of form elements on which the correctness logic can be applied include zip code and state, and street address and city, as well as many other form elements. The correctness that a particular zip code is located within a particular state can be verified by a mapping database or property records database.

Also, the data values can be checked using compliance logic, which helps ensure that the documents in the package comply with all regulatory requirements. The compliance logic can access and use one or more authoritative sources to look up a required set of documents based on the address of the property being sold. In one example, the regulatory information is entered into the compliance system by real estate subject matter experts using a Transaction Coordinator Platform. The human experts consult appropriate governmental and other sources, create document templates, and assign the templates to the proper geographic region. The document templates can be generated from documents prepared by different organizations, such as regional real estate associations and groups. Additionally, online government sources can be used to obtain information.

Finally, confirmation logic can be applied to the document package prior to sending the completed document package to the other party. The confirmation logic ensures that all of the required signing and dating of the documents are completed. A notification can be provided to the user to identify any blank fields that should have a signature or date. The notification can be provided by a pop-up notification or by highlighting the blank field. Once the document package has been populated and checked, and no errors exist, the package can be provided to the other party.

Listing-Specific Compliance

Figure 16:
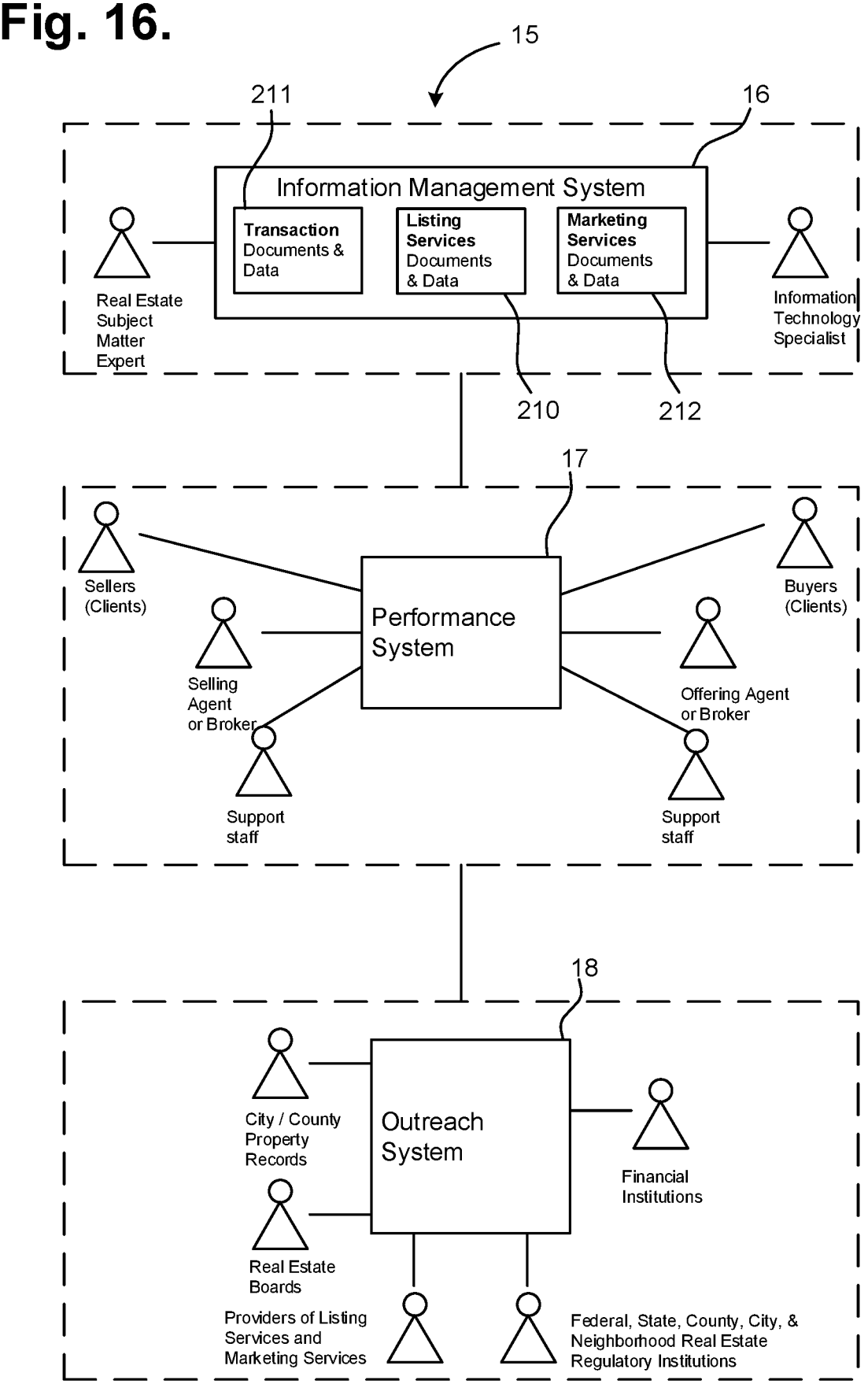
FIG. 16 is a block diagram showing, by way of example, the compliance system of FIG. 2 with listing services.

In addition to listing a property for sale, listing agents must also provide additional assistance to sellers to remain competitive. For example, listing agents can assist with recommending and managing listing services to ensure that the property is in a desirable condition for sale, including house cleaners, roof inspectors, and painters. Properties that are in good or excellent condition with strong "curb appeal" generally receive higher offers. Accordingly, listing agents can advise clients on appropriate ways to improve the marketability of the property for sale. FIG. 16 is a block diagram showing, by way of example, the compliance system 15 of FIG. 2 with listing services 210. As described above with respect to FIG. 2, the compliance system 15 includes the compliance information management system 16, the compliance performance system 17, and the compliance outreach system 18. At the level of the compliance information management system 16, real estate subject matter experts 14 and information technology specialists 30 provide information and logic representations 211 that are encoded and saved for performing compliance checking of the populated documents for a real estate transaction. Also at the compliance level, documents and data for marketing services 212 and listing services 210 can be entered by real estate subject matter experts and information technology specialists.

The listing services documents and data 210 can include service providers' names, point of contact, contact data, prices, availability, and service types, as well as other types of documents and information. The data can be used by a real estate agency to outsource the services for managing the service workflow, documentation, status checking, reporting, and communication with representatives of the services. Information about one or more service vendors associated with the information maintained by the information management service can be accessed via a listing agent or provided automatically based on an active document that triggers the outreach system to directly outsource desired services, as further described below.

Also, as described above with respect to FIG. 2, documents are identified and populated at the compliance performance system level 17 during which users, such as brokers, agents, and stakeholders to the transaction provide data regarding the transaction for populating at least a portion of the documents using the information and logic representations from the information management system 16. Once populated, compliance logic from the information management level 16 is applied to the documents to check for correctness, completeness, consistency, and compliance of the data and the documents, using the information gathered by the compliance information management system and the compliance outreach system. Prior to or during the compliance checking, the compliance outreach system 18 performs interactions with third party systems and parties to obtain additional information against which the populated documents of the transaction documents are checked. For instance, the outreach system can also contact providers of listing and marketing services to directly schedule services for a client of a listing agent.

Figure 17:
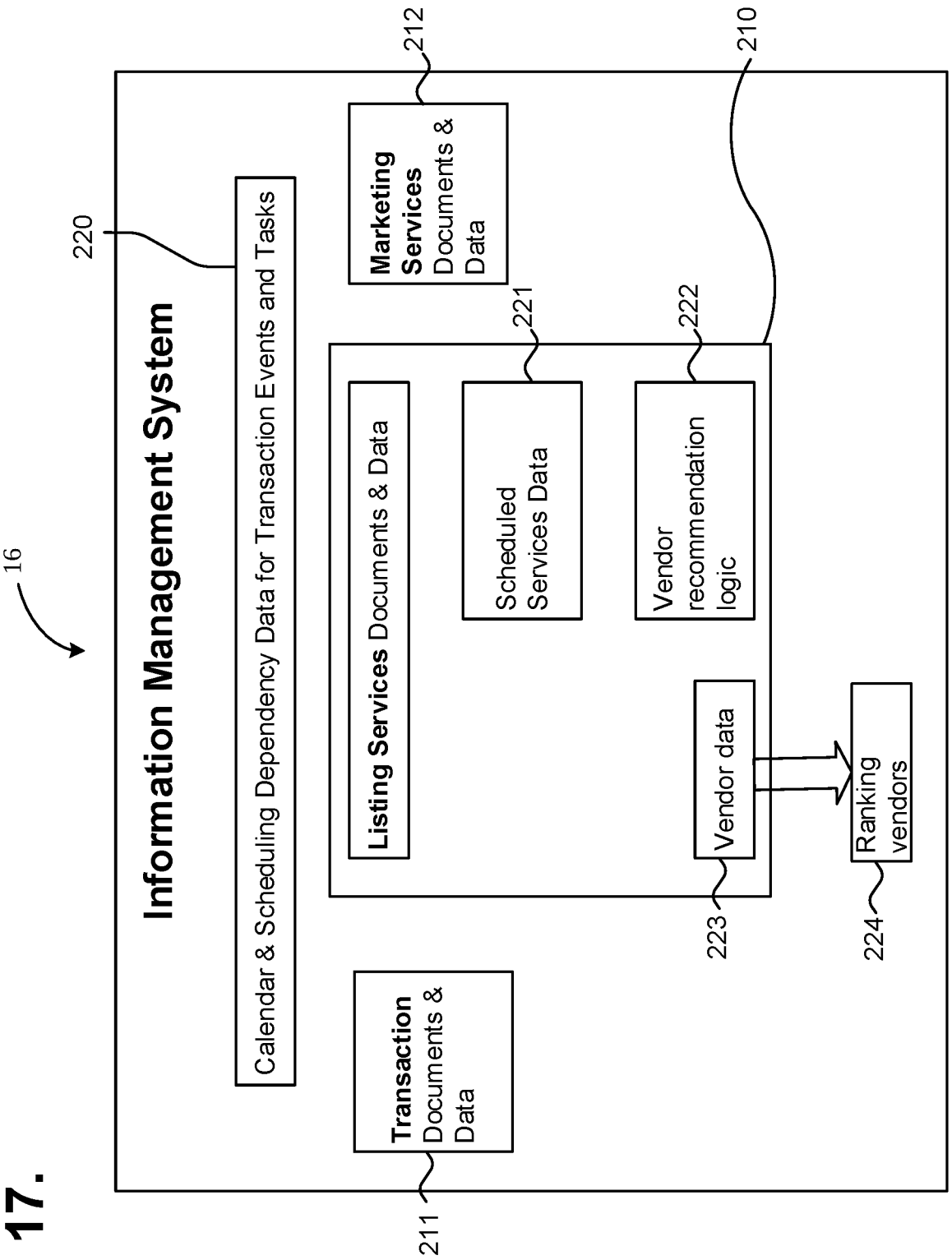
FIG. 17 is a system diagram of the information management system of FIG. 3 with listing and marketing services.

Information about the different service providers are entered and stored as a subsystem within the information management system 16. FIG. 17 is a system diagram of the information management system 16 of FIG. 3 with listing and marketing services. The information management system 16 includes transaction documents and compliance data and logic 211, which are described above with respect to FIG. 3, listing services 210, marketing services 212, and scheduling services 220. As described above, the transaction documents and compliance data and logic 211 are entered and stored for performing document population and compliance checking of the populated documents for a real estate transaction. The listing services 210 includes documents and data that are used to provide vendor recommendations to a client for one or more listing services using vendor recommendation logic 223, provide a ranking 224 or reviews of the vendors based on the vendor data 222, and schedule 221 listing services for the client. The data stored can for each vendor or service provider can include vendor name, contact information, prices, reviews, services offered, and areas in which service is provided, as well as other types of information.

When a listing service is requested manually, such as by entering a request for services, or based on populated data values in one or more documents in the document package, the request is entered into the scheduling services system 220. The scheduling services system 220 includes a calendar with entries for transaction events, listing services, marketing services, and other types of events, and is used to keep track of timing dependencies and the property sale timeline for transfer of the property.

Figure 18:
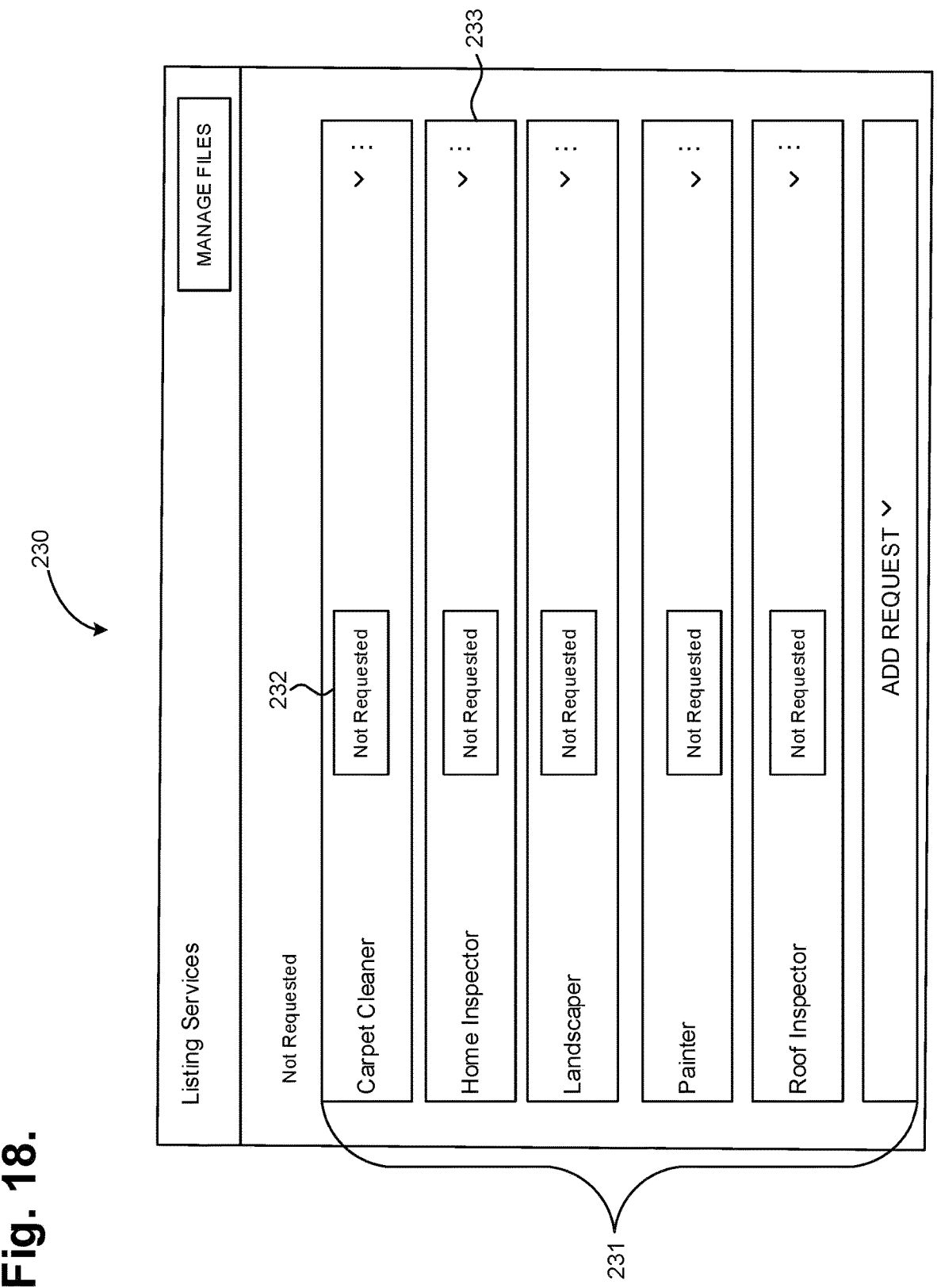
FIG. 18 is a diagram showing, by way of example, a page for displaying listing services.

The listing services are all related to activities that will help a client sell a property and can include carpet cleaning, home inspection, landscaping, painting, roof inspection and more. FIG. 18 is a diagram showing, by way of example, a page 230 for displaying listing services. The page 230 includes a list 231 of services that can be recommended and selected by an agent or broker for the client. Each service can include a status button 232 that identifies whether that service has been requested or not. Additionally, each listing can include an icon 233 for a drop-down menu to display a list of vendors for that listing service. Specifically, the drop-down menu can include the list of vendors along with information about each vendor, including name, contact information, prices, and availability. Other types of information are possible. Once service is requested from a vendor, the button 232 associated with the service can be changed from not requested to requested.

Prior to requesting service from a particular vendor, a request document can be displayed and populated with necessary information for a user, such as the agent or broker representing the client. FIG. 19 is a diagram showing, by way of example, a document 240 for requesting a listing service. The document 240 can be provided based on a request by the client, based on a selection of one of the vendors in the dropdown menu, or automatically based on previous data values entered in the document package. For example, when the user completes a property condition form and indicates that a new roof is needed, a request form for a top rated roofing company can be automatically displayed. Specific vendors can be selected based on a rank or rating, as further described below. The document can be auto-populated based on the data model and data values already provided or can be populated manually by the user.

The document 240 can include the listing service type 241, a status button 247 of the service type, a selected vendor 242, a button 243 for finding a new vendor, property access information 244, and scheduling information 245. If a vendor different than the one identified 242 is desired, the client, such as the agent or broker, or the client, can select the new vendor button to search for other vendors that provide the listing service 241. The property access information can include multiple fields for an occupancy status of the property, contact information for the individual providing access to the property, lockbox code, gate code, or other types of access information. The scheduling information 245 can include a deadline by which the service must be performed, as well as dates and times that the vendor can perform the service. The document can also include different types of information. Upon completion of the document 240, the document can be submitted via a submission button 246 to the vendor for scheduling and confirming the service. Additionally, any changes made to the request can be saved via an update button.

Prior to providing the service, a reminder notification can be delivered to one or more of the agent, vendor, and client via the calendar and scheduling system. FIG. 20 is a diagram showing, by way of example, a reminder notification 250 of a listing service. The reminder notification 250 can be delivered via email, hardcopy letter, text, Instant Message, or fax, as well as via different methods. The reminder notification 250 serves to remind individuals associated with the listing service when and how the service will be performed. Recipients of the reminder notification can include the agent or broker user, the client, or the service provider. In one embodiment, the reminder notification an also be transmitted to another calendaring system, such as maintained on a mobile device.

The reminder notification 250 can include a summary 251 of the request, including property address and type of service requested, details regarding the vendor 252 to provide the service, information 253 to access the property, date 254 by which the service must be performed, scheduling preferences 255 for the service, additional information 256, metadata 257 regarding the request, and a list 258 of any files associated with the request, such as directions to the property and property drawings. Other types of information are possible. Any changes to the request can be identified with an "updated" status and a further reminder notification can be delivered with the updated information.

The list of vendors available or provided to a user can be customized for a particular client or a group of clients by the real estate agent, the real estate agent's team, or brokerage. The information for each vendor can be entered into the information management system, in addition to any notes prepared by an individual with the brokerage. The notes can be used by the recommendation system to determine whether that vendor should be provided as a recommendation to ensure that the vendors that are most reliable and cost efficient are recommended. In a further embodiment, the recommendation system can outreach to other online review and recommendation systems to obtain information about each vendor.

The recommendations can be provided to the agent or broker via the listing service request document. FIG. 21 is a diagram showing, by way of example, the document 260 of FIG. 19 with listing service recommendations. As described above in FIG. 19, the request document 260 can include listing service type 261, vendor information 262, and property occupancy, as well as other types of information. The vendor information 262 can allow for display of vendors that provide the service type 261. The display can be provided in a list or drop-down menu 263 and include one or more vendors. The list or drop-down menu 263 can include a scroll bar if a number of vendors exceeds a threshold for display. The vendors to be displayed can be selected automatically based on or more selections factors, including service area, ratings, reviews, or cost, manually selected by an individual associated with the user, and selected based on the populated data values. Other selection factors are possible. The user can select one of the vendors for sending the request by highlighting 264 the name of that vendor.

Figure 22:
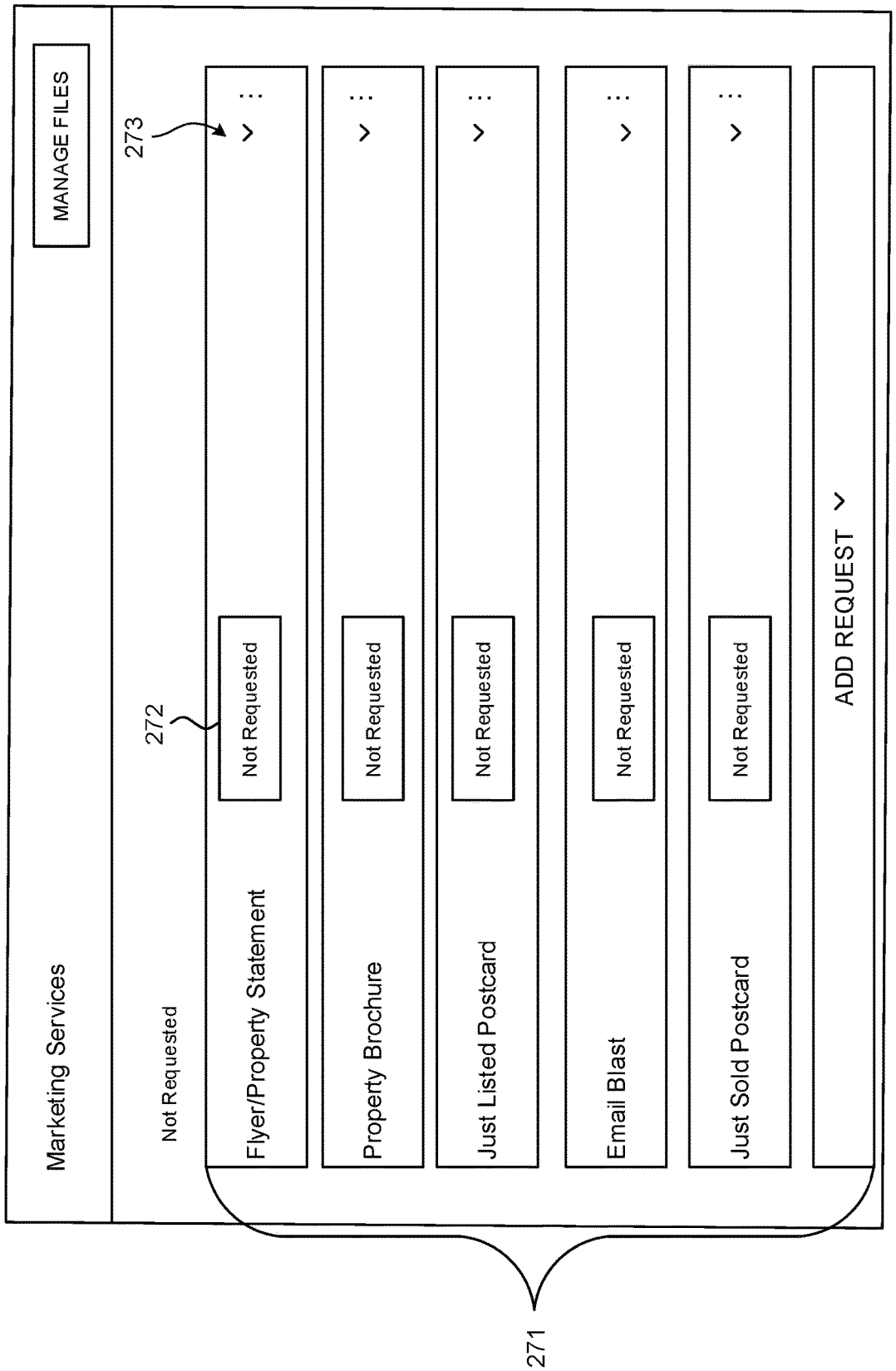
FIG. 22 is a diagram showing, by way of example, a page for displaying marketing services.

Agents and brokers can also help their clients to maximize marketability during a listing transaction by customizing marketing services. FIG. 22 is a diagram showing, by way of example, a page 270 for displaying marketing services. The page 270 includes a list 271 of marketing services that can be recommended and selected by an agent or broker to facilitate sale of the property. The marketing services can include generating a flyer or property statement, a brochure, a "just listed" postcard, an email blast, and a "just sold" postcard. Other types of marketing services are possible.

Each service can include a status button 272 that identifies whether that service has been requested or not. Additionally, each listing can include an icon 273 for a drop-down menu to display a list of vendors for that marketing service. Specifically, the drop-down menu can include the list of vendors along with information about each vendor, including name, contact information, prices, and availability. Other types of information are possible. Once service is requested from a vendor, the button 272 associated with the service can be changed from not requested to requested. The vendors for the marketing services can be customized or selected by the user, an individual associated with the brokerage, or automatically, as described above with respect to FIG. 21. Further, information regarding the marketing services searched, identified, scheduled, or rendered can be maintained via blockchain, as discussed in detail below with respect to FIG. 27. Brochures, flyers, and other marketing materials are useful to advertise the property for sale. FIG. 23 is a diagram showing, by way of example, a page 280 with a flyer 280. The flyer 283 can be generated on the page 280 automatically using data from the information management system or can generated by the user. The page 280 can include a title of the flyer 281, a list of photographs 282 of the property, the flyer 283, and data fields for use in the flyer, including price 284, headline 285, and description of the property 286.

Other types of information to be included in the flyer are possible, such as website on which the property is available and an address of the property. The addition of text or any changes to text already included can be saved via the submit changes button 287. Subsequently, the flyer is distributed to other parties to advertise the property.

As described above, the compliance system simplifies the selection and filling out of real estate forms and agreements, keeps track of the status of documents and the disclosure of information, and assures compliance checking. Additionally, the system supports agents and their clients by providing categories of listing services, recommending preferred vendors, and coordinating interactions between clients and vendors.

Managing Public Real Estate Transaction Information

Documentation of the real estate transaction is important to properly record in order to protect the rights of people to own and use particular parcels of land and land-related resources. However, the transparency and accountability of documentation is subject to several obstacles. Generally, the documentation of a real estate transaction includes the chain of title transaction records, tax records, records of easements, records of liens, inspection reports, and other documents mandated for compliance requirements. Although buyers and sellers may have their own copies of records, their copies can be lost, discarded, damaged or destroyed over time. Property owners rely on other institutions to maintain backup or master copies of various documents.

In traditional systems, a large set of stakeholders provide and keep copies of separate and distinct parts of the required documentation. The stakeholder institutions include county offices, lenders, title insurance companies, property inspectors, research reporting organizations, and others. The parties to a transaction and the real estate brokerage may also keep copies.

A difficulty with this approach is that if a challenge arises later about a transaction, gathering the official records of the transaction may require getting documents from many institutions and is extremely time consuming. If discrepancies arise between versions of the records, the forensic methods for assessing fault and tampering are hampered because few of the institutions employ technology that is well-protected by computational security safeguards and adequate redundancy. Furthermore, the institutions themselves may have been replaced, gone out of business, or changed their record keeping systems. The institutional records are subject to failure in long-term document storage since traditional paper-based records are subject to the usual hazards of being damaged, misplaced, or lost over time.

Additionally, digital records are also subject to loss over time and to media failure, while legacy databases can potentially become obsolete as new generations of computers and databases are deployed. Further, errors in transaction documents can be introduced as institutions update their legacy computer systems and migrate records from legacy systems to new ones. Institutional effort in maintaining quality records depends on the available funds, skills, and vigilance of the institutions to maintain records going back through generations of previous computer systems and institutions.

Similarly, listing agents and/or buying agents make a series of judgement calls about services and advice offered to clients, and documents about the professional performance of agents is generally outside the scope of government-held public record systems and mostly covers information about the services performed by the agent. If an issue arises after the sale, preserving information about listing or purchase services offered by agents can be important for the client, agent, and sometimes other stakeholders, such as the brokerage. Currently, the records containing this information are generated and preserved by multiple sources including records kept by the seller, client, records kept by the selling broker, records kept by the buying broker, records from financial institutions, reports from inspectors, reports from real estate researchers, and others.

Blockchain for Real Estate Transactions

Such obstacles of recording publicly accessible transaction documents and confidential records regarding the transaction can be overcome by bringing together all the important records of a real estate transaction and recording the records in an accountability blockchain ledger with a timestamp so that all of the documents for a transaction are available at once in a single block on a blockchain under a compliance and accountability blockchain approach. A traditional blockchain approach is not sufficient for managing real estate transaction documents, but a compliance and accountability blockchain approach provides document generation, compliance, and secure storage for real estate transactions using a centralized or decentralized approach for public access of the stored documents, as well as a one- or two-tier approach for storing and replicating document records. Hereinafter, the phrases "compliance and accountability blockchain approach" and "accountability blockchain approach" are used interchangeably with the same intended meaning, unless otherwise indicated.

Figure 27:
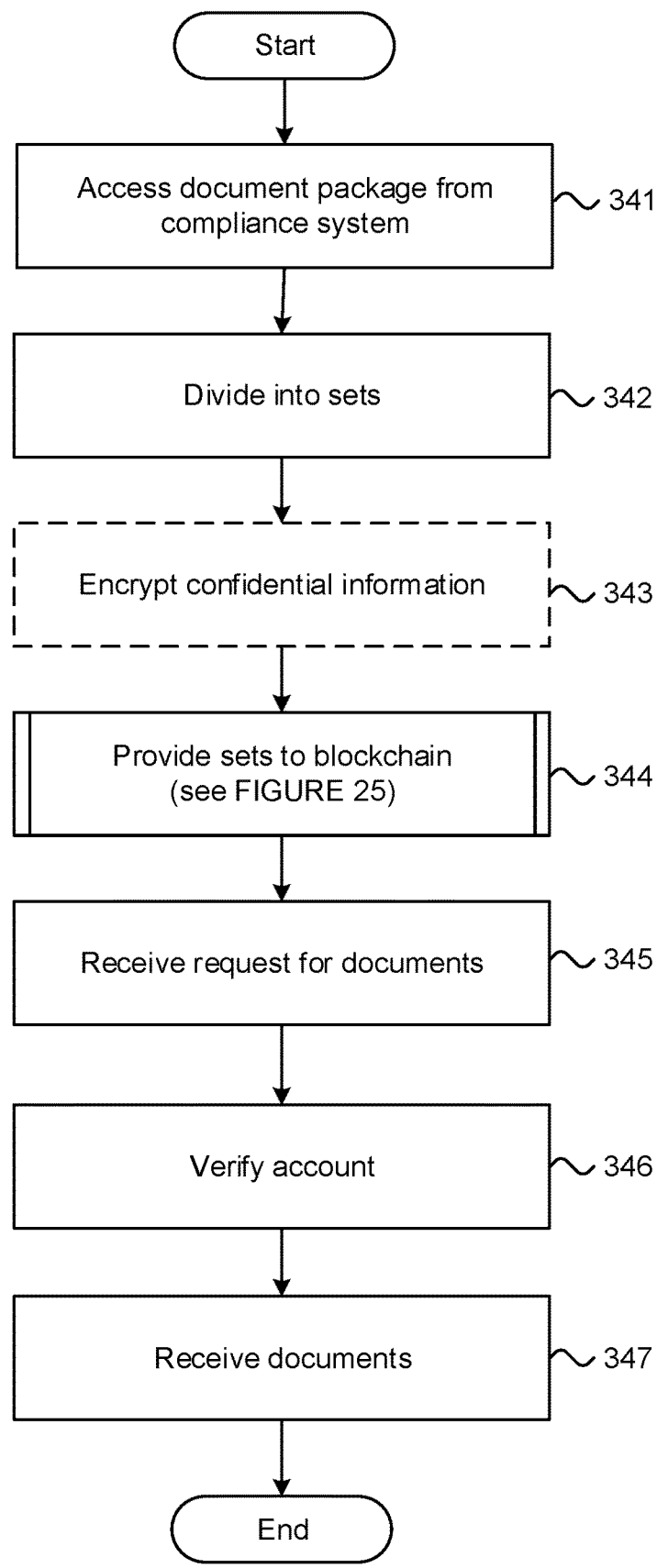
FIG. 27 is a flow diagram showing by way of example, a process for maintaining confidential documents related to a listing or real estate transaction.

The documents provided to the accountability blockchain can be publicly accessible as described in commonly-owned U.S. patent application, titled "Blockchain-Based System and Method for Document Transformation and Accountability," filed Sep. 4, 2019, and commonly-owned U.S. patent application, titled "Multi-Tier Blockchain-Based System and Method for Document Transformation and Accountability," filed Sep. 4, 2019, the disclosures of which are hereby incorporated by reference, or remain confidential with access only to the parties of the property transaction, unless otherwise approved, as described below with reference to FIG. 27 and in commonly-owned U.S. patent application, titled "Blockchain-Based System and method for Purchase Document Transformation and Accountability," filed Sep. 4, 2019, the disclosure of which is hereby incorporated by reference. The accountability blockchain is a continuously growing set of records or "blocks" forming a ledger of transactions. The blocks are linked and secured by cryptographic methods. Each block includes the data of a real estate transaction together with a timestamp and a cryptographic hash of the previous block.

The accountability blockchain is managed by a peer-to-peer network where nodes, such as an electronic device, adhere to a protocol for inter-node communication and for validating new blocks. Once recorded, the data in any given block cannot easily be altered retroactively without altering all of the subsequent blocks. Such alteration is difficult due to requiring consensus of the network majority. The accountability blockchain approach allows participants to verify and audit transactions. In this way the blockchain resists modification of the data maintained. The blockchain can be multi-tier and utilize supernodes that act as recorders.

The accountability blockchain approach briefly described above for securely maintaining real estate transaction documents and generating an active record of the documents is not merely the use of a current blockchain implementation and generation of the accountability blockchain required many obstacles to be overcome. For instance, in addition to obstacles regarding maintaining real estate transaction documents, another concern is that the documents may not be genuine, such as not authorized by the required authority or exact same versions of the formal documents signed for the transaction. To ensure that all transaction documents are authentic, each document can be digitally signed by the authorizing parties and a record of the collection of documents for the transaction is also digitally signed. The digitally signed documents helps ensure that the saved transaction documents are authenticated and are the exact versions used in the transaction.

Once stored, there is a potential of deliberate alteration of the transaction records by parties that are motivated to change the historical record. For conventional paper public documents, when master copies are made available for public inspection, there is always the risk that they might be removed, damaged, altered, or replaced by altered versions. Digital records are also potentially subject to alteration and deletion depending on the security measures that are in place. They are particularly at risk when the security teams of institutions with low budgets are not skilled in security practices and technologies.

To ensure that transaction documents are secure and free from alterations and modifications, the accountability blockchain approach is deployed to preserve the public record, including strong computational security provisions, and to protect records against destruction or tampering. The traditional blockchain approach can be tailored to support real estate transactions and provide an open and distributed ledger for recording the data of real estate transactions between parties in a verifiable and permanent way, as well as to maintain and track confidential records regarding the transaction.

An additional concern regarding maintaining transaction documents is that an individual repository of digital information is subject to catastrophic failure, either by natural disaster, media failure, or deliberate damage by a motivated party. However, the accountability blockchain approach is generally decentralized and distributed across many computers. Peer-to-peer networks have no central point of failure. When nodes in a blockchain validate transactions, they broadcast the completed transaction documents to other nodes. Every node in the network has its own copy of the blockchain, resulting in massive database redundancy. The massive redundancy of the network assures that any damage to a single node does not prevent access to the public records on the blockchain. In this way, the cryptographic mechanisms and high redundancy of blockchain ledgers provide forensically-inspectable records and high barriers to tampering that do not rely on the security provisions of any individual institution.

Storing Large Transactions on Blockchain

Digital transaction systems need to operate correctly even across international boundaries and under different legal systems and regulatory rules to ensure that the transaction documents are available to be accessed anywhere and to ensure that the records are complete. Further, there is no central all-region legal authority to hold independent international systems accountable. To ensure proper functioning of the transaction system, the accountability blockchain approach provides a computational basis for establishing trust. The nodes (operated by "miners") gather the records for a transaction to create a new block in competition with one another. In general, selecting the creator of a next block to be distributed across the network to avoid centralization would discourage the stable continuance of a large distributed network.

The accountability blockchain approach briefly described above for securely maintaining real estate transaction documents and generating an active record of the documents is not merely the use of a current blockchain implementation and generation of the accountability blockchain required many obstacles to be overcome. Conventionally, most blockchain implementations, such as Bitcoin, were designed to record anonymous financial transactions and to keep node costs down and to encourage many organizations to add nodes to the network, the system requirements for nodes require only a minimum of storage for saving transaction data. For example, in 2017, saving the entire Bitcoin ledger required only 125 gigabytes of free disk space and the amount of storage of content data per transaction in this network is about 40 bytes. See Peck, Morgen E. & Moore, Samuel K. Special Report: Blockchain World. IEEE Spectrum, October 2017. Also, as of January 2017, there were approximately 6000 bitcoin nodes in that digital currency network. See Connel, Justin. How Much Does it Cost to run a Full Bitcoin Node? News Bitcoin.com, Feb. 23, 2017. The health of the network depends on having many blockchain nodes, preferably at least thousands of nodes.

In designing new generations of blockchain systems for real estate transaction and other applications beyond the original application of digital cash, there is a competing need to store and make accessible large blocks of data on the network over the long term. The accountability blockchain approach balances the requirement for a large pool of low-cost nodes to robustly record the consensus of transactions with the requirement that nodes have substantial storage and computational costs. Thus, one embodiment of the accountability blockchain employs a network with two layers of nodes to reconcile these requirements. For example, the accountability blockchain approach can include a medium-sized network of supernodes (e.g. hundreds to thousands of nodes) that bundle the real estate transaction package and robust, transparent and enduring storage and can also include a larger network of 1st-tier nodes (e.g. tens of thousands or larger nodes) for notarizing hashes of the 2nd-tier transactions.

Recording transactions in a distributed ledger of the blockchain has less value if the information cannot be reliably, efficiently, and accurately retrieved. As the number of documents grows, the challenges and resources increase for maintaining robust storage and efficient retrieval of them all. A design concern is that the expense of storing so much data could over time create an obstacle to wide participation by supernodes on the block chain. In conventional blockchain systems for currency, the ongoing storage costs are relatively low. The costs of maintaining long-term are offset when nodes win enough commitment races such as is expected by proof-of-work protocols.

In one embodiment of the accountability blockchain approach, subsets of supernodes under contract can store only subsets of the documents. For example, some supernodes could select which transactions to store based on location or value or some other content-related criterion. In other alternatives, every nth transaction can be stored and there could be an allocation scheme that limits the number of nodes on the network that are licensed to store only subsets of the transactions. In that way, supernodes could specialize in markets, storing specific categories of documents they store.

A known potential risk in conventional decentralized server networks for storing files is that some of the servers could cheat by not actually keeping copies of the files. Instead, when they receive a retrieval request, they make a retrieval request to other nodes on the distributed storage network. The problem with such selfish behavior is that document storage on the network becomes less redundant and robust. Various "proof-of-storage" technical approaches have been proposed to enable catching server nodes that cheat Cecchetti, Ethan, Miers, Ian, Juels, Ari. One file for the Price of Three: Catching Cheating Servers in Decentralized Storage Networks. Hacking Distributed blog, Aug. 6, 2018 and van Dijk, Marten, Rivest, R. L., Juels, Ari, Stefanov, Emil, Operea, Alina, Triandopoulos, Nikos. Hourglass Schemes: How to Prove that Cloud Files are Encrypted. CCS'12 (ACM Conference on Computer Security), 2012.

In an effort to discourage or prevent cheating, the accountability blockchain approach can include verification protocols that raise the costs of cheating. The methods are similar to proof-of-work ideas in that they create complexity challenges in storage and retrieval that raise the costs of serving up the documents on request. The extra complexity of the approach is offset at least in part by relaxing the requirement that all supernodes store all of the data.

The compliance and accountability block approach can provide document generation, compliance, and secure storage using a centralized or decentralized approach for public access of the stored documents, as well as a one- or two-tier approach for storing and replicating document records. The phrases "compliance and accountability block approach" and "accountability blockchain approach" are used interchangeably with the same intended meaning, unless otherwise indicated. Such an approach includes verification protocols that raise the costs of cheating. The methods are similar to proof-of-work ideas in that they create complexity challenges in storage and retrieval that raise the costs of serving up the documents on request. The extra complexity of the approach is offset at least in part by relaxing the requirement that all supernodes store all of the data.

As briefly discussed above, the idea is to admit classes of contracts and servers that agree to store only portions of the entire ledger for specified periods of time. The expectation of long-term storage and retrieval would fail under conditions when storage and retrieval reimbursements are fixed, the cost of ongoing storage become too high and there is a fixed penalty for a node to stop providing the service. Furthermore, if the only remuneration for long-term storage is given up front when the block is committed, there can be a lack of incentives for new supernodes to join the network over time.

An inherent problem with "forever" guarantees covering perpetual file storage and retrieval is that that the costs of reliable storage and retrieval for any particular file accumulate over time whereas the value of most documents decreases with time. Whenever the network fails to retrieve documents from the ledger, there is potentially a loss of reputation and goodwill for the network. This loss reflects on the entire network since the network as a whole may at times stop storing some of the documents.

In practice, supernodes could have time-delimited commitment contracts for guaranteed reliable storage and retrieval of the documents subject to loss of stake on failure to keep the contract. This limits the long term contractual and financial risks for supernodes. However, a difficulty with relying solely on time-limited contracts and fixed fees to maintain a viable set of supernodes is that the future costs of storage, retrieval and communication are not perfectly known. As costs go up and down, new supernodes that can take advantage of changes in costs to out-compete older supernodes operating on fixed contracts. Judging from the history of property ownership records in history, it is likely that rapid access to most records of transactions older than a few hundred years would have limited value.

The accountability blockchain approach could also include a document storage and retrieval market with ongoing incentives for document storage and retrieval. Such a market can allow variable fees for retrieving scarce or otherwise expensive documents, based on such factors as the age of the transaction, the location of the property, and so on. In addition, the approach could use an auction to adjust the cost of retrieval to vary with the value of the service. These variations in the different embodiments enable trade-offs between the costs of storage, retrieval efficiency, and the public's good for having low-cost access to the information.

Figure 24:
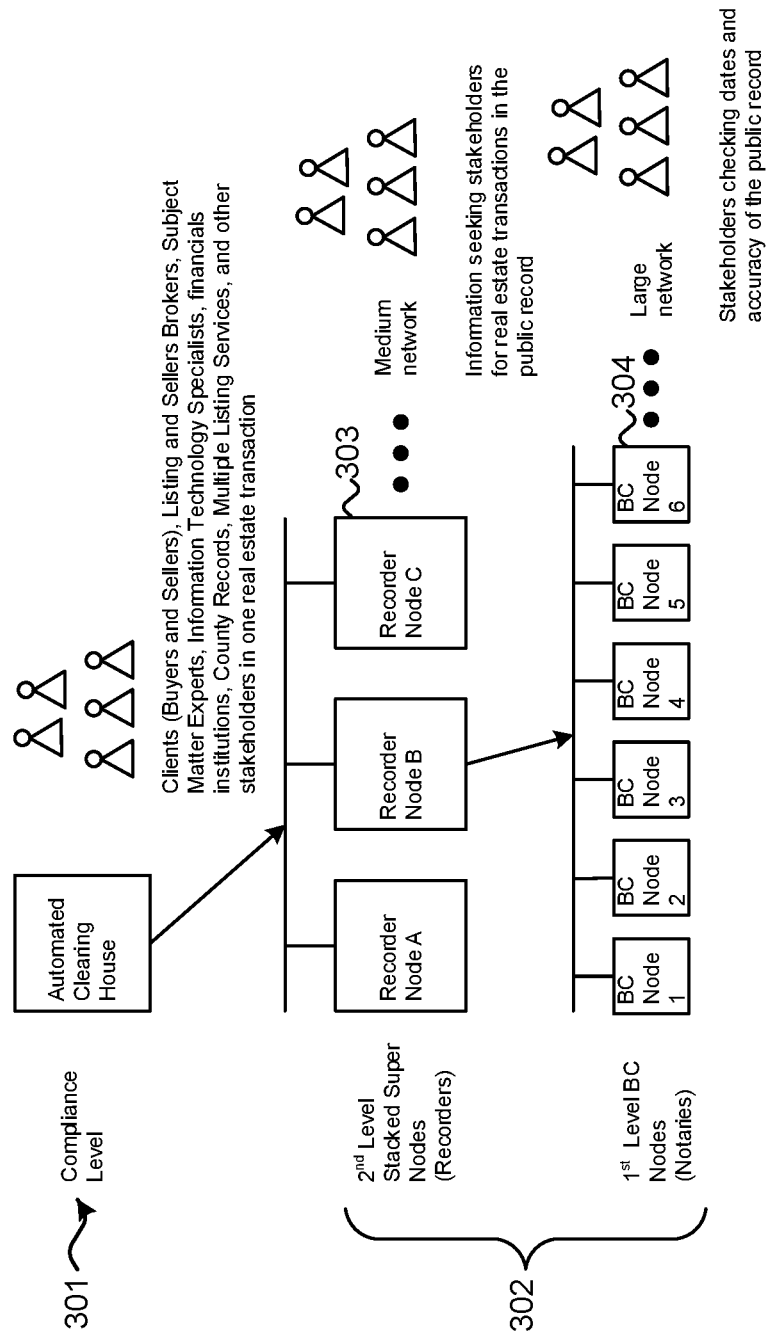
FIG. 24 is a block diagram showing a system for document transformation and accountability.
Figure 38:
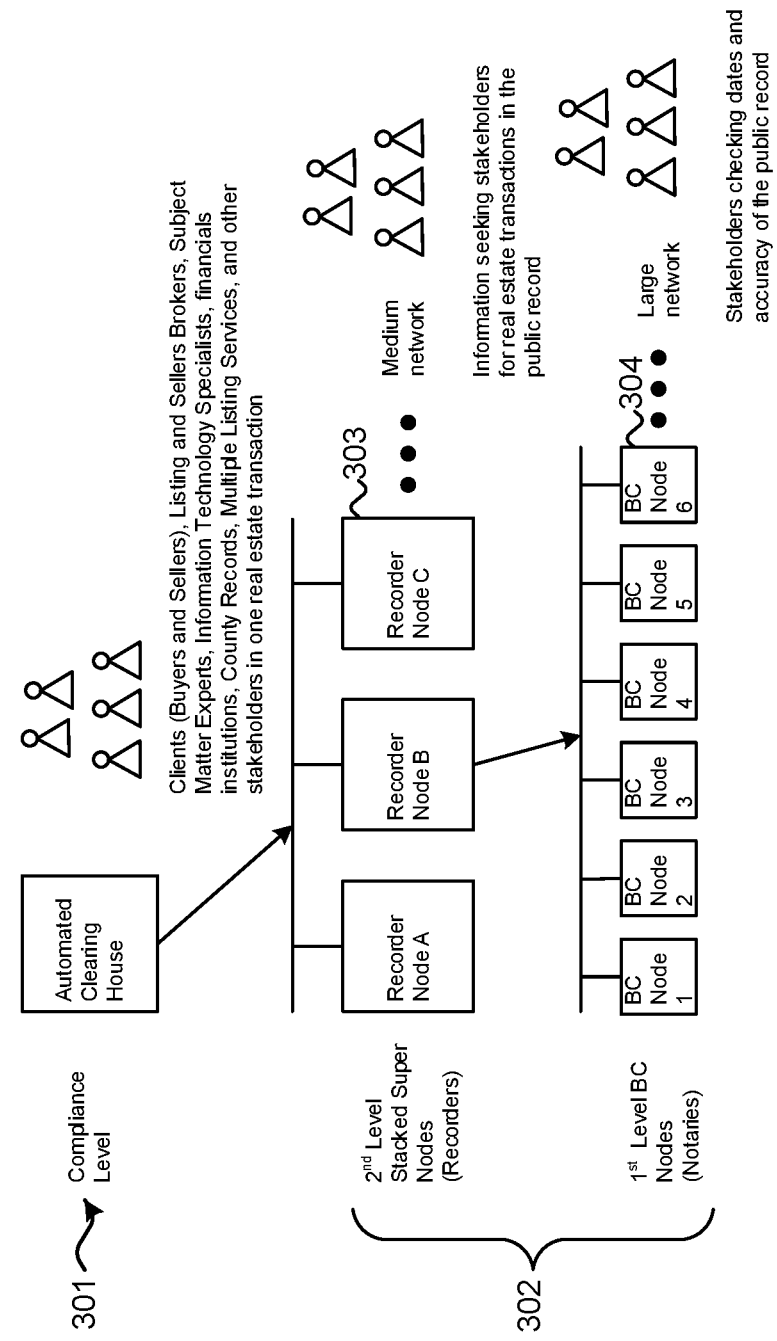
FIG. 38 is a block diagram showing a system for document transformation and accountability.

In summary, the design challenges of the accountability blockchain approach for real estate is to balance the requirement of large storage capacity on nodes with the requirement for enabling a large pool of low-cost nodes to robustly record the consensus of transactions. To ensure scalability and liveliness, the accountability blockchain approach includes a multi-tier system. Scalability refers to the capacity to operate at a larger scale, such as a large number of real estate transactions, while liveliness refers to operating at a quickly enough for large scale data across many nodes. FIGS. 24 and 38 are block diagrams showing a system 300 for document transformation and accountability. The system 300 includes a compliance information management system 301, and a multi-tier blockchain. The compliance information management system 301 is described above in detail with respect to FIG. 2 and is a client and stakeholder-facing platform that is responsible for generating and transforming documents for a real estate transaction, as well as ensuring that the documents are in compliance with local and federal regulations, are correctly populated, and are complete. The compliance information management system 300 is concerned with one real estate transaction at a time.

Once a transaction is complete, the transaction, including the documents, are stored on the multi-tier blockchain, which is responsible for maintaining a long-term data base of real estate transactions. In one embodiment, the multi-tier blockchain can include two tiers, with second-tier supernodes 303 that act as recorders of the transaction and first level nodes that act as notaries. The nodes can be electronic devices, including computers, phones, or other computing device, with an IP address and a connection to the Internet. In one embodiment, the second-tier can include hundreds to thousands of supernodes, while the first-tier can include more nodes than the second-tier, such as tens of thousands of nodes. However, other numbers of nodes and supernodes are possible and typically larger numbers are preferred.

The second-tier holds the tamperproof public records and makes the appropriate information available to the public. The second-tier supernodes 303 are similar to the country recorder offices in real estate transactions, and validate and store the large document package for each transaction, including the executed contract, the chain of title, and the funding of escrow, among other documents. The document package can be the same package generated by the compliance system, including those added via the compliance system, such as a copy of the property deed. In a further embodiment, the documents can be different, including only a subset of the documents in the package from the compliance system. For example, the subsets can be generated by separating all documents for public access and not for public access. Further, the second-tier supernodes can be used to check compliance or investigate a quality of service provided by an agent long after a transaction was completed by maintaining listing information of the seller.

The second-tier nodes or compliance system bundle up and sign the package of information, compute a cryptographic hash of the information package, and provide an accessible public record of the document package. The package of information can be bundled and signed, such as via the compliance system an immutable record of the information package can be computing, such as a cryptographic hash, to provide an accessible public record of the document package. The supernodes 303 allow stakeholders to seek information regarding real estate transactions in the public record. The first-tier includes nodes 304 to provide a vastly redundant record of all transactions, while performing a distributed and tamperproof notary service that improves the security and tamper-resistance of the second-tier. The nodes 304 of the first-tier act as notaries and allow stakeholders to check dates and accuracy of the public record. The stakeholders can include owners of the property, as well as institutions, such as county offices, lenders, title insurance companies, property inspectors, research reporting organizations, and others.

Each of the nodes 304 in the first-tier and the supernodes 303 in the second-tier can maintain a ledger, which is a record of the transactions stored as blocks on the blockchain, that is available to the public. For instance, the blocks of each transaction form the ledger. When each of the nodes and supernodes has a copy of the ledger, alteration of the record is much more difficult. However, in a further embodiment, less than all the nodes and supernodes can be associated with a ledger.

Node Selection on the Blockchain

Figure 25:
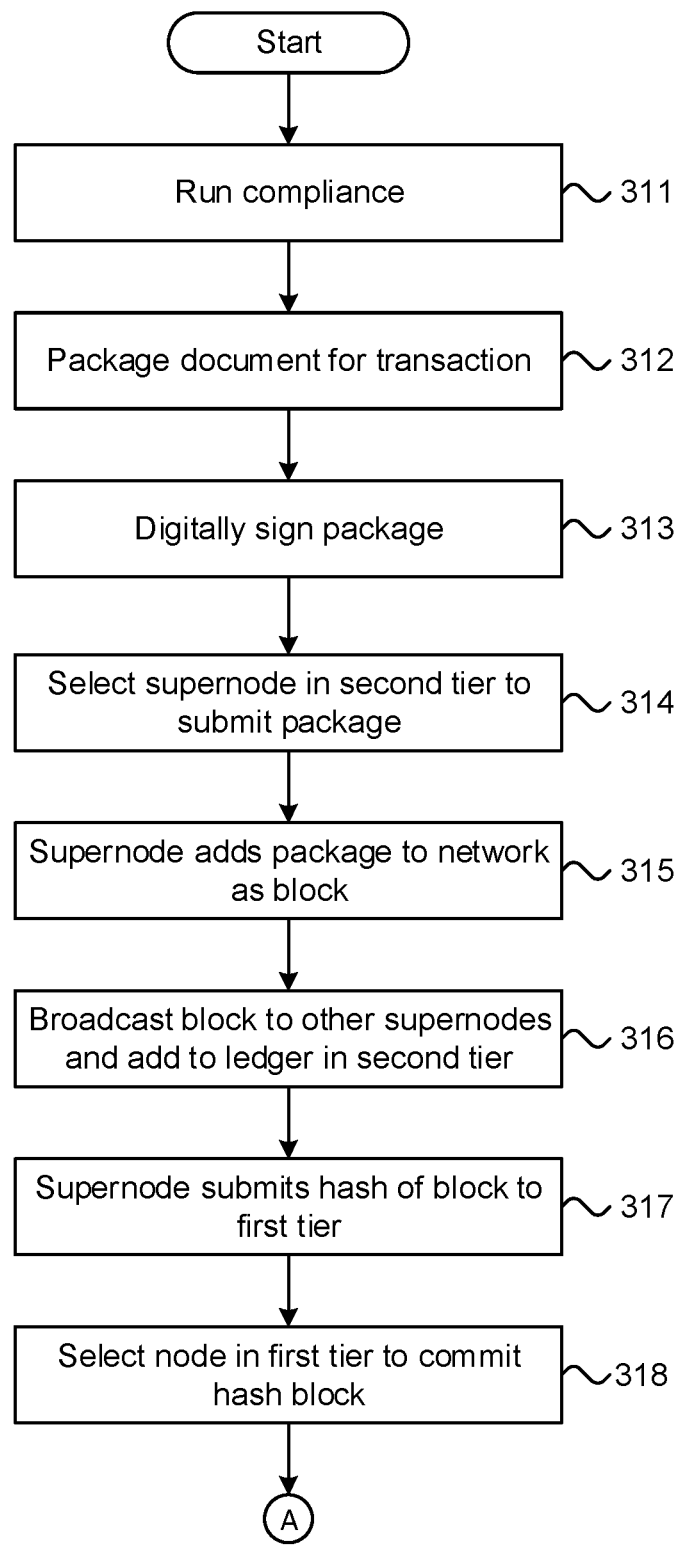
FIG. 25 is a flow diagram showing a method for document transformation and accountability via blockchain.

The document packages for transfer of real property are recorded as blocks on the blockchain after at least one of the documents have been generated and reviewed for compliance, as described above with respect to FIGS. 1-14. FIG. 25 is a flow diagram showing a method 310 for document transformation and accountability via blockchain. One or more documents, such as the real estate sale and purchase agreement, are processed (block 311) for transfer of a property through the compliance system, described above with respect to FIG. 2 (including optionally running a compliance check), and a document package is generated (block 312) for the real estate transaction. The document package can include the executed contract for the real estate transaction, a chain of title for the property of the transaction, and a record of the property funding, among other documents. In a further embodiment, the document package can be divided into sets for different treatment. For instance, the document package can be divided into documents that are confidential and documents that are to be made available to the public, as further described in detail below with respect to FIG. 27.

The document package is then digitally signed (block 313) by the parties to the transaction. Additionally, all conditions of the agreement must be satisfied, including payment of an earnest money deposit by the buyer. In one example, the deposit can be three percent of the agreement upon price of the property; however, other deposit amounts are possible. Once all conditions of the executed contact have been satisfied, such as the packing signing and payment of earnest money, the document package is submitted to the second-tier network of the accountability blockchain. Other conditions that must be satisfied prior to providing the document package to the blockchain are possible.

Prior to entering the second-tier of the accountability blockchain, one of the supernodes is selected (block 314) for adding the document package as a block to the second-tier network. Selecting the supernode is further described in detail below with respect to FIG. 26. The block is also broadcast (block 315) to the other supernodes and added (block 316) to the blockchain ledgers maintained by the supernodes at the second-tier with a timestamp. In one embodiment, each supernode can store a copy of the entire ledger for at least a predetermined amount of time. In a further embodiment, subsets of the supernodes can each store only a subset of the ledger. Further still, supernodes may be specialized and store only a particular type of data, such as transactions occurring in Washington or in California. Other methods for storing copies of the ledger are possible.

The selected supernode submits (block 317) a request for notarization of the block to a first-tier node selected for recordation, as well as an immutable summary record, such as a cryptographic hash, of the transaction documents of the block that have been validated by the supernode. At a minimum the immutable summary record of the block is that if the documents are changed, the record is recomputed and the new record will differ from the original. A further property for the immutable summary record includes difficulty to make a change or a series of changes to the document, such that the record for the changed document is the same as the record of the original document.

The request for notarization can be provided by the selected supernode prior to or after committing the block to the second-tier network. The first-tier nodes compete to be selected to commit the hashed block to the first-tier and the selected node is paid a transaction fee. Also, the selected node provides the hashed block to the other nodes in the first-tier for committing (block 319) to the blockchain of each node. Specifically, the hash of the transaction is committed as a record. Accordingly, each node acts as a notary of the network and provides a robust, broadly decentralized record of the transaction. Since multiple nodes keep a record of the transactions the record is difficult to alter. Also, since the transactions are each stored as a block in a chain of blocks, altering data further in the chain is extremely difficult without altering all of the subsequent blocks. The document package can then be accessed by the public for viewing, such as via a computer.

Figure 26:
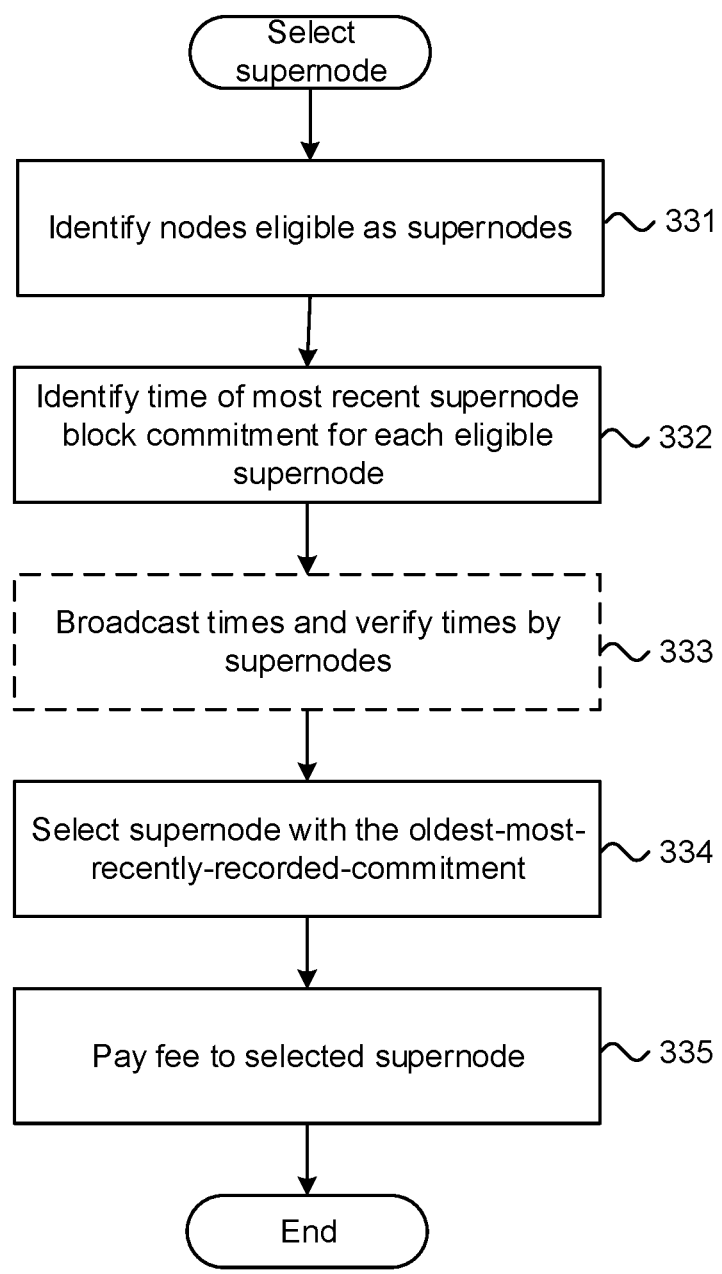
FIG. 26 is a flow diagram showing, by way of example, a process for selecting a supernode for block recordation.

When a document package first enters the accountability blockchain, selecting the supernode for committing the block to the second-tier is important to prevent any one supernode from having a central and dominant role. In one embodiment, the supernode with the least-recent-block-recording can be selected. FIG. 26 is a flow diagram showing, by way of example, a process 330 for selecting a supernode for block recordation. First, those nodes that qualify as supernodes are identified (block 331). In a proof-of-stake approach, a minimum stake is predetermined to identify a set of nodes that qualify as supernodes. In one embodiment, the stake can be a dollar amount, such as $100,000. However, other dollar amounts are possible. In a further embodiment, the dollar amount can change in a periodic auction to assure a robust, but not too large set of supernodes. The staking minimum is held as a security deposit and is lost to the network if a user tampers with the factuality of a transaction.

A time of the most recent supernode block commitment can be computed (block 332) by each supernode from the blockchain itself (e.g., from the second-tier blockchain). Specifically, a time that each supernode most recently committed a block to the second-tier is determined for each supernode. Optionally, the times can be broadcast (block 333) from each supernode to each other supernode for verification. In one embodiment, maintaining the times on the ledger should be immutable. Subsequently, one of the supernodes (e.g., an available supernode) with the oldest-most-recently-recorded-commitment is selected (block 334) to lead the commitment of the current document package as a block in the second-tier. However, the supernodes must reach consensus regarding selecting the supernode with the oldest-most-recently-recorded-commitment. In one embodiment, a short time period is designated during which each member of available supernodes participates in a consensus vote to identify the least recent recorder. To determine availability, the supernodes broadcast notices of availability at a frequent interval, such as in time with heartbeats, and are considered fresh if the notices of availability are no older than a longer interval, such as ten seconds. However, other times for the notice intervals and for determining freshness of the notices are possible. Supernodes may be unavailable, such as when undergoing maintenance or are busy. Finally, all of the supernodes broadcast their inferred determination of the next node according to the recency rules.

Once selected, the supernode can receive (block 335) a fee for leading the commitment of the current block. In a further embodiment, all the supernodes can receive a fee. Once the current block is recorded, the recording recency of the selected supernode is updated to the current time and that node cannot be selected again until the current transaction is older than the most recent transactions of all the other available supernodes.

Consensus regarding recency of recordation can be confirmed when all supernodes maintain complete logs of a transaction. However, if the logs are not complete, consensus can be reached using a certain percentage of the supernodes, such as two-thirds, that agree on the supernode with oldest-most-recently-recorded-commitment. If such percentage is met, consensus is reached and that supernode is selected. For example, the Byzantine Fault Tolerant algorithm <reference> can be used to determine consensus. After consensus is reached, all of the supernodes validate the block signature representing an owner of the supernode, and cryptographic hash and add the block to the second-tier blockchain.

Other methods for selecting the supernode for commitment of the block are possible. In a proof-of-work approach, the first node to solve a cryptographic puzzle and present a valid block to be committed, is the node that gets selected to record the new block and paid for the service. A node trying to add a new block must provide a cryptographic proof-of-work along with it. Different kinds of proof of work can be used, such as such as a hash function, integer factorization, or guided tour puzzle protocol. One approach is for nodes to solve the challenge of computing a specified kind fixed-length hash of the data where the first part of the hash is a string of zeroes of given length. If more than one miner finds a solution, the one with the earliest timestamp is selected.

A proof-of-work-with-stake allows those supernodes that have a minimum large stake to be eligible. A first eligible supernode to complete a proof-of work commits the block and receives the fee. The proof-of-work can include a mathematical puzzle, such as a hash function, integer factorization, or guided tour puzzle protocol. The puzzle should be difficult, but not too complication to prevent a delay in committing the block. Generally, there is no time limit to complete the puzzle and report proof-of-work and thus, can be subject to potential collusion by selfish miners. For example, selfish miners find a solution early and prove it with a verifiable time stamp, but then do not report the solution. To prevent such problem from occurring, selfish mining can be prohibited by pools that command less than one fourth of the resources, such as in selfish mining.

Another embodiment for selecting a supernode and reaching consensus includes a combination of proof-of-work and least-recently-recorded transaction. The first node to complete the proof-of-work is selected unless that supernode added the most recent block to the network. In that case, the next supernode to complete the proof of work within a predetermined time is selected.

Deterministic random distribution can also be used to determine consensus of a supernode selection and provides a known uniform random number generator that is used by all of the supernodes in the second-tier pool of supernodes that meet the minimum large stake. The seed of the random number generator is subset of the digits of the hash (e.g., the middle ten digits of the hash) of the previously recorded node, scaled to the size of the pool. The produced random number is used as the index of the supernode in the list of supernodes sorted by their IP addresses. If the designated supernode has not produced the next record within a time interval, the process repeats. An unlikely failure mode is that the seed number produced is less than the number of nodes in the pool. In that case, any of several techniques can be used to increase the size of the seed. For example, a known large constant could be added to the seed or a string of known positive digits could be pre-prepended to the seed. Other methods for reaching consensus are also possible.

Alternative Implementations

Additionally, other configurations of the accountability blockchain approach are possible. For instance, rather than a network of second-tier supernodes, a set of second supernodes can exist. As another example, a set of second supernodes can exist in which long-term storage differs. In the blockchain approach, the real estate transaction data is stored on the blockchain. In the alternative, each second-tier node uses its own means to store the data, such as in a database.

Any one of the supernodes in the set can bundle the transaction for submission to the first-tier network for notarizing. Further, the second-tier supernodes can employ approaches other than block chain to provide robust long-term storage, such as publicly-visible ledgers that preclude changing old records. Any one of the supernodes in the set can bundle the transaction for submission to the first tier network for notarizing.

A further embodiment includes a single-tier network of supernodes (e.g., a single homogenous network of supernodes) that commit real estate document packages to storage on a distributed storage network, such as a blockchain. All of the nodes provide enough storage for document packages and use a blockchain approach for distributed and decentralized storage and accountability of the information and the first-tier network is not needed because the supernodes will notarize the packages.

In still a further embodiment, a single-tier blockchain can be used, including, for example, first tier network nodes, as described in commonly-owned U.S. patent application, titled "Single-Tier Blockchain-Based System and Method for Document Transformation and Accountability," filed Sep. 4, 2019, and in commonly-owned U.S. patent application, titled "Single-Tier Blockchain-Based System and Method for Document Transformation and Accountability via Different Node Types," filed Sep. 4, 2019, the disclosures of which are hereby incorporated by reference. The single tier of nodes can record the property transactions, which can be stored and maintained over time as a chain of title. The actual documents can be stored on a centralized server or in a traditional database and a check sum can be performed to ensure that no tampering is present.

The accountability blockchain approach, as described above, has focused on documents that are to be made publicly available. In addition to or in lieu of the publicly available documents, the accountability blockchain approach can be used to provide reliable, tamperproof access to confidential information about a property transaction. For instance, a listing agent's services include appraising and pricing a home, getting properties ready for sale, marketing, showing properties, receiving purchase offers, negotiating price, arranging inspections, delivering disclosures to sellers, negotiating requests for repairs, and arranging for escrow and closing.

Today, most of these functions are performed in manual, time-consuming, error-prone, and expensive ways, and the information regarding the listing agent's services and specifics of the transaction process remain confidential. While, some information becomes publicly available, such as the purchase agreement and deed, other information related to the transaction need not be available to the public since they are not central for determining chain of title, documenting liens, or providing a basis for tax records. The confidential information can include correspondence between the real estate agent and client, a list of properties discussed and viewed, documentation about when a seller was advised about whether to make certain property repairs in preparation for a sale, documentation about disclosures to be provided to a potential buyer, or documentation with advice bearing on whether to accept a particular offer from a buyer. Other types of confidential information are possible.

Storing Confidential Information on the Blockchain

Depending on the jurisdiction, records of inspection reports and acknowledgements are part of a service record and are material to the record of the execution of the contract between a seller and a listing agent. Although the documents may be material to whether the listing agent acted in the best interests of the buyer, they are not necessarily appropriate for public distribution. However, maintaining such information can be extremely important to help prevent disputes, but also help settle any disputes that arise. For example, if further information becomes known to the seller or listing agent after the transaction, either party may come to believe that important information was withheld during the process that had adverse effects on them. Addressing the issues would include careful examination of the documentation. Yet, the sellers may not have kept complete copies of the document package and want to rely on the listing brokerage, which now has a conflict of interest in assisting them. The sellers may believe that their copy of the document package is missing some information or that it differs from what they remember. The copies of the document package kept by the listing agent may differ in critical places from the document package kept by the sellers. Either party may suspect that the other party tampered with their copy of the documents in order to cover up some issue.

To help prevent disputes and maintain a clear record of facts or actions during the transaction, a complete copy of the document package, including contract-related information, may be stored via the accountability blockchain approach. FIG. 27 is a flow diagram showing by way of example, a process 340 for maintaining confidential documents related to a real estate transaction (e.g., a listing transaction). A document package is accessed (block 341) from the compliance system, including documents that are to be made publicly accessible and documents that are material to execution of the property transaction, but need not be publicly accessible. The document package can then be divided (block 342) into two or more sets of documents for committing to the blockchain. The documents can be divided by author, subject, date, or publicly accessible versus non-publicly accessible documents. Other factors for dividing the documents in the package are possible.

Once divided, any subsets of documents that are not publicly accessible can be optionally encrypted (block 343) as confidential information. Next, each subset of the documents can be provided (block 344) to the blockchain via the second-tier supernodes and first-tier nodes, as described above in detail with respect to FIG. 25. The blockchain mechanisms for guarding against tampering apply to these records in the same way as for guarding public information. This confidential information can be encrypted to inhibit public access. Decryption keys can be provided to both to the sellers and the listing agent, to give them long-term access to the information on the blockchain.

To ensure that the confidential documents are only accessible by authorized users, different stakeholders can have different accounts based on the types of information that stakeholder is allowed to access. For instance, when a stakeholder needs to access the confidential documents for publicly accessible documents for a property transaction, the user can login to his account and submit (block 345) a request for a particular set of documents. The account of the requesting stakeholder can be verified (block 346) and if valid, the requested set of documents is provided (block 347) to the stakeholder. Finally, prior to receipt or after receipt of the documents, a private key of the requesting stakeholder can be used to decrypt the documents in the set.

For the public real estate transaction data, such as buyer and seller identification, property, transaction time, property price, easements, and other relevant information, multiple listing services with which the listing and selling agents have subscriptions, can be used to retrieve the information from the second-tier supernodes. Information protocols analogous to or compatible with protocols used for MLS services can be created, and information query and delivery services can be offered to other MLS providers.

Further, unauthorized release of the confidential documents can be tracked to the releasing party by using a watermark. For example, secret keys are kept or distributed for the sellers and the agent. The keys can be used later in retrieving and decrypting the documents off the blockchain. Neither the seller nor the agent would have the capacity to change what is on the blockchain. Two copies of, for example, non-public documents can be kept on the blockchain—one encrypted by a key for the seller and the other encrypted by a key for the agent. Each copy can be digitally watermarked to show the "seller's copy" or the "agent's copy." The watermark can be specific to that stakeholder so that if the stakeholder releases the documents without prior authorization, the stakeholder's identity can be determined to address the situation with that stakeholder. Accordingly, the documents provided to different stakeholders can be the same documents with different watermarks so that both parties have an interest in keeping the non-public information private. If a copy becomes distributed to the public, the watermark shows which party was responsible since their key had to be used in the release.

Purchase-Specific Compliance and Services

Figure 28:
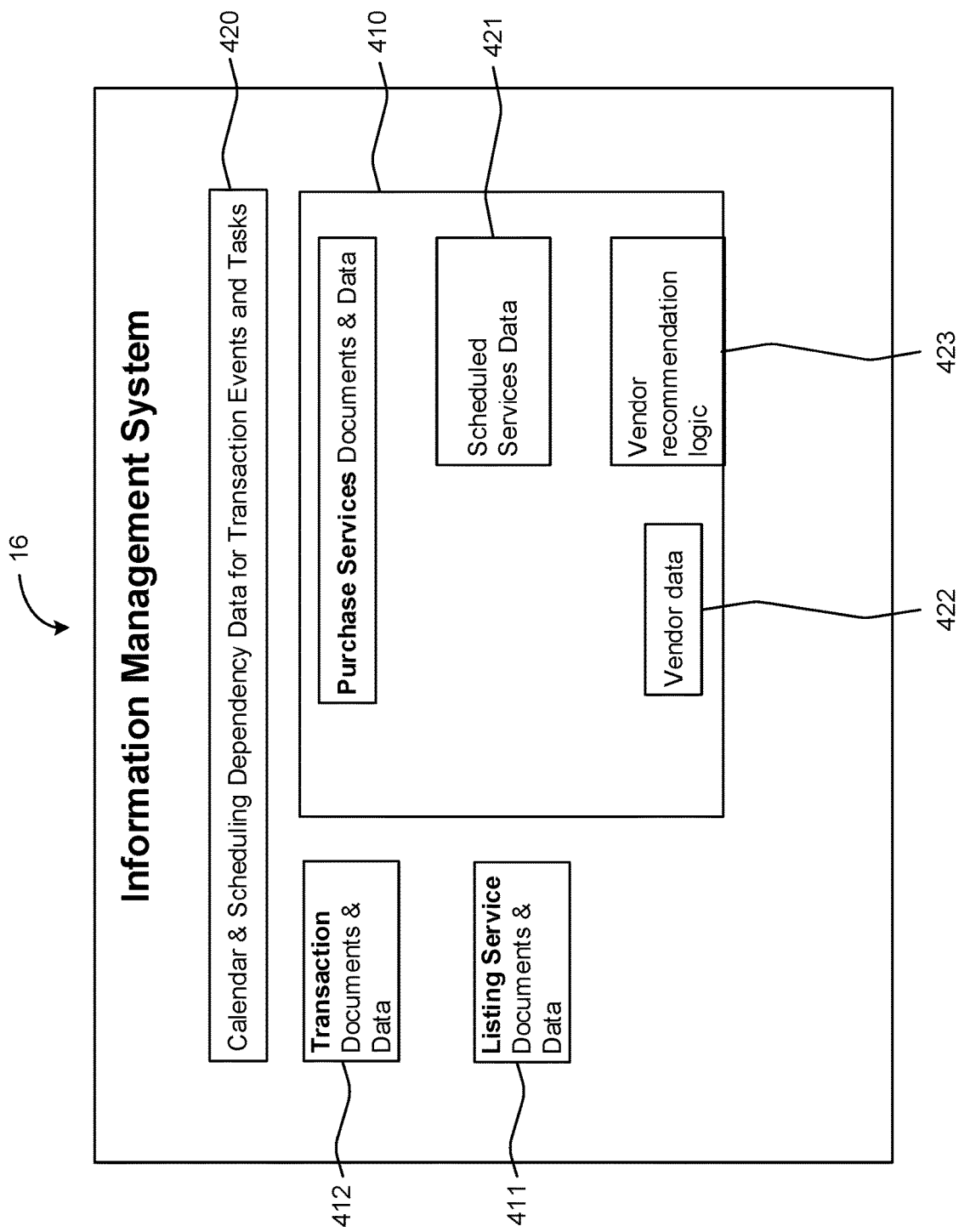
FIG. 28 is a system document of the information management system of FIG. 3 with purchase services and marketing services.

Information about the different vendors are entered and stored as a subsystem within the information management system 16. FIG. 28 is a system diagram of the information management system 16 of FIG. 3 with purchase services. The information management system 16 includes transaction documents and compliance data and logic 412, which are described above with respect to FIG. 3, listing services 411, which are described above with respect to FIG. 16, purchase services 410, and scheduling services 420. As described above, the transaction documents and compliance data and logic 412 are entered and stored for performing document population and compliance checking of the populated documents for a real estate transaction. The purchase services 410 includes vendor data 422, vendor recommendation logic 423, and scheduled services data 421. Successful buying agents often help their buyer clients by providing customized services, such as recommending and arranging inspection services and warranties. For instance, in an offer for the property, the buyer client may have indicated a desire for particular inspections, such as a home inspection. However, other types of inspections are possible. The purchase services 410 includes documents and data that are used to provide vendor recommendations to a buyer client for one or more purchase services using vendor recommendation logic 423 and vendor data 422. The data stored can for each vendor or service provider can include vendor name, contact information, prices, reviews, services offered, and areas in which service is provided, as well as other types of information.

When a purchase service is requested manually, such as by entering a request for services, or is based on populated data values in one or more documents in the document package, the request is entered into the scheduling services system 420 along with scheduled services data 421. The scheduling services data 421 can include vendor availability, as well as the availability of the buyer client. The scheduling services system 420 includes a calendar with entries for transaction events, listing services, marketing services, purchase services, and other types of events, and is used to keep track of timing dependencies and the property sale timeline for transfer of the property.

Prior to providing and recommending purchase services, a buying agent assists buyer clients in looking for a property for purchase. To identify properties of interest for the buyer client, the agent collects initial transaction information via a cover sheet, as described in detail above with respect to FIG. 8. FIG. 29 is a diagram of an interactive form 430 showing, by way of example, a different embodiment of the cover sheet 431 of FIG. 8. The interactive form 430 can include a navigation bar for an index 432 of interactive forms for the property transaction and a display of the cover sheet 431. Specifically, the index can include the cover sheet for obtaining data regarding the buyer client, a listing of documents selected for inclusion in a document package for the purchase of the property, a proof of funds for purchase of the property, signed disclosures, a pre-qualification for loans, purchase services for providing vendor recommendations and warranties, and marketing services.

The cover sheet 431 can include fields for the buying agent and buyer information, such as first and last names, email address, phone numbers, current residential address, and status of ownership of the property at the current residential address. In one embodiment, the cover sheet can include different data fields based on a situation of the buyer client and information provided by the client. For example, buyer clients often form a relationship with a buying agent prior to identifying a house for purchase and if so, the cover sheet does not include or does not receive data regarding an identity of the property for purchase. However, if a property for purchase is identified, the cover sheet can be more comprehensive and information for the property can be entered into the cover letter. For example, FIG. 30 is an interactive form 440 showing, by way of example, a comprehensive cover sheet 441. The comprehensive cover sheet 441 can be used when a buyer client has already identified a property on which to place an offer and includes more data fields than a cover sheet for a buyer client that has not yet identified a property. For instance, the comprehensive cover sheet 441 can include data fields 442 for identifying the property for purchase, including MLS identification, MLS number, APN number, and address. Additionally, the coversheet 441 can include information about the buying agent, such as contact information, license number, and real estate agency, and information about the purchaser, such as name and contact information. Other data fields are possible.

The data collected via the cover sheet can be used to generate a data model for the property transaction, as described above in detail with respect to FIG. 9. The data model collects and records data during the transaction process and utilizes the data to populate an agency disclosure assignment formalizing the agent/client relationship, as search parameters for identifying potential properties for purchase, and for populating documents for purchase of the property. Additionally, information about the property or the buyer client collected after population of the cover sheet can be added to the agency disclosure assignment and purchase documents using the system logic, such as consistency and completeness.

Once the buying agent and buyer client relationship has been formalized, the buying agent can identify and show the buyer client different properties of interest. The buying agent can utilize a web-based information source, MLS service, or other types of sources to search for properties using parameters, such as location, price, size, and property type, as well as other types of search parameters. An MLS service provides information to agents about properties that are coming up for sale.

A search for properties is conducted based on one or more parameters entered by the buying agent and results can be displayed. However, if no properties are identified that fit the search parameters, nearby or close alternatives that do not precisely match the parameters, but which are closely related can be suggested. The buying agent can obtain information about one or more of the properties by clicking on a link, picture, or listing of that property in the result list.

The purchase services described in detail above with respect to FIG. 28 can allow the buying agent to deliver search results and other documents to the buyer client, including online or printed brochures to prevent the buyer client from becoming confused after viewing multiple properties. Additionally, a log of properties suggested by the buying agent and viewed by the buyer client can be generated. Ideally, a buying agent should show or describe all properties on the market that are available and meet the buyer client's interest to satisfy legal requirements regarding housing discrimination and increase the buyer client's satisfaction with the buying agent. The log helps the buyer client from confusing the different properties for consideration, but also maintains a record of the properties for the buying agent. Accordingly, should issues later arise where a buyer client questions whether they were made aware of a particular property, the log provides evidence that the property was recommended and possibly visited.

Transforming the Purchase Agreement and Document Package Dynamically

Figure 31:
FIG. 31 is a diagram of an interactive form for generating an offer or a counter offer.

After the buyer client has selected a property of interest for placing an offer, an offer may be generated. The elements of an offer often include terms and conditions, a target date for closing, earnest money deposit or a promissory note, method for adjusting real estate taxes, rents, utilities, provisions for paying title insurance, survey, and termite inspections, among other elements. FIG. 31 is a diagram of an interactive form 450 for generating an offer or a counter offer. The interactive form 450 can include a navigation bar for an index 451 of pages for generating documents, such as the offer, for the property transaction. Under the document selection in the index, a user, such as the buying agent or buyer client, can select 452 a template for a set of purchase documents, such as an offer, for inclusion in a document package for the property transfer, as described in detail above with respect to FIG. 11. The different templates for the purchase agreement documents can be based on one or more of a type of property for purchase, a location of the property for purchase, and a professional organization that created the templates. A buying agent is generally responsible for advising buyer clients on the different types of purchase agreement documents that best meet the clients' interests. Different agreements can take different approaches to establishing responsibilities, risks, and liabilities for buyers.

In addition to the purchase agreements, one or more additional forms or documents may be needed for inclusion with the purchase agreement. The additional forms can include contingencies for the sale of a property owned by the buyer, a remove of such contingency, notification about propane tanks, requirements for increased deposits, historical disclosures, common interest developments, visual inspections, appraisals and waivers of appraisal contingencies, fireplace disclosures, bedbug disclosures, time extensions, earthquake hazards, buyer inspections, lead based paint disclosures, market condition advisories, square foot advisories, compliance of water heaters, and parking and storage disclosures, as well as other types of forms and documents. As a property transaction progresses, information may be uncovered during inspections and disclosed to buyers and sellers. Accordingly, the document package changes over time as more data is obtained and further documents are generated. The user can conduct 453 a search for specific documents to add to the offer or counter-offer in the document package via a document search tool 453 and select 454 one or more specific documents, such as results of a document search, for inclusion in the document package, which are displayed in a document listing 454. A generate document button 456 can be used to generate documents for inclusion in a document package, such as by filling in form elements in the templates. Presuming that this button is used by a buyer's buying agent, it would generate an offer document to be presented to the seller and listing agent.

The documents, once selected, can be automatically populated with data collected via the cover sheet and included in the data model, as well as by additional data collected in one or more other documents in the document package depending on the data available when the document is selected for inclusion in the package. Finally, once all the documents and information are selected and completed, a generate offer button 455 can be selected for gathering all the documents as the offer.

Figure 32:
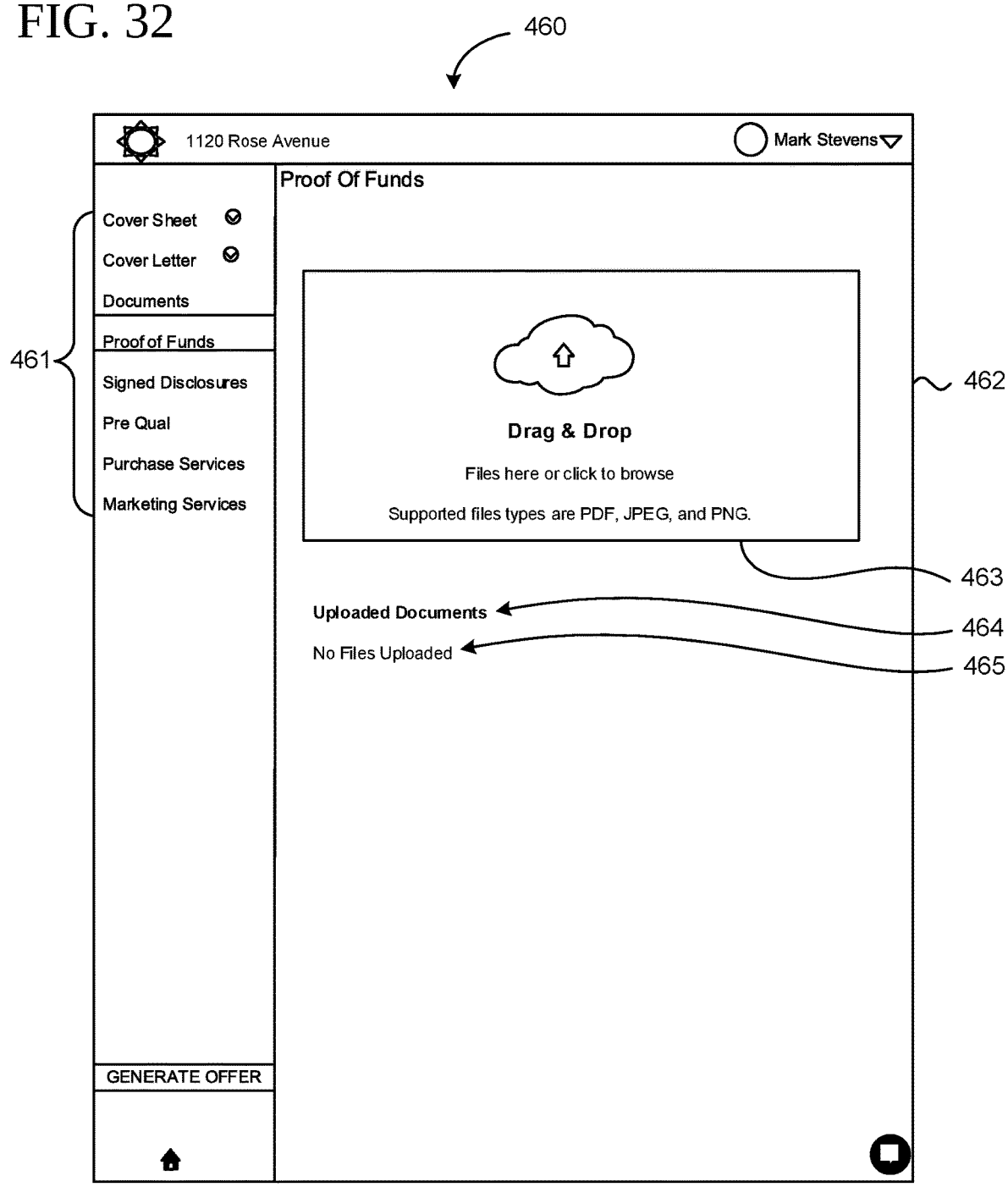
FIG. 32 is a diagram of an interactive form for uploading documents.

Additional documents can also be uploaded by the user. FIG. 32 is a diagram of an interactive form 460 for uploading documents. The interactive form 460 includes a navigation bar for an index 461 of pages for generating documents, such as the offer, for the property transaction, and a document upload section 461. The document upload section 461 can include a document upload box 463, a list of uploaded documents 464 and links 465 in the list to access the documents. The documents uploaded by a user include supporting documentation for an offer, such as a cover letter, proof of financing, loan prequalification document, description of contingencies, proposed dates and payment for inspections and information gathering to resolve risk issues. For example, a buyer client may wish to write a cover letter to the owner of a property for sale explaining why the client wants to purchase the property. The cover letter can be included with the offer documents. FIG. 33 is a diagram showing, by way of example, a cover letter 470. The cover letter 470 can include a name of the seller or sellers, a message from the buyer client, and the buyer client's name. Other content for inclusion in the message is possible.

The user can upload documents by dragging and dropping such documents. A checklist of the documents for inclusion in the property transfer documents, such as the offer, can be generated and maintained. Once one or more documents in the checklist have been uploaded, the checklist can be updated to reflect receipt of the documents. Further, notifications for one or more documents can be generated if not received or maintained by the system.

Compliance and Offer Generation

Other types of documents to be added to a package can include inspection elections of the buyer. During the property transfer process, the buying agent should recommend investigation of the property for any risks. Accordingly, an inspection advisory document can be generated for inclusion with the purchase offer, added to the document package, and signed by the buyer client. The inspection advisory document indicates that expert reports can be requested, outsourced, and produced, in addition to any advice from the buying agent regarding any risks associated with the property. FIG. 34 is an interactive form 480 for displaying a document for buyer inspection elections. The interactive form 480 provides a document for buyer inspection elections 481 and a signature box 482. One or more inspections can be selected by the buyer client, such as by clicking on a "yes" box. The election of an inspection triggers automatic inclusion of additional forms for recommending or ordering inspections and for providing reports on the results via the compliance logic. For example, if the buyer client selection a lead pain inspection, then a lead based paint disclosure form can be added to the document package along with other forms. The lead-based paint disclosure form can require disclosure of information from the seller and authorization to allow the buyer to have a lead paint inspection performed. Subsequently, the buyer client can enter his signature via the signature data field 482. The document for the inspection elections can be added to the document package for the property.

Once all the documents have been added to the package for an offer on a property for sale, a generate offer button can be selected by the user. The generate offer button can be on all the pages in the index so that a user can generate an offer at any time. After the offer has been generated, the user can send the document package for the offer to the listing agent of the seller.

Once an offer has been accepted by the seller, the buyer client can arrange inspections, such as those which were identified in the offer. For every inspection that is ordered on the property, a home inspection form can be created for use by the buyer client to schedule an inspection. FIG. 35 is a diagram showing, by way of example, an interactive form 490 for generating an inspection request. The interactive form 490 can include a navigation bar for an index 491 of pages for generating documents, such as the offer, for the property transaction, and an inspection request form listing 492. The inspection request form 492 can include a request identifier 493, which indicates whether the inspection associated with the form, such as a home inspection, has been requested by the user, and a name of the form 494 to be filled out. The user can manually enter data in the form by typing answers or can elect to use the autofill feature 495, which populates the inspection form 492 with data already maintained by the system. The inspection form 492 can include data fields for vendor 496, property type 498, property access information 499, including property occupancy 500, individual providing access to the property 501, notification and code for any lockbox 502, and any gate code 503. To select a particular vendor for performing the inspection, a user can select a new vendor button 597 and search through a list of vendors for the inspection service desired. The list of vendors available for selection can be created by the real estate agent's team or brokerage. Alternatively, the information technology specialists or real estate experts can enter the list of vendors. Once the user is ready to submit the request, the user can select the submit request button 504.

Once a date and time is selected for conducting the inspection, the appointment can be entered into a calendar and scheduling system maintained by the system for the property transaction. In one embodiment, each property transaction is associated with a calendar of tasks and appointments for that transaction. The calendar can be used to review the tasks and identify one or more of a dependency between two or more of the tasks, a timing conflict for performing two or more of the tasks, and an interaction between two or more of the tasks. Further, notification reminders of the inspection appointments can be generated and sent to the users, such as buying agent and buyer client. The notification reminder can include a task, along with notice that a deadline for completion of the task is approaching; an assignment of the task; or a re-assignment of the task. A dashboard showing the status of activities can also be provided.

The inspection request form listing 492 can also include bars 505 for other types of inspections with a status bar indicating whether that particular service was requested 493, which allows the user to easily identify which inspection services have been requested. A user can select a drop-down arrow 506 to view and or fill the data fields for that inspection. Additionally, the user can add a request for inspection using a drop-down arrow 507 if there is no listing for the particular inspection desired.

The inspection request can also include other data fields or additional information can be obtained from the user after the inspection request has been made. FIG. 36 is a diagram showing, by way of example, an interactive form 510 showing additional data fields for the inspection request of FIG. 34. The interactive form 510 can include a further request form with data fields for scheduling the inspection after the initial request form has been submitted or can include data fields for inclusion with the inspection request of FIG. 34. The data fields can include scheduling information 515, such as a deadline 516 for the inspection to occur, a preferred day 517 or days of the week, preferred time periods 518 during which the inspection would occur, and a listing of day and time preferences 520. In one example, each day and time can be saved as a preference using a save button 519. Finally, any additional information 521 to be provided to the inspection vendor regarding the inspection request can be included.

Buying agents, as part of their services, also assist a buyer client with preparing a home warranty. FIG. 37 is a diagram showing, by way of example, an interactive form 530 for generating a home warranty. The home warranty can cover the repair or replacement of important components of the property for purchase, including appliances and system components, such as heating ducts and plumbing. Sometimes the property seller includes a protection plan for the buyer, which can provide peace of mind for both the buyer and the seller. Alternatively, a plan can also be offered by the buying agent. Most protection plans cover electrical systems, water heater, furnace, air conditioning, heating ducts, water pump, kitchen appliances, refrigerator, washer and dryer, and plumbing, but maybe not sewer lines. Also, most protection plans do not cover swimming pools, spas, Jacuzzis, or hot tubs. Further, the foundation and roof of the property are usually not covered.

Generally, home warranties are beneficial for the buyer to cover appliances and components of the property that are not covered by the protection plan. The interactive form 530 for the home warranty document can include a name of the document 531 and a status of the document 532. The document can also include data fields for vendor 534, home warranty type 535, air condition indication 536, property amenities 537, and scheduling information 538, such as deadline 539 for scheduling an inspection for the home warranty, a preferred day 540 and time period 541, and a list of day and time preferences 542. Other data fields are possible. A user can search for a vendor via a new vendor button, which can bring up a list of different vendors providing home warranties. Once the document is complete, the user can submit the warranty request via a submit button 546. The home warranty document form can be listed with the inspection services list, which is described above with respect to FIG. 34.

Sometime, sellers are not completely satisfied with the offer proposal received by the buyer client. For example, receiving a low-ball offer on a home can be frustrating for sellers. They may prepare a counter offer for providing to the buyer client and the buying agent. The user can utilize the system to select and populate documents for the counter offer.

Single-Tier Blockchain

In still a further embodiment, a single-tier blockchain can be used. Enabling a single-tier blockchain to record real estate transactions requires significant innovation to overcome existing challenges, such as the large amounts of storage required to record such transactions. Currently, a package of documents for a real estate transaction, including one or more of a deed, mortgage, easement, judgment, lien, foreclosure, or request for notice of default, are recorded with a governmental entity that is jurisdictionally located. Recordation of such documents for each transaction require extremely large amounts of storage space and undo expense and processing when there are potentially very large numbers of nodes. Accordingly, a transaction recordation system with comprehensive access, tamperproof guarantees and validity checks, and robust archiving for all of the historic records in property transactions is needed.

Figure 39:
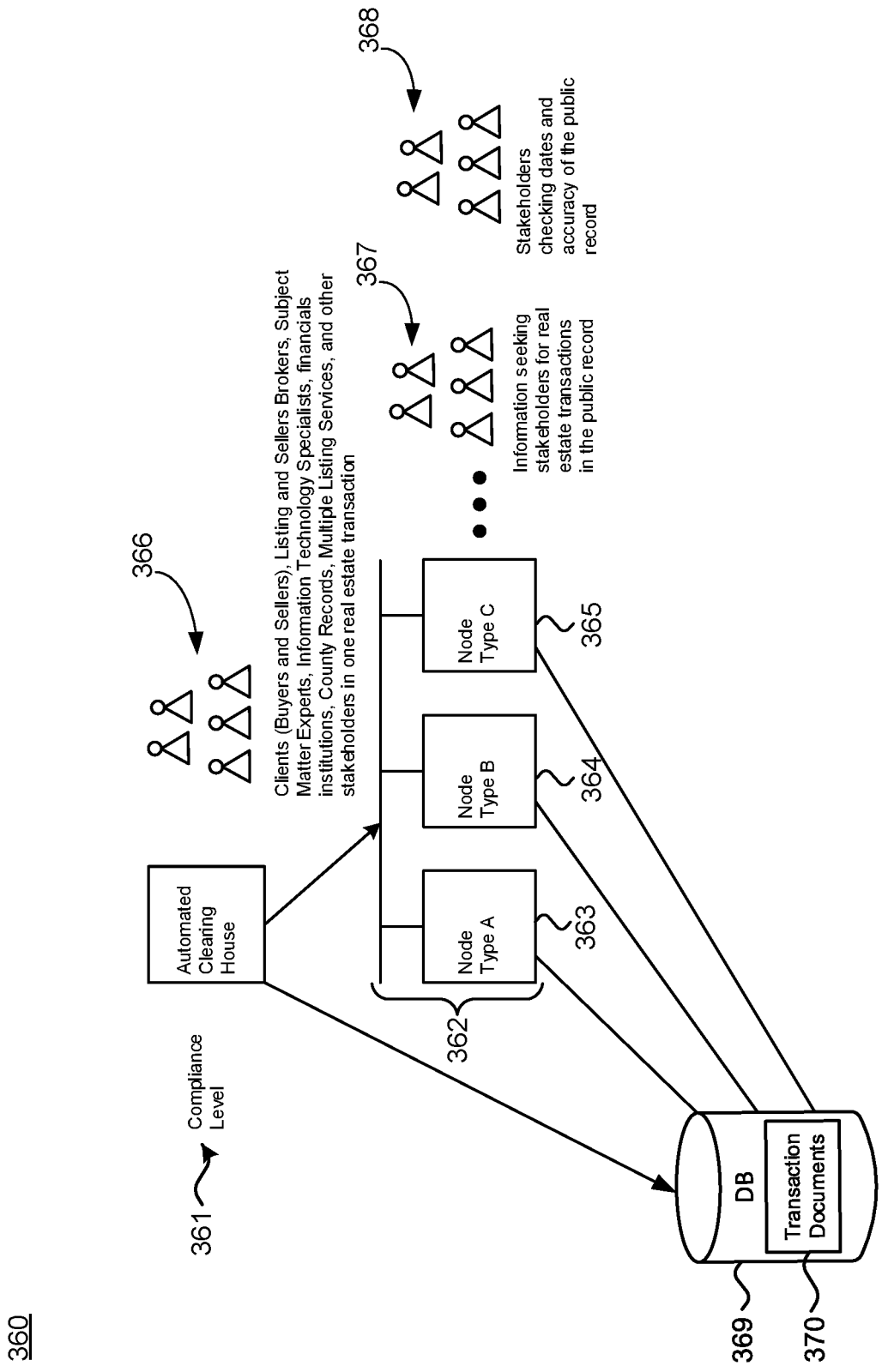
FIG. 39 is a block diagram showing, by way of example, a single-tier system for document transformation and accountability.

Utilizing a single-tier blockchain for recording real estate transactions requires large amounts of storage, which can be located within the blockchain or separate from the blockchain. FIG. 39 is a block diagram showing, by way of example, a different embodiment of a system 360 for document transformation and accountability. The system 360 includes a compliance information management system 361 and a single-tier blockchain 362. The compliance information management system 361 is described above in detail with respect to FIG. 2 and is a client and stakeholder-facing platform responsible for generating and transforming documents for a real estate transaction, as well as ensuring that the documents are in compliance with local and federal regulations, are correctly populated, and are complete. Users 366, such as clients, including buyers and sellers, listing and selling brokers, subject matter experts, information technology specialists, financial institutions, county records, multiple listing services, and other stakeholders in a real estate transaction can access the compliance information management system.

Once a transaction is complete, a record of the transaction is stored on the single-tier 362 blockchain. Specifically, the single-tier 362 can include a plurality of nodes 363-365 that each record the transaction, using a hash of the transaction documents, on a copy of the blockchain maintained by that node. The nodes can store the same type of information or different information regarding the real estate transaction. For example, a first type of node 363 can store only a cryptographic hash of the transaction documents as a record of the real estate transaction, while a second type of node 364 can store a hash of the transaction documents and a copy of the transaction documents themselves and a third type of node 365 can store a hash of the transaction documents and chain of title information for the real estate transaction. Thus, the single-tier can include one or more types of nodes and other types of nodes are possible. The different types of nodes are further discussed below with respect to FIG. 40. The nodes 362-365 can be accessible by information seeking stakeholders 367 for real estate transactions in the public record. Additionally, stakeholders 368 checking dates and accuracy of the public record can also access the nodes 362-365. However, other individuals and third party organizations can access the nodes 362-365.

When the tier includes nodes that store a cryptographic hash of the transaction documents only and/or nodes that store a hash of the transaction documents with the chain of title information, and not nodes that store the actual transaction documents, a storage 369, such as database or centralized server, that is separate from the blockchain 362 can be used to store the transaction documents. However, if the nodes that store the hash of the transaction documents and the transaction documents themselves are included in the tier, the transaction documents can be maintained on the blockchain.

Figure 40:
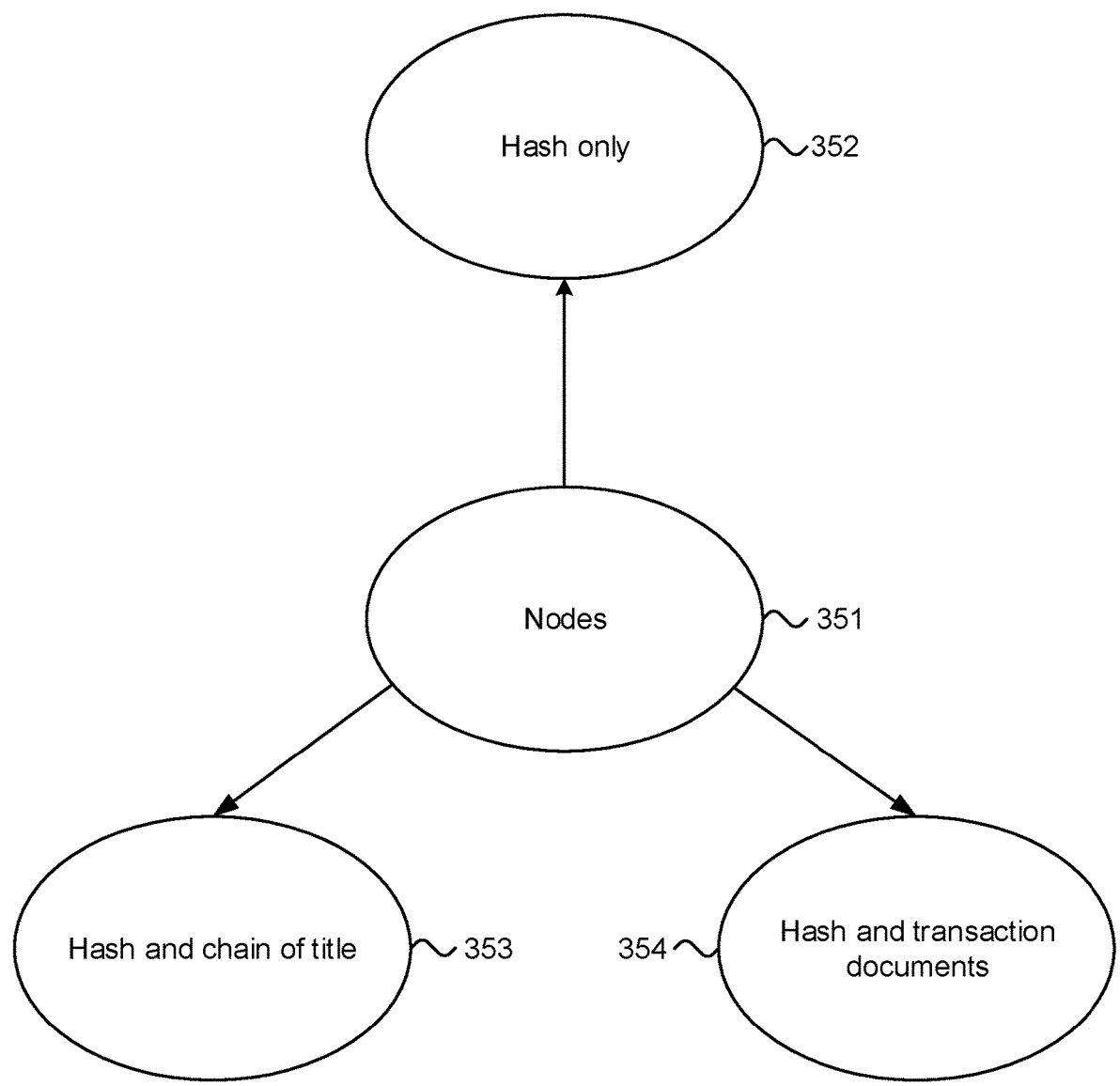
FIG. 40 is a block diagram showing, by way of example, different approaches for storing data associated with a real estate transaction.

Allowing the use of different types of nodes in a single-tier can reduce the amount of storage required by many nodes in the tier, allowing large numbers of real estate transactions to be recorded. FIG. 40 is a block diagram showing, by way of example, different approaches 350 for storing data associated with a real estate transaction. The single-tier of nodes can includes the same type of nodes or different types of nodes. When different, the nodes can differ based on a type of data stored with respect to the transaction as discussed below.

Record Cryptographic Hash (Single-Tier Blockchain)

A single-tier of nodes 351 can include the same or different types of nodes based on the types of data stored by each node. In one embodiment, the nodes can be the same and each node can record a hash 352 of the transaction documents to maintain a listing of transactions or a chain of title. Recording a cryptographic hash of the transaction documents reduces the amount of storage required by each node, while still being capable of preventing fraud since changes to the documents would alter the hash and would be detectable. The transaction documents can then be stored on a different set of nodes that are not part of the blockchain or can be stored on a different type of node that is included in the blockchain as described below.

Record Cryptographic Hash and Transaction Documents (Single-Tier Blockchain)

Alternatively, the tier of nodes 351 can include different types of nodes. In one embodiment, the single-tier can include nodes that record the hash only and other nodes that record the hash 354 along with the transaction documents that were hashed. The nodes that store the hash and the transaction documents require much more storage than those nodes that record only the hashes. Using different types of nodes allows nodes with less storage to participate, while requiring only some nodes to have large amounts of storage to maintain copies of the transaction documents. Nodes that are able to store the transaction documents can also check compliance of those documents upon access, which is described in detail above. Additionally, in one embodiment, the nodes can carry the hash on the blockchain forever, but storage of the actual transaction documents may likely be deleted after some time to allow more storage space.

Record Cryptographic Hash and Chain of Title Data (Single-Tier Blockchain)

A further embodiment of a single-tier blockchain with different types of nodes can include nodes that record a hash of the transaction document only and nodes that record the hash with a small record, including chain of title data 353, to allow the chain of title data to become publicly visible. The chain of title data can include a select portion of information that describes the real estate transaction, such as an address of the property, names of the buyer and seller, and a purchase price. However, other types of chain of title data are possible. The chain of title information can be obtained from the purchase agreement, which is a part of the transaction documents. Recording the chain of title data requires less storage than the actual transaction documents themselves, which can also be stored by different nodes on the blockchain or in storage independent of the blockchain.

In still a further embodiment, a combination of two or more types of nodes can be included in the single-tier to provide different pieces of information, which can be accessed by the public to determine chain of title for a particular real estate property, as described U.S. patent application, titled "Single-Tier Blockchain-Based System and Method for Document Transformation and Accountability via Different Node Types," filed Sep. 4, 2019, the disclosure of which is hereby incorporated by reference.

Alternatively, rather than including nodes of different types, the single tier can include nodes of the same type, including nodes that record only hashes, nodes that record hashes and the transaction documents, and nodes that record the hashes and chain of title information.

Records of the transaction, chain of title, and the transaction documents themselves can be access from the blockchain based on a request for the information. The information can be accessed using an address of the property, name of the owner or previous owners, or other types of information associated with the transaction.

Figure 41:
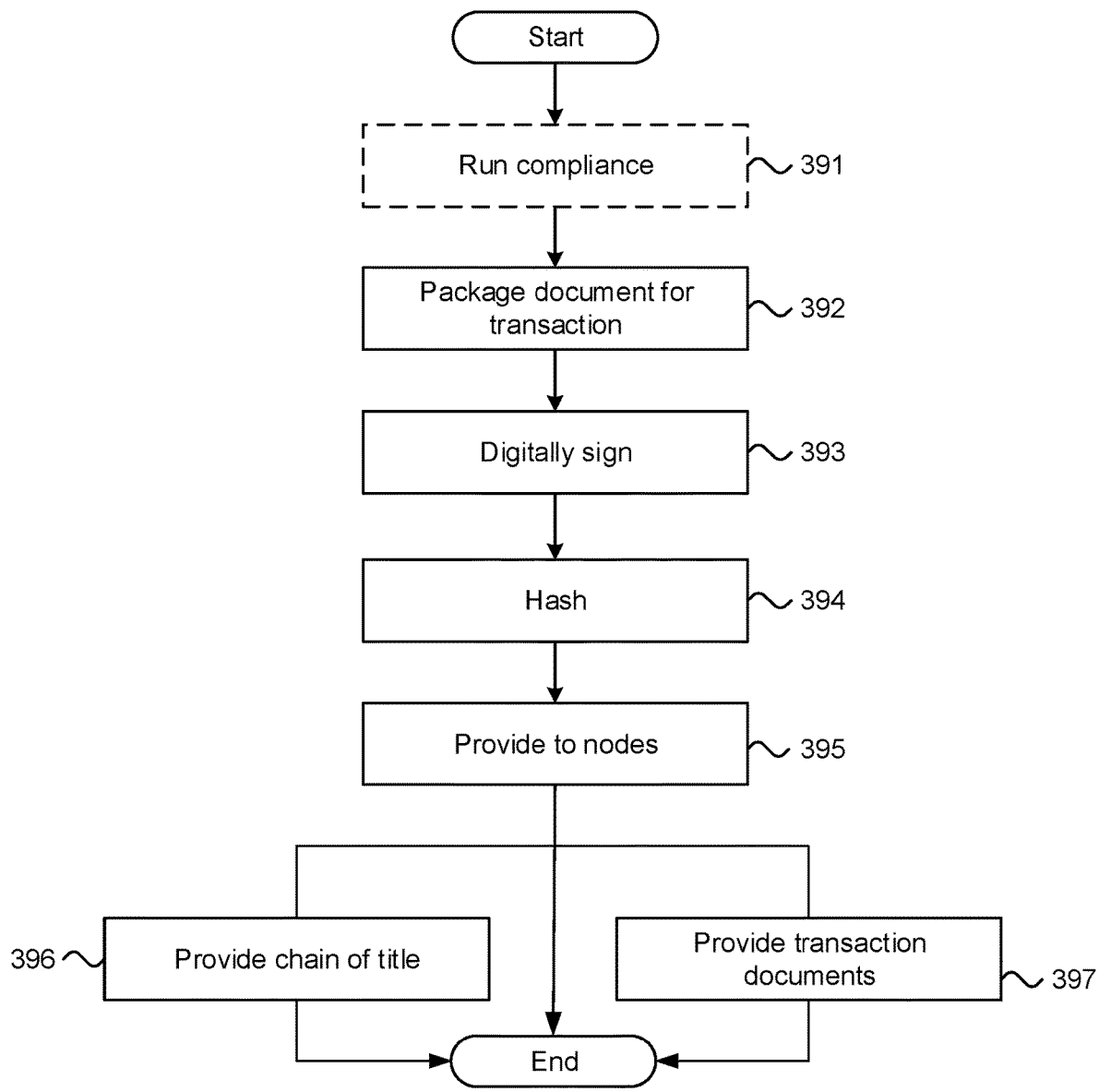
FIG. 41 is a flow diagram showing, by way of example, a different process for document transformation and accountability via a single-tier blockchain.

The cryptographic hash of the transaction documents can be generated by the compliance system or via one or more nodes in the single-tier. FIG. 41 is a flow diagram showing, by way of example, a process 390 for document transformation and accountability via a single-tier blockchain. Transaction documents can optionally be processed (block 391) to ensure compliance, correctness, completeness, and consistency of the documents. Subsequently, one or more of the transaction documents can be grouped (block 392) as a document package for recordation of the transaction and the package can be digitally signed (block 393). Subsequently, a cryptographic hash of the document package can be generated by the compliance system and provided (block 395) to one or more of the nodes in the single-tier. Alternatively, the transaction documents can be provided to the nodes, which can generate the cryptographic hash of the documents. Subsequently, the cryptographic hash is stored on each of the nodes in the single-tier. Additionally, one or more of the nodes can store chain of title data (block 396) and/or transaction documents (block 397) with the cryptographic hash on that node.

Figure 42:
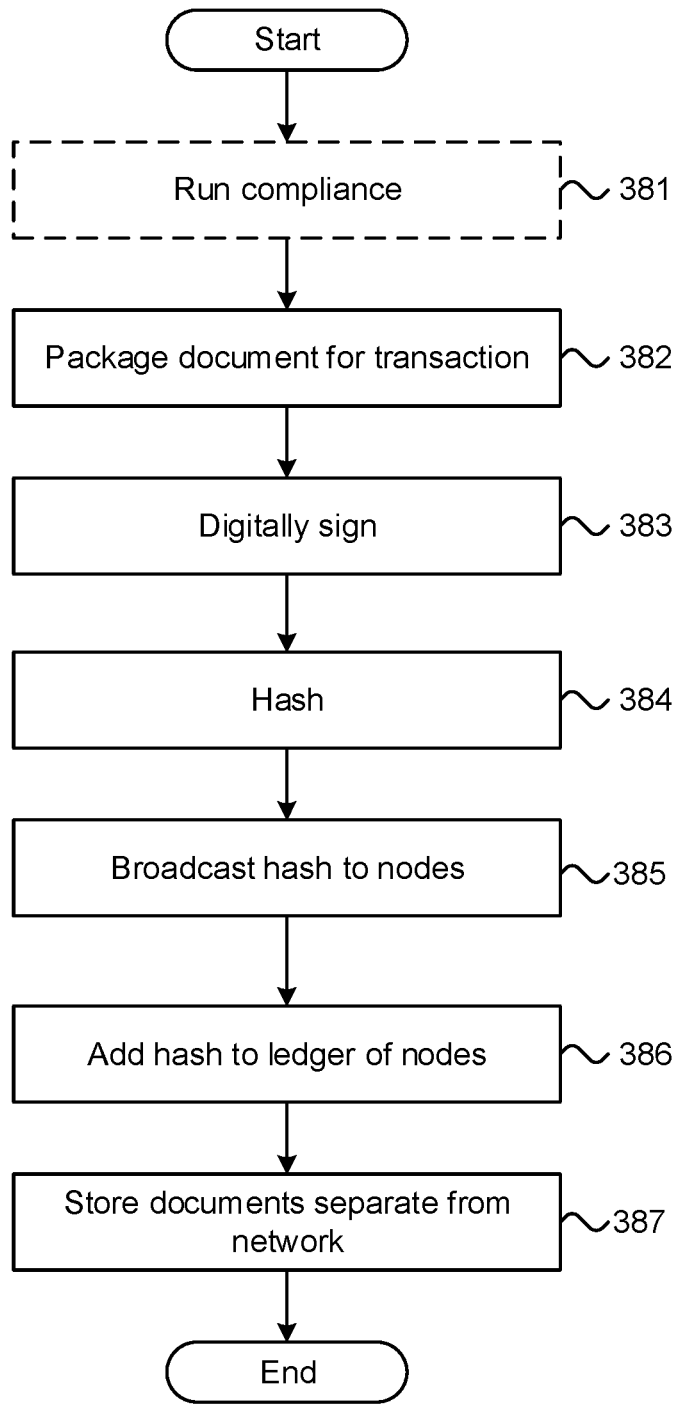
FIG. 42 is a flow diagram showing, by way of example, a process for document transformation and accountability via a single-tier blockchain.

However, when the tier of nodes includes nodes that record only the cryptographic hash or the cryptographic hash and the chain of title data, but not nodes with large enough storage to record the transaction documents, separate storage must be provided. FIG. 42 is a flow diagram showing, by way of example, a process 380 for document transformation and accountability via a single-tier blockchain. A set of transaction documents is generated and a compliance check can be optionally performed (block 381) to ensure that the generated documents are consistent, complete, correct, and compliant with governmental requirements. Next, the transaction documents are gathered (block 382) and digitally signed (block 383).

The transaction documents are cryptographically hashed (block 384) and broadcast (block 385) to one or more nodes in the single-tier. Each node adds (block 386) the cryptographic hash to a copy of a ledger of transactions maintained by that block.

The digitally signed document package is then stored (block 387) separate from the network, such as on a centralized server or in a traditional database independent of the blockchain, and a check sum can be performed to ensure that no tampering is present. For example, a checksum can be added to the document package to ensure that the document package upon access is the same as the document package that was stored.

Purchase-Specific Compliance

Figure 53:
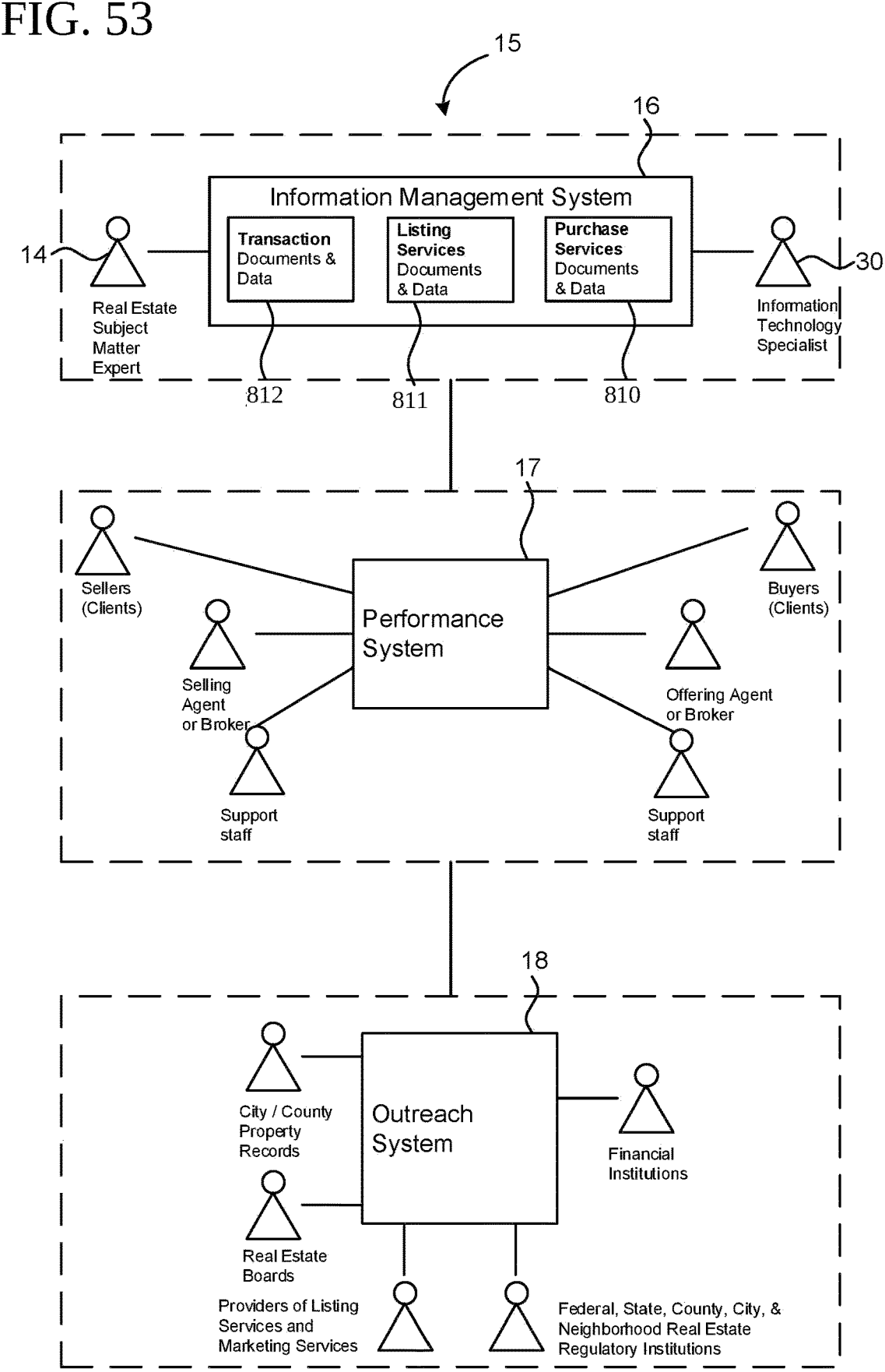
FIG. 53 is a block diagram showing, by way of example, a compliance system with purchase services.

Buying agents represent buyers and are required to prepare documents, which belong to a document package for a property transaction, including an agreement between the agent and client, as well as documents outlining the property transfer. For example, buying agents must prepare an agreement outlining the relationship between that agent and his client. Each buying agent is also responsible for preparing property purchase offers and if necessary, counter offers. The compliance system compiles the documents from each of the selling and listing agents as the document package for the transaction based on information provided by the agents. In one embodiment, different parts of the document package are provided to different stakeholders, such as the property seller, purchase, records office, or real estate agency, as well as other stakeholders. FIG. 53 is a block diagram showing, by way of example, the compliance system 16 of FIG. 1 with purchase services 810. As described above with respect to FIG. 2, the compliance system 15 includes the compliance information management system 16, the compliance performance system 17, and the compliance outreach system 18. At the level of the compliance information management system 16, real estate subject matter experts 14 and information technology specialists 30 provide information and logic representations 812 that are encoded and saved for performing automatic document population and compliance checking of the populated documents for a real estate transaction. Also at the compliance level, document templates and data for listing services 811, which is described in U.S. patent application, titled "System and Method for Purchase Document Transformation and Compliance," filed Sep. 4, 2019, which is hereby incorporated by reference, and purchase services 810 can be entered by the real estate subject matter experts 14 and information technology specialists 30. The purchasing services document templates and data 810 can include vendor data, recommendation logic for identifying particular vendors, and scheduling logic for vendors for performing inspections of a property for sale, as well as other types of templates and data.

Once the document templates, data, and logic have been entered by the real estate subject matter experts and information technology specialists 30, the compliance performance system 17, as described above with respect to FIG. 2, identifies and populates documents for a property transaction. Specifically, users, such as brokers, agents, and stakeholders to the property transaction provide data regarding the transaction for populating at least a portion of the documents using the information and logic representations from the information management system 16. Once populated, compliance logic from the information management level 16 is applied to the documents to check for correctness, completeness, consistency, and compliance of the data and the documents, using the information gathered by the compliance information management system and the compliance outreach system. Prior to or during the compliance checking, the compliance outreach system 18 performs interactions with third party systems and parties to obtain additional information against which the populated documents of the transaction documents are checked. For instance, the outreach system 18 can contact one or more inspectors on behalf of the buyer to perform an inspection of the property on which the offer can be based.

Purchase Services for Property Buyers

Figure 43:
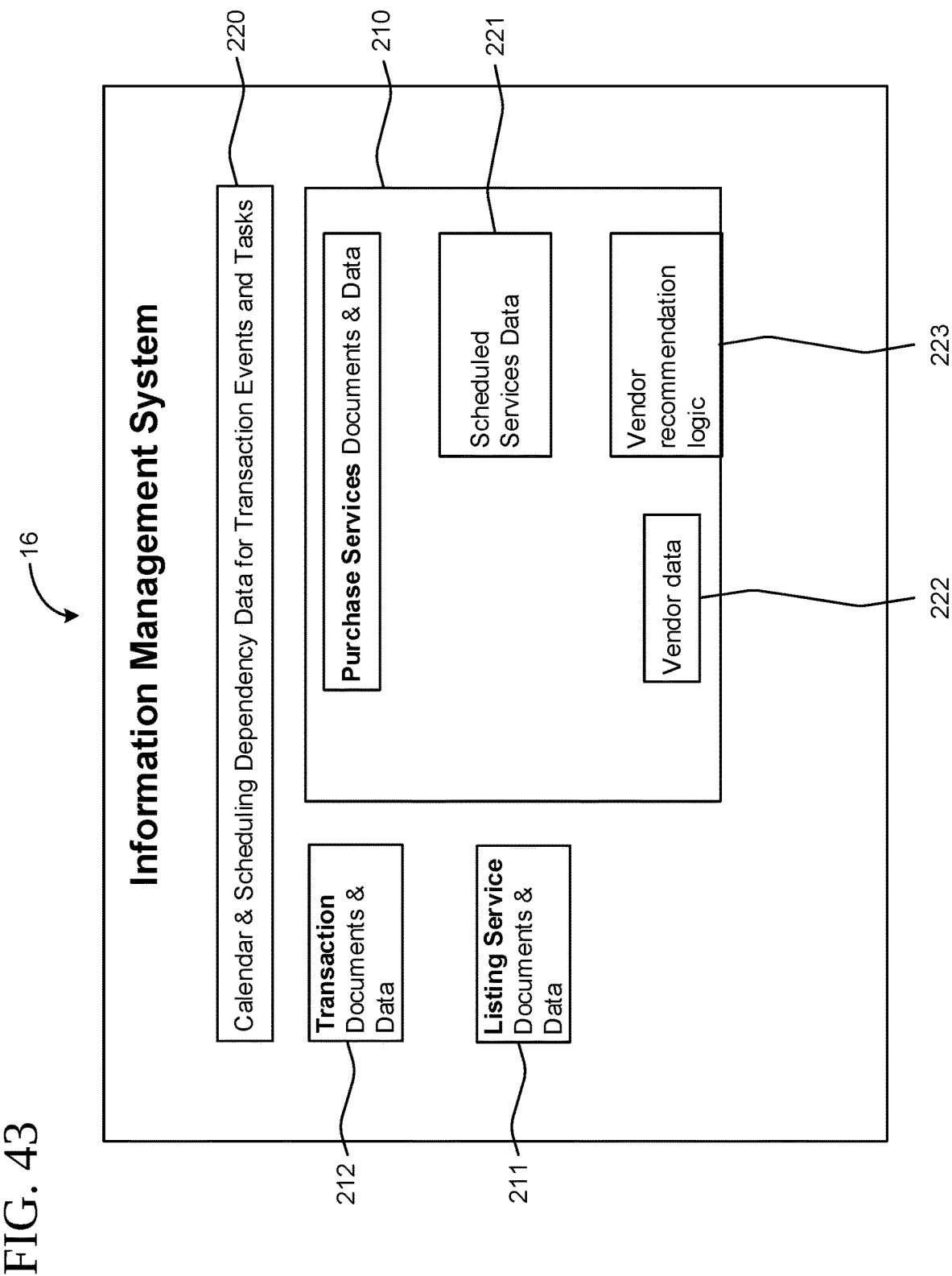
FIG. 43 is a system diagram of the information management system of FIG. 3 with purchase services and vendor services.

Information about the different vendors are entered and stored as a subsystem within the information management system 16. FIG. 43 is a system diagram of the information management system 16 of FIG. 3 with purchase services. FIG. 53 is broadly similar to FIG. 16. The information management system 16 includes transaction documents and compliance data and logic 812, which are described above with respect to FIG. 3, listing services 811, which are described in commonly-owned U.S. patent application, titled "System and Method for Purchase Document Transformation and Compliance," filed Sep. 4, 2019, which is hereby incorporated by reference, purchase services 810, and scheduling services 220. As described above, the transaction documents and compliance data and logic 812 are entered and stored for performing document population and compliance checking of the populated documents for a real estate transaction. The purchase services 220 includes vendor data 222, vendor recommendation logic 223, and scheduled services data 221. Successful buying agents often help their buyer clients by providing customized services, such as recommending and arranging inspection services and warranties. For instance, in an offer for the property, the buyer client may have indicated a desire for particular inspections, such as a home inspection. However, other types of inspections are possible. The purchase services 210 includes documents and data that are used to provide vendor recommendations to a buyer client for one or more purchase services using vendor recommendation logic 223 and vendor data 222. The data stored can for each vendor or service provider can include vendor name, contact information, prices, reviews, services offered, and areas in which service is provided, as well as other types of information.

When a purchase service is requested manually, such as by entering a request for services, or is based on populated data values in one or more documents in the document package, the request is entered into the scheduling services system 220 along with scheduled services data 221. The scheduling services data 221 can include vendor availability, as well as the availability of the buyer client. The scheduling services system 220 includes a calendar with entries for transaction events, listing services, marketing services, purchase services, and other types of events, and is used to keep track of timing dependencies and the property sale timeline for transfer of the property.

Prior to providing and recommending purchase services, a buying agent assists buyer clients in looking for a property for purchase. To identify properties of interest for the buyer client, the agent collects initial transaction information via a cover sheet, as described in detail above with respect to FIG. 8. FIG. 44 is a diagram of an interactive form 600 showing, by way of example, a different embodiment of a cover sheet 620. The interactive form 600 can include a navigation bar for an index 610 of interactive forms for the property transaction and a display of the cover sheet 620. Specifically, the index can include the cover sheet for obtaining data regarding the buyer client, a listing of documents selected for inclusion in a document package for the purchase of the property, a proof of funds for purchase of the property, signed disclosures, a pre-qualification for loans, purchase services for providing vendor recommendations and warranties, and marketing services.

The cover sheet 620 can include fields for the buying agent and buyer information, such as first and last names, email address, phone numbers, current residential address, and status of ownership of the property at the current residential address. In one embodiment, the cover sheet can include different data fields based on a situation of the buyer client and information provided by the client. For example, buyer clients often form a relationship with a buying agent prior to identifying a house for purchase and if so, the cover sheet does not include or does not receive data regarding an identity of the property for purchase. However, if a property for purchase is identified, the cover sheet can be more comprehensive and information for the property can be entered into the cover letter. For example, FIG. 45 is an interactive form 640 showing, by way of example, a comprehensive cover sheet 641. The comprehensive cover sheet 641 can be used when a buyer client has already identified a property on which to place an offer and includes more data fields than a cover sheet for a buyer client that has not yet identified a property. For instance, the comprehensive cover sheet 641 can include data fields 642 for identifying the property for purchase, including MLS identification, MLS number, APN number, and address. Additionally, the coversheet 641 can include information about the buying agent, such as contact information, license number, and real estate agency, and information about the purchaser, such as name and contact information. Other data fields are possible.

The data collected via the cover sheet can be used to generate a data model for the property transaction, as described above in detail with respect to FIG. 9. The data model collects and records data during the transaction process and utilizes the data to populate an agency disclosure assignment formalizing the agent/client relationship, as search parameters for identifying potential properties for purchase, and for populating documents for purchase of the property. Additionally, information about the property or the buyer client collected after population of the cover sheet can be added to the agency disclosure assignment and purchase documents using the system logic, such as consistency and completeness.

Once the buying agent and buyer client relationship has been formalized, the buying agent can identify and show the buyer client different properties of interest. The buying agent can utilize a web-based information source, MLS service, or other types of sources to search for properties using parameters, such as location, price, size, and property type, as well as other types of search parameters. An MLS service provides information to agents about properties that are coming up for sale.

A search for properties is conducted based on one or more parameters entered by the buying agent and results can be displayed. However, if no properties are identified that fit the search parameters, nearby or close alternatives that do not precisely match the parameters, but which are closely related can be suggested. The buying agent can obtain information about one or more of the properties by clicking on a link, picture, or listing of that property in the result list.

The purchase services described in detail herein can allow the buying agent to deliver search results and other documents to the buyer client, including online or printed brochures to prevent the buyer client from becoming confused after viewing multiple properties. Additionally, a log of properties suggested by the buying agent and viewed by the buyer client can be generated. Ideally, a buying agent should show or describe all properties on the market that are available and meet the buyer client's interest to satisfy legal requirements regarding housing discrimination and increase the buyer client's satisfaction with the buying agent. The log helps the buyer client from confusing the different properties for consideration, but also maintains a record of the properties for the buying agent. Accordingly, should issues later arise where a buyer client questions whether they were made aware of a particular property, the log provides evidence that the property was recommended and possibly visited.

Transforming the Purchase Agreement and Document Package Dynamically

After the buyer client has selected a property of interest for placing an offer, an offer may be generated. The elements of an offer often include terms and conditions, a target date for closing, earnest money deposit or a promissory note, method for adjusting real estate taxes, rents, utilities, provisions for paying title insurance, survey, and termite inspections, among other elements. FIG. 46 is a diagram of an interactive form 650 for generating an offer or a counter offer. The interactive form 650 can include a navigation bar for an index 651 of pages for generating documents, such as the offer, for the property transaction. Under the document selection in the index, a user, such as the buying agent or buyer client, can select 652 a template for a set of purchase documents, such as an offer, for inclusion in a document package for the property transfer, as described in detail herein. The different templates for the purchase agreement documents can be based on one or more of a type of property for purchase, a location of the property for purchase, and a professional organization that created the templates. A buying agent is generally responsible for advising buyer clients on the different types of purchase agreement documents that best meet the clients' interests. Different agreements can take different approaches to establishing responsibilities, risks, and liabilities for buyers.

In addition to the purchase agreements, one or more additional forms or documents may be needed for inclusion with the purchase agreement. The additional forms can include contingencies for the sale of a property owned by the buyer, a remove of such contingency, notification about propane tanks, requirements for increased deposits, historical disclosures, common interest developments, visual inspections, appraisals and waivers of appraisal contingencies, fireplace disclosures, bedbug disclosures, time extensions, earthquake hazards, buyer inspections, lead based paint disclosures, market condition advisories, square foot advisories, compliance of water heaters, and parking and storage disclosures, as well as other types of forms and documents. As a property transaction progresses, information may be uncovered during inspections and disclosed to buyers and sellers. Accordingly, the document package changes over time as more data is obtained and further documents are generated. The user can conduct 653 a search for specific documents to add to the offer or counter-offer in the document package via a document search tool 653 and select 654 one or more specific documents, such as results of a document search, for inclusion in the document package, which are displayed in a document listing 654. A generate document button 656 can be used to generate documents for inclusion in a document package, such as by filling in form elements in the templates. Presuming that this button is used by a buyer's buying agent, it would generate an offer document to be presented to the seller and listing agent.

The documents, once selected, can be automatically populated with data collected via the cover sheet and included in the data model, as well as by additional data collected in one or more other documents in the document package depending on the data available when the document is selected for inclusion in the package. Finally, once all the documents and information are selected and completed, a generate offer button 655 can be selected for gathering all the documents as the offer.

Figure 47:
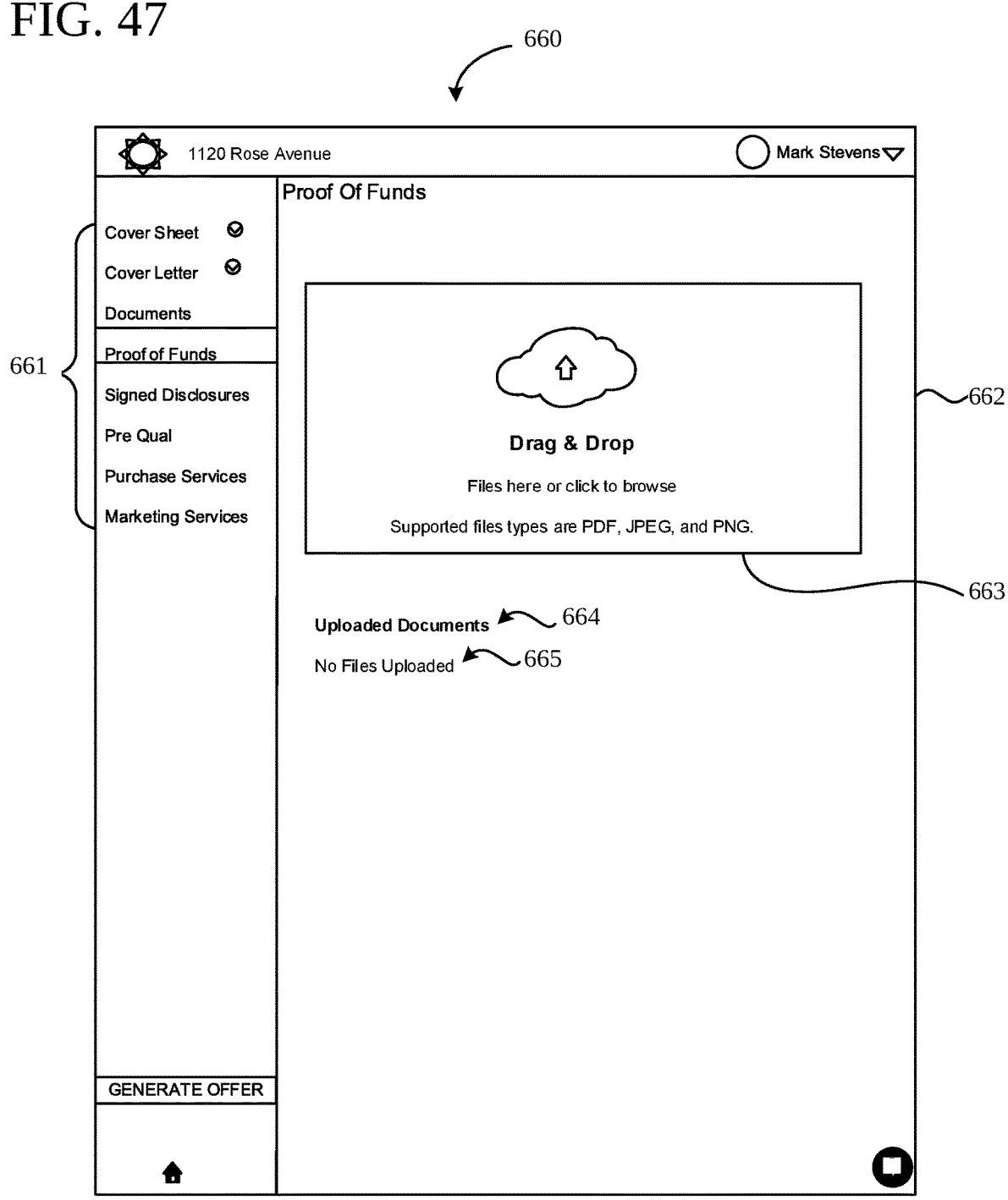
FIG. 47 is a diagram of an interactive form for uploading documents.

Additional documents can also be uploaded by the user. FIG. 47 is a diagram of an interactive form 660 for uploading documents. The interactive form 660 includes a navigation bar for an index 661 of pages for generating documents, such as the offer, for the property transaction, and a document upload section 661. The document upload section 661 can include a document upload box 663, a list of uploaded documents 664 and links 665 in the list to access the documents. The documents uploaded by a user include supporting documentation for an offer, such as a cover letter, proof of financing, loan prequalification document, description of contingencies, proposed dates and payment for inspections and information gathering to resolve risk issues. For example, a buyer client may wish to write a cover letter to the owner of a property for sale explaining why the client wants to purchase the property. The cover letter can be included with the offer documents. FIG. 48 is a diagram showing, by way of example, a cover letter 670. The cover letter 670 can include a name of the seller or sellers, a message from the buyer client, and the buyer client's name. Other content for inclusion in the message is possible.

The user can upload documents by dragging and dropping such documents. A checklist of the documents for inclusion in the property transfer documents, such as the offer, can be generated and maintained. Once one or more documents in the checklist have been uploaded, the checklist can be updated to reflect receipt of the documents. Further, notifications for one or more documents can be generated if not received or maintained by the system.

Prior to providing and recommending purchase services, a buying agent assists buyer clients in looking for a property for purchase. To identify properties of interest for the buyer client, the agent collects initial transaction information via a cover sheet, as described in detail above with respect to FIG. 8. FIG. 44 is a diagram of an interactive form 600 showing, by way of example, a different embodiment of a cover sheet. The interactive form 600 can include a navigation bar for an index 610 of interactive forms for the property transaction and a display of the cover sheet 620. Specifically, the index can include the cover sheet for obtaining data regarding the buyer client, a listing of documents selected for inclusion in a document package for the purchase of the property, a proof of funds for purchase of the property, signed disclosures, a pre-qualification for loans, purchase services for providing vendor recommendations and warranties, and marketing services. The cover sheet 620 can include fields for the buying agent and buyer information, such as first and last names, email address, phone numbers, current residential address, and status of ownership of the property at the current residential address. In one embodiment, the cover sheet can include different data fields based on a situation of the buyer client and information provided by the client. For example, buyer clients often form a relationship with a buying agent prior to identifying a house for purchase and if so, the cover sheet does not include or does not receive data regarding an identity of the property for purchase. However, if a property for purchase is identified, the cover sheet can be more comprehensive and information for the property can be entered into the cover letter. For example, FIG. 45 is an interactive form 640 showing, by way of example, a comprehensive cover sheet 641. The comprehensive cover sheet 641 can be used when a buyer client has already identified a property on which to place an offer and includes more data fields than a cover sheet for a buyer client that has not yet identified a property. For instance, the comprehensive cover sheet 641 can include data fields 642 for identifying the property for purchase, including MLS identification, MLS number, APN number, and address. Additionally, the coversheet 641 can include information about the LISTING agent, such as contact information, license number, and real estate agency, and information about the purchaser, such as name and contact information. Other data fields are possible.

The data collected via the cover sheet can be used to generate a data model for the property transaction, as described above in detail with respect to FIG. 9.

The purchase services described in detail herein can allow the buying agent to deliver search results and other documents to the buyer client, including online or printed brochures to prevent the buyer client from becoming confused after viewing multiple properties. Additionally, a log of properties suggested by the buying agent and viewed by the buyer client can be generated. Ideally, a buying agent should show or describe all properties on the market that are available and meet the buyer client's interest to satisfy legal requirements regarding housing discrimination and increase the buyer client's satisfaction with the buying agent. The log helps prevent the buyer client from confusing the different properties for consideration, and also maintains a record of the properties for the buying agent. Accordingly, should issues later arise where a buyer client questions whether they were made aware of a particular property, the log provides evidence that the property was recommended and possibly visited.

As shown in FIG. 46, the user can conduct 653 a search for specific documents to add to the offer or counter-offer in the document package via a document search tool 653 and select 654 one or more specific documents, such as results of a document search, for inclusion in the document package, which are displayed in a document listing 654. A generate document button 656 can be used to generate documents for inclusion in a document package, such as by filling in form elements in the templates. Presuming that this button is used by a buyer's buying agent, it would generate an offer document to be presented to the seller and listing agent.

FIG. 47 is a diagram of an interactive form 660 for uploading documents. The interactive form 660 includes a navigation bar for an index 661 of pages for generating documents, such as the offer, for the property transaction, and a document upload section 661.

FIG. 51 is a diagram showing, by way of example, an interactive form 710 showing additional data fields for the inspection request of FIG. 50. The interactive form 310 can include a further request form with data fields for scheduling the inspection after the initial request form has been submitted or can include data fields for inclusion with the inspection request of FIG. 50. The data fields can include scheduling information 715, such as a deadline 716 for the inspection to occur, a preferred day 717 or days of the week, preferred time periods 718 during which the inspection would occur, and a listing of day and time preferences 720. In one example, each day and time can be saved as a preference using a save button 719. Finally, any additional information 721 to be provided to the inspection vendor regarding the inspection request can be included.

Compliance and Offer Generation

Other types of documents to be added to a package can include inspection elections of the buyer. During the property transfer process, the buying agent should recommend investigation of the property for any risks. Accordingly, an inspection advisory document can be generated for inclusion with the purchase offer, added to the document package, and signed by the buyer client. The inspection advisory document indicates that expert reports can be requested, outsourced, and produced, in addition to any advice from the buying agent regarding any risks associated with the property. FIG. 49 is an interactive form 680 for displaying a document for buyer inspection elections. The interactive form 680 provides a document for buyer inspection elections 681 and a signature box 682. One or more inspections can be selected by the buyer client, such as by clicking on a "yes" box. The election of an inspection triggers automatic inclusion of additional forms for recommending or ordering inspections and for providing reports on the results via the compliance logic. For example, if the buyer client selection a lead pain inspection, then a lead based paint disclosure form can be added to the document package along with other forms. The lead-based paint disclosure form can require disclosure of information from the seller and authorization to allow the buyer to have a lead paint inspection performed. Subsequently, the buyer client can enter his signature via the signature data field 682. The document for the inspection elections can be added to the document package for the property.

Once all the documents have been added to the package for an offer on a property for sale, a generate offer button can be selected by the user. The generate offer button can be on all the pages in the index so that a user can generate an offer at any time. After the offer has been generated, the user can send the document package for the offer to the listing agent of the seller.

Once an offer has been accepted by the seller, the buyer client can arrange inspections, such as those which were identified in the offer. For every inspection that is ordered on the property, a home inspection form can be created for use by the buyer client to schedule an inspection. FIG. 50 is a diagram showing, by way of example, an interactive form 690 for generating an inspection request. The interactive form 690 can include a navigation bar for an index 691 of pages for generating documents, such as the offer, for the property transaction, and an inspection request form listing 692. The inspection request form 692 can include a request identifier 693, which indicates whether the inspection associated with the form, such as a home inspection, has been requested by the user, and a name of the form 694 to be filled out. The user can manually enter data in the form by typing answers or can elect to use the autofill feature 695, which populates the inspection form 692 with data already maintained by the system. The inspection form 692 can include data fields for vendor 696, property type 698, property access information 699, including property occupancy 700, individual providing access to the property 701, notification and code for any lockbox 702, and any gate code 703. To select a particular vendor for performing the inspection, a user can select a new vendor button 697 and search through a list of vendors for the inspection service desired. The list of vendors available for selection can be created by the real estate agent's team or brokerage. Alternatively, the information technology specialists or real estate experts can enter the list of vendors. Once the user is ready to submit the request, the user can select the submit request button 704.

Once a date and time is selected for conducting the inspection, the appointment can be entered into a calendar and scheduling system maintained by the system for the property transaction. In one embodiment, each property transaction is associated with a calendar of tasks and appointments for that transaction. The calendar can be used to review the tasks and identify one or more of a dependency between two or more of the tasks, a timing conflict for performing two or more of the tasks, and an interaction between two or more of the tasks. Further, notification reminders of the inspection appointments can be generated and sent to the users, such as buying agent and buyer client. The notification reminder can include a task, along with notice that a deadline for completion of the task is approaching; an assignment of the task; or a re-assignment of the task. A dashboard showing the status of activities can also be provided.

The inspection request form listing 692 can also include bars 705 for other types of inspections with a status bar indicating whether that particular service was requested 693, which allows the user to easily identify which inspection services have been requested. A user can select a drop-down arrow 706 to view and or fill the data fields for that inspection. Additionally, the user can add a request for inspection using a drop-down arrow 707 if there is no listing for the particular inspection desired.

The inspection request can also include other data fields or additional information can be obtained from the user after the inspection request has been made. FIG. 51 is a diagram showing, by way of example, an interactive form 310 showing additional data fields for the inspection request of FIG. 50. The interactive form 310 can include a further request form with data fields for scheduling the inspection after the initial request form has been submitted or can include data fields for inclusion with the inspection request of FIG. 50. The data fields can include scheduling information 715, such as a deadline 716 for the inspection to occur, a preferred day 717 or days of the week, preferred time periods 718 during which the inspection would occur, and a listing of day and time preferences 720. In one example, each day and time can be saved as a preference using a save button 719. Finally, any additional information 721 to be provided to the inspection vendor regarding the inspection request can be included.

Buying agents, as part of their services, also assist a buyer client with preparing a home warranty. FIG. 52 is a diagram showing, by way of example, an interactive form 730 for generating a home warranty. The home warranty can cover the repair or replacement of important components of the property for purchase, including appliances and system components, such as heating ducts and plumbing. Sometimes the property seller includes a protection plan for the buyer, which can provide peace of mind for both the buyer and the seller. Alternatively, a plan can also be offered by the buying agent. Most protection plans cover electrical systems, water heater, furnace, air conditioning, heating ducts, water pump, kitchen appliances, refrigerator, washer and dryer, and plumbing, but maybe not sewer lines. Also, most protection plans do not cover swimming pools, spas, Jacuzzis, or hot tubs. Further, the foundation and roof of the property are usually not covered.

Generally, home warranties are beneficial for the buyer to cover appliances and components of the property that are not covered by the protection plan. The interactive form 730 for the home warranty document can include a name of the document 731 and a status of the document 732. The interactive form 730 for the home warranty document can include a name of the document 731 and a status of the document 732. The document can also include data fields for vendor 734, home warranty type 735, air condition indication 736, property amenities 737, and scheduling information 738, such as deadline 739 for scheduling an inspection for the home warranty, a preferred day 740 and time period 741, and a list of day and time preferences 742. Other data fields are possible. A user can search for a vendor via a new vendor button, which can bring up a list of different vendors providing home warranties. Once the document is complete, the user can submit the warranty request via a submit button 746. The home warranty document form can be listed with the inspection services list, which is described above with respect to FIG. 51. Once the document is complete, the user can submit the warranty request via a submit button 746. The home warranty document form can be listed with the inspection services list, which is described above.

Sometime, sellers are not completely satisfied with the offer proposal received by the buyer client. For example, receiving a low-ball offer on a home can be frustrating for sellers. They may prepare a counter offer for providing to the buyer client and the buying agent. The user can utilize the system to select and populate documents for the counter offer.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for electronic data transformation and compliance, comprising:
   storing, in an electronic database, a plurality of document templates, each template comprising one or more fields, wherein each field is associated with process logic that identifies a relationship of the field to one or more fields in at least one other document template, and wherein the fields are each associated with a machine readable value that is used to populate the field with a human readable data value;
   electronically receiving a data value from a user within one or more of the fields of at least one of the document templates via a user interface;
   identifying, via a processor, from the received data values, a set of document templates selected from the database, wherein each document template of the set of document templates includes at least one field that is related to the one or more fields for which the data value was electronically received;
   automatically populating, by the processor, one or more of the fields of at least one different document template in the set with the received data, wherein the populating generates a set of documents;
   running a completeness check of the set of documents, comprising:
      adding one or more blank fields to be populated by the user to one or more of the documents in the set of documents, comprising:
         receiving a further data value from the user;
         selecting at least one of the blank fields to be added to a document of the set of documents based on the received data value; and
         appending the blank data field into at least one of the documents of the set of documents;
   performing by the processor a review of the documents in the set;
   verifying with at least one third party authoritative source a correctness of the data values and at least one combination of the data values for two or more of the data fields, wherein the verifying comprises verifying an address of a property; and
   compiling the documents as an offer for a transaction after the data values and the at least one combination of the data values for two or more of the data fields are verified.

2. The method of claim 1, further comprising:
   maintaining a checklist for the offer; and
   providing a notification when one or more offer documents listed in the checklist have not been submitted.

3. The method of claim 1, further comprising:
   compiling a set of documents for generating a counter offer; and
   populating fields of the counter offer documents with the received data and further received data.

4. The method of claim 1, further comprising:
   obtaining customized market changes for the offer transaction; and
   populating one or more of the offer documents in the set with the customized market changes.

5. The method of claim 1, further comprising:
   providing a list of third party services related to the offer transaction and vendors for each of the services.

6. The method of claim 5, further comprising:
receiving a selection of one or more of the vendors on the list;
providing recommendations for the selected vendors; and
triggering message delivery to at least one of the selected vendors.

7. The method of claim 1, further comprising at least one of:
maintaining a calendar of tasks for the offer transaction associated with the document set;
reviewing the tasks and identifying one or more of a dependency between two or more of the tasks, a timing conflict for performing two or more of the tasks, and an interaction between two or more of the tasks; and
providing a display of the tasks, task dependencies, timing conflicts, and interactions.

8. The method of claim 7, further comprising:
generating from the calendar an alert for one or more of the tasks, comprising one or more of:
notice that a deadline for completion of the task is approaching;
an assignment of the task; and
a re-assignment of the task.

9. The method of claim 1, further comprising:
selecting one or more inspection elections provided in one of the offer documents in the set;
obtaining additional offer documents based on the selected inspection elections; and
adding the additional offer documents to the set of offer document.

10. The method of claim 9, further comprising:
receiving one or more ordered inspections based on the selected inspection elections; and
populating an inspection form for each ordered inspection.

11. The method of claim 1, further comprising:
maintaining a log of real estate properties presented or shown to a buyer client; and
adding a real estate property associated with the offer to the log.

12. The method of claim 1, further comprising:
running completeness logic on the offer documents and the data fields of the offer documents, comprising at least one of:
comparing the offer documents for the transaction with a library of document templates for the transaction and determining one of a new active document template is required for the transaction and no further offer documents are required for the transaction;
identifying one or more data fields without linked data values and creating a status indicator for the one or more identified data fields; and
adding one or more data fields to one of the offer documents based on a related data field with a linked data value in that active document.

13. The method of claim 1, further comprising:
running consistency logic on the data fields of the offer documents, comprising:
identifying a change to one of the data values within one of the data fields of one such active document; and
propagating the changed data value to each active document with at least one data field with a same data field identifier.

14. The method of claim 1, wherein verifying comprises:
running correctness logic on the data fields of the transaction documents.

15. The method of claim 14, further comprising:
during running of the correctness logic, connecting to one or more servers with information for the authoritative source; and
checking the data fields in the transaction documents for accuracy with the information of the authoritative source.

16. The method of claim 1, further comprising:
running compliance logic on the transaction documents, comprising:
identifying a required set of documents for the transaction based on an address for a real property to be transferred; and
confirming that the transaction documents include all the documents in the required set of documents for the transaction.

17. The method of claim 1, further comprising:
running confirmation logic on the data fields of the transaction documents, comprising:
reviewing the transaction documents;
identifying fields designated for signatures and dates; and
determining whether the identified fields designated for signatures and dates are associated with populated data values.

18. The method of claim 1, further comprising:
storing in a library the offer document as templates, wherein each document template is associated with a geographic region for which the document template is required for a transaction in that geographic region.

19. The method of claim 1, further comprising:
linking each received data value with the data field identifier of the data field into which the received data value is populated; and
storing the linked data values in a persistent storage that is a reference source for the linked data values for all the offer documents.

20. The method of claim 1, further comprising:
storing in persistent storage each of the data field identifiers with one or more of a data type and a meaning of the data value as a field definition, wherein the storage is a source for the field definitions; and
distributing the field value definitions across the document templates and designating one of the document templates as a reference for a source of each field definition.

* * * * *